US011839965B2

(12) United States Patent
Kawai

(10) Patent No.: US 11,839,965 B2
(45) Date of Patent: Dec. 12, 2023

(54) ELECTRIC WORK MACHINE

(71) Applicant: MAKITA CORPORATION, Anjo (JP)

(72) Inventor: Yasuhito Kawai, Anjo (JP)

(73) Assignee: MAKITA CORPORATION, Anjo (JP)

( * ) Notice: Subject to any disclaimer, the term of this patent is extended or adjusted under 35 U.S.C. 154(b) by 733 days.

(21) Appl. No.: 16/935,376

(22) Filed: Jul. 22, 2020

(65) Prior Publication Data

US 2021/0060755 A1 Mar. 4, 2021

(30) Foreign Application Priority Data

Aug. 30, 2019 (JP) .................................. 2019-159146

(51) Int. Cl.
| | |
|---|---|
| B25F 5/00 | (2006.01) |
| B25F 5/02 | (2006.01) |
| H02K 7/14 | (2006.01) |
| H02K 11/33 | (2016.01) |
| H02K 11/28 | (2016.01) |
| B25B 21/02 | (2006.01) |

(52) U.S. Cl.
CPC ............... *B25F 5/02* (2013.01); *H02K 7/145* (2013.01); *H02K 11/28* (2016.01); *H02K 11/33* (2016.01); *B25B 21/02* (2013.01)

(58) Field of Classification Search
CPC .................................. B25D 17/24; B25F 5/02
See application file for complete search history.

(56) References Cited

U.S. PATENT DOCUMENTS

| | | | | |
|---|---|---|---|---|
| 2009/0223691 | A1* | 9/2009 | Ikuta ...................... | B25D 17/26 |
| | | | | 173/171 |
| 2010/0175903 | A1* | 7/2010 | Ikuta .................... | B25D 11/125 |
| | | | | 173/117 |
| 2015/0328764 | A1* | 11/2015 | Yoshikane ................ | B25F 5/02 |
| | | | | 173/104 |
| 2016/0279782 | A1* | 9/2016 | Ullrich .................... | B25D 16/00 |
| 2018/0099394 | A1* | 4/2018 | Ichikawa ............. | B25D 17/043 |
| 2018/0297186 | A1* | 10/2018 | Iida ......................... | B25D 17/24 |

(Continued)

FOREIGN PATENT DOCUMENTS

| | | | |
|---|---|---|---|
| CN | 102601778 A | 7/2012 | |
| EP | 1832394 A1 * | 9/2007 | ............. B25D 17/24 |

(Continued)

OTHER PUBLICATIONS

Feb. 28, 2023 Office Action issued in Japanese Patent Application No. 2019-159146.

(Continued)

*Primary Examiner* — Eyamindae C Jallow
(74) *Attorney, Agent, or Firm* — Oliff PLC

(57) ABSTRACT

Breakage of a controller in an electric work machine and components around the controller is reduced. The electric work machine includes a motor, a trigger switch operated to activate the motor, a controller that controls the motor, a housing including a grip on which the trigger switch is located and a controller compartment accommodating the controller, and a deformation reducing member located at an interface between the grip and the controller compartment to reduce deformation of the housing.

18 Claims, 52 Drawing Sheets

(56) References Cited

U.S. PATENT DOCUMENTS

| | | | |
|---|---|---|---|
| 2019/0118365 A1* | 4/2019 | Yoshikane | ........... B25D 11/125 |
| 2019/0291255 A1* | 9/2019 | Yoshikane | ............. B25D 17/24 |
| 2020/0078919 A1* | 3/2020 | Machida | .............. B25D 17/043 |
| 2021/0331304 A1* | 10/2021 | Machida | ................ B25D 17/24 |

FOREIGN PATENT DOCUMENTS

| | | |
|---|---|---|
| JP | 2005-169533 A | 6/2005 |
| JP | 2012-148381 A | 8/2012 |
| JP | 2019-130623 A | 8/2019 |

OTHER PUBLICATIONS

Apr. 13, 2023 Office Action issued in Chinese Patent Application No. 202010847973.4.

Jul. 25, 2023 Office Action issued in Japanese Application No. 2019-159146.

* cited by examiner

ELECTRIC WORK MACHINE

CROSS-REFERENCE TO RELATED APPLICATIONS

This application claims the benefit of priority to Japanese Patent Application No. 2019-159146, filed on Aug. 30, 2019, the entire contents of which are hereby incorporated by reference.

BACKGROUND

1. Technical Field

The present disclosure relates to an electric work machine.

2. Description of the Background

In the technical field of electric work machines, a known power tool includes a controller, as described in, for example, Japanese Unexamined Patent Application Publication No. 2019-130623.

BRIEF SUMMARY

The controller includes a control board. When, for example, an electric work machine falls, the controller receiving an external force, components around the controller, or both may be broken.

One or more aspects of the present disclosure are directed to reducing breakage of a controller in an electric work machine and components around the controller.

An aspect of the present disclosure provides an electric work machine, including:
- a motor;
- a trigger switch operated to activate the motor;
- a controller configured to control the motor;
- a housing including
  - a grip on which the trigger switch is located, and
  - a controller compartment accommodating the controller; and
- a deformation reducing member located at an interface between the grip and the controller compartment to reduce deformation of the housing.

The above aspect of the present disclosure reduces breakage of a controller in an electric work machine and components around the controller.

DETAILED DESCRIPTION

Although one or more embodiments of the present disclosure will now be described with reference to the drawings, the present disclosure is not limited to the embodiments. The components in the embodiments described below may be combined as appropriate. One or more components may be eliminated.

In the embodiments, the positional relationships between the components will be described using the directional terms such as right, left, front, rear, up, and down. The terms indicate relative positions or directions with respect to the center of an electric work machine. The electric work machine according to the embodiments is a power tool 1 including a motor 6.

In the embodiments, a direction parallel to a rotation axis AX of the motor 6 is referred to as an axial direction. A direction about the rotation axis AX is referred to as a circumferential direction or circumferentially, or rotation direction. A direction radial from the rotation axis AX is referred to as a radial direction or radially.

The rotation axis AX extends in a front-rear direction. A position nearer the rotation axis AX in the radial direction, or a radial direction toward the rotation axis AX is referred to as radially inside or radially inward. A position farther from the rotation axis AX in the radial direction, or a radial direction away from the rotation axis AX is referred to as radially outside or radially outward.

Overview of Power Tool

Figure 1:
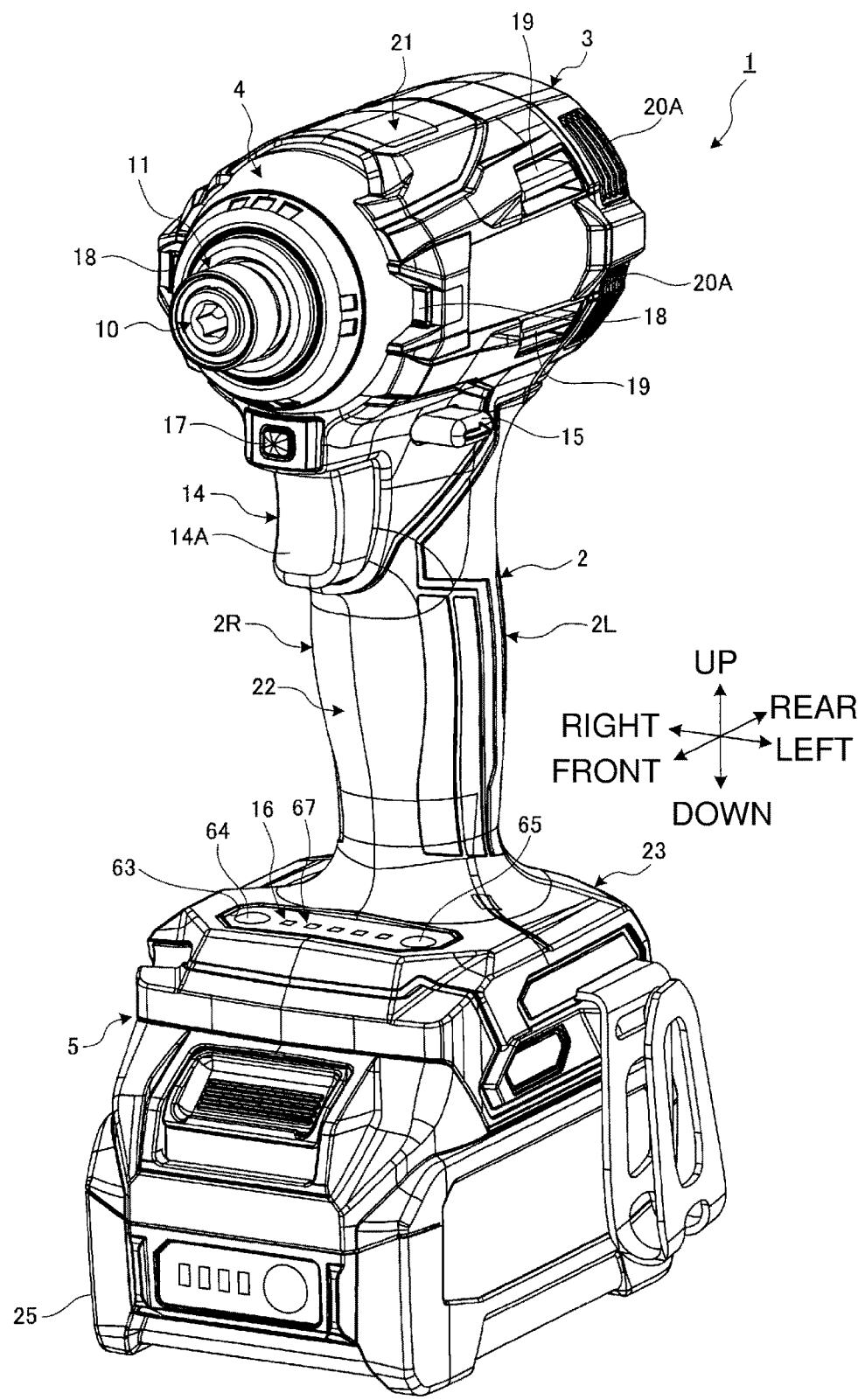
FIG. 1 is a perspective view of a power tool according to an embodiment.
Figure 2:
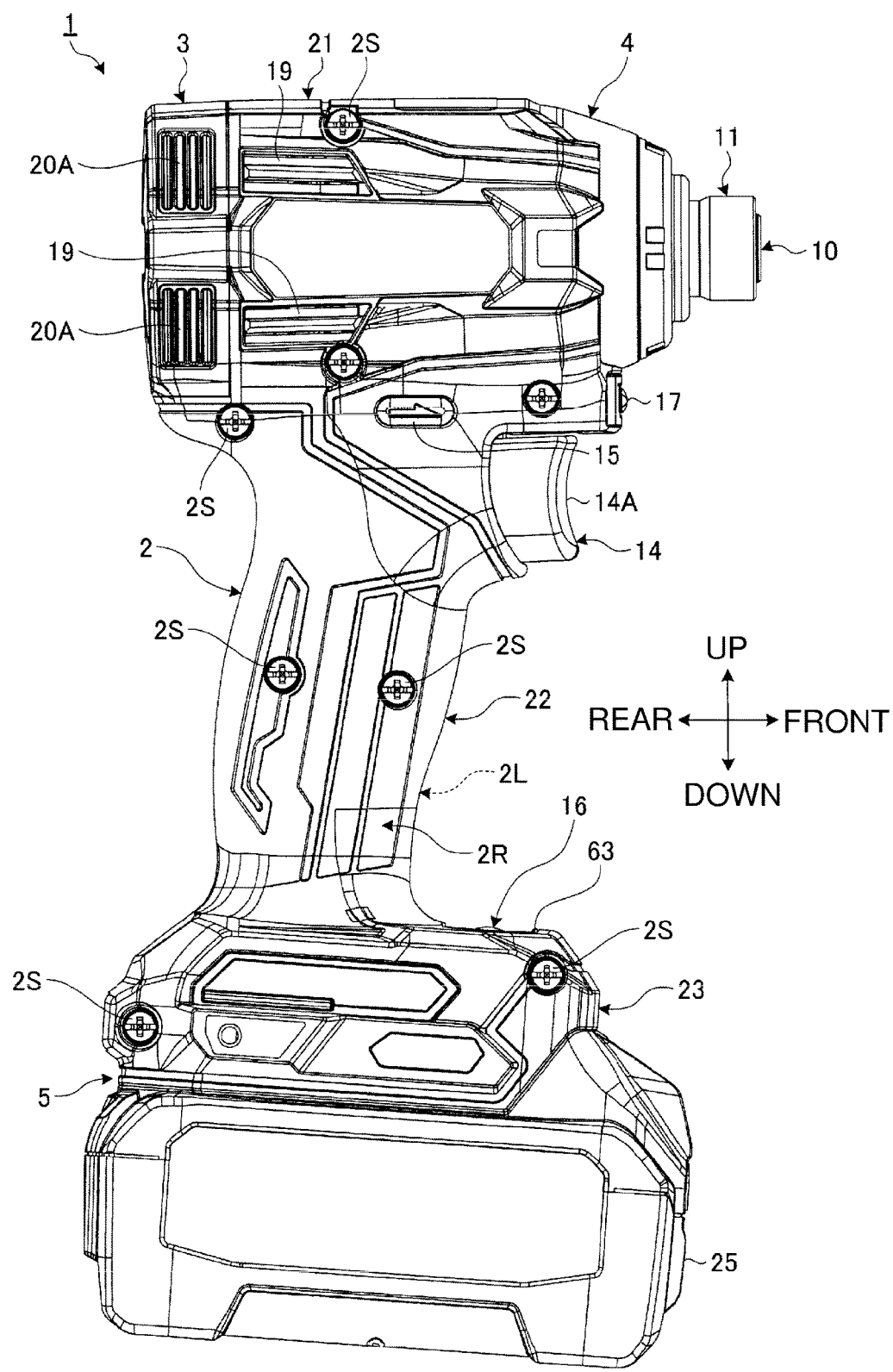
FIG. 2 is a side view of the power tool according to the embodiment.
Figure 3:
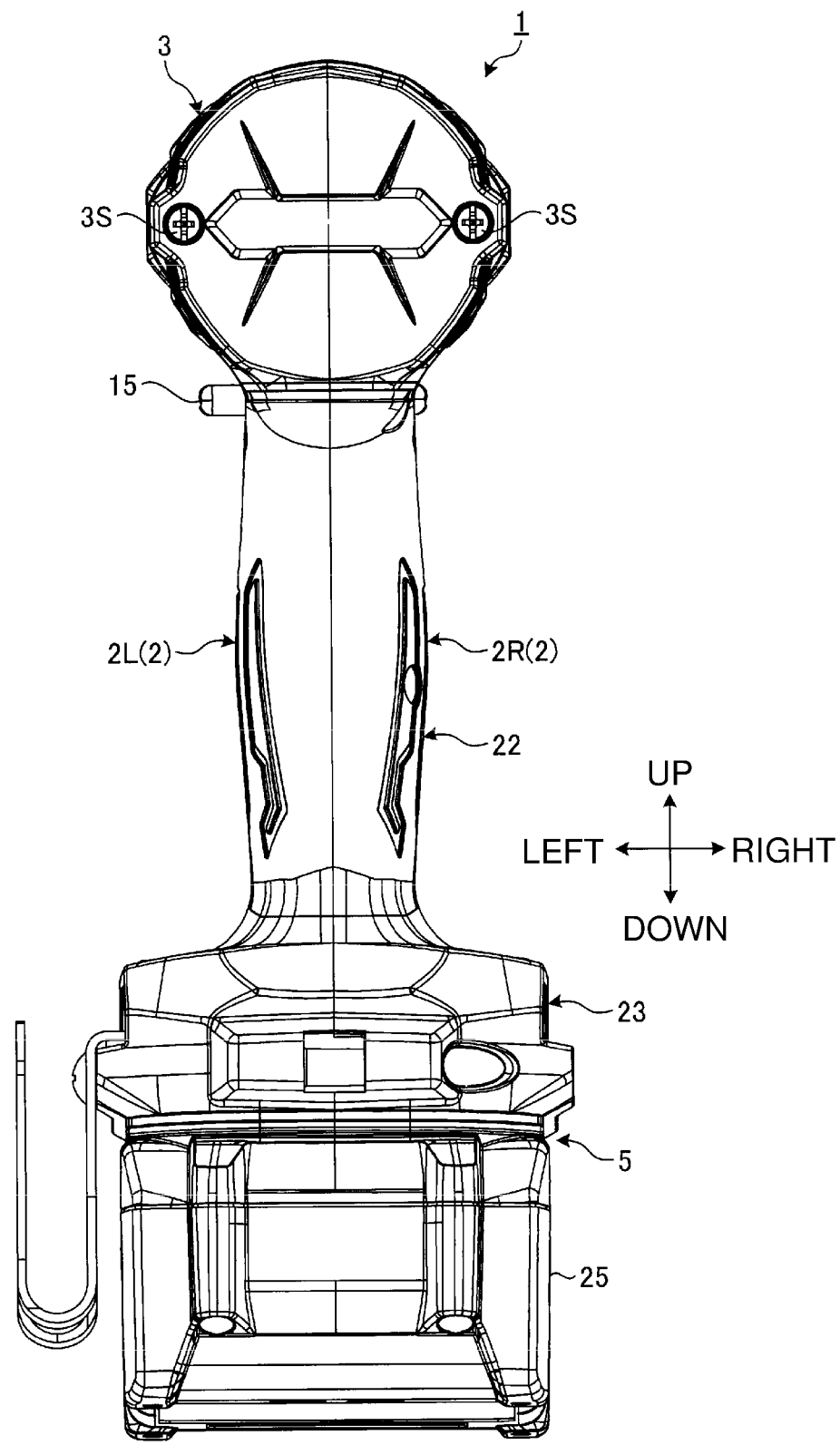
FIG. 3 is a rear view of the power tool according to the embodiment.
Figure 4:
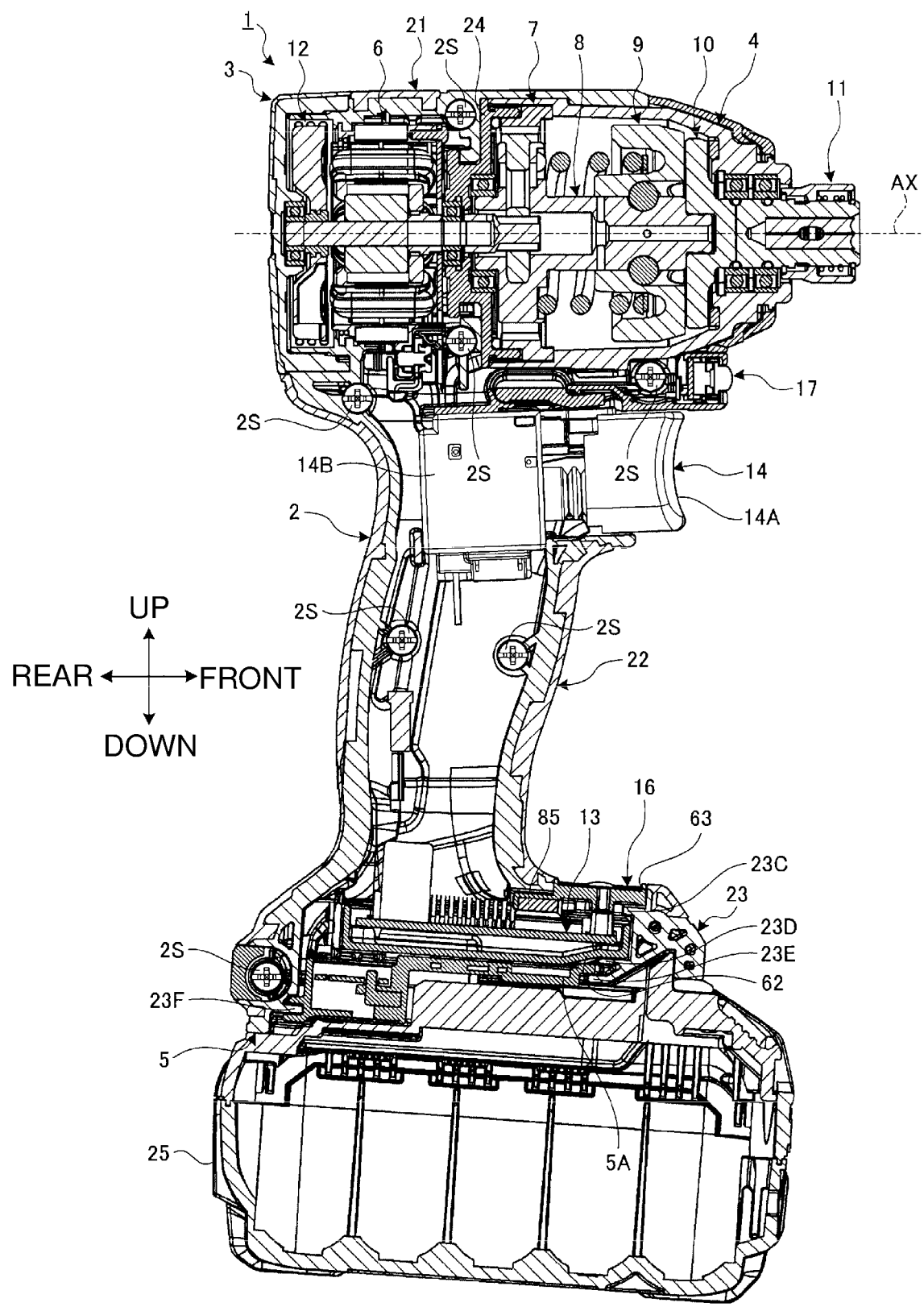
FIG. 4 is a sectional view of the power tool according to the embodiment.
Figure 5:
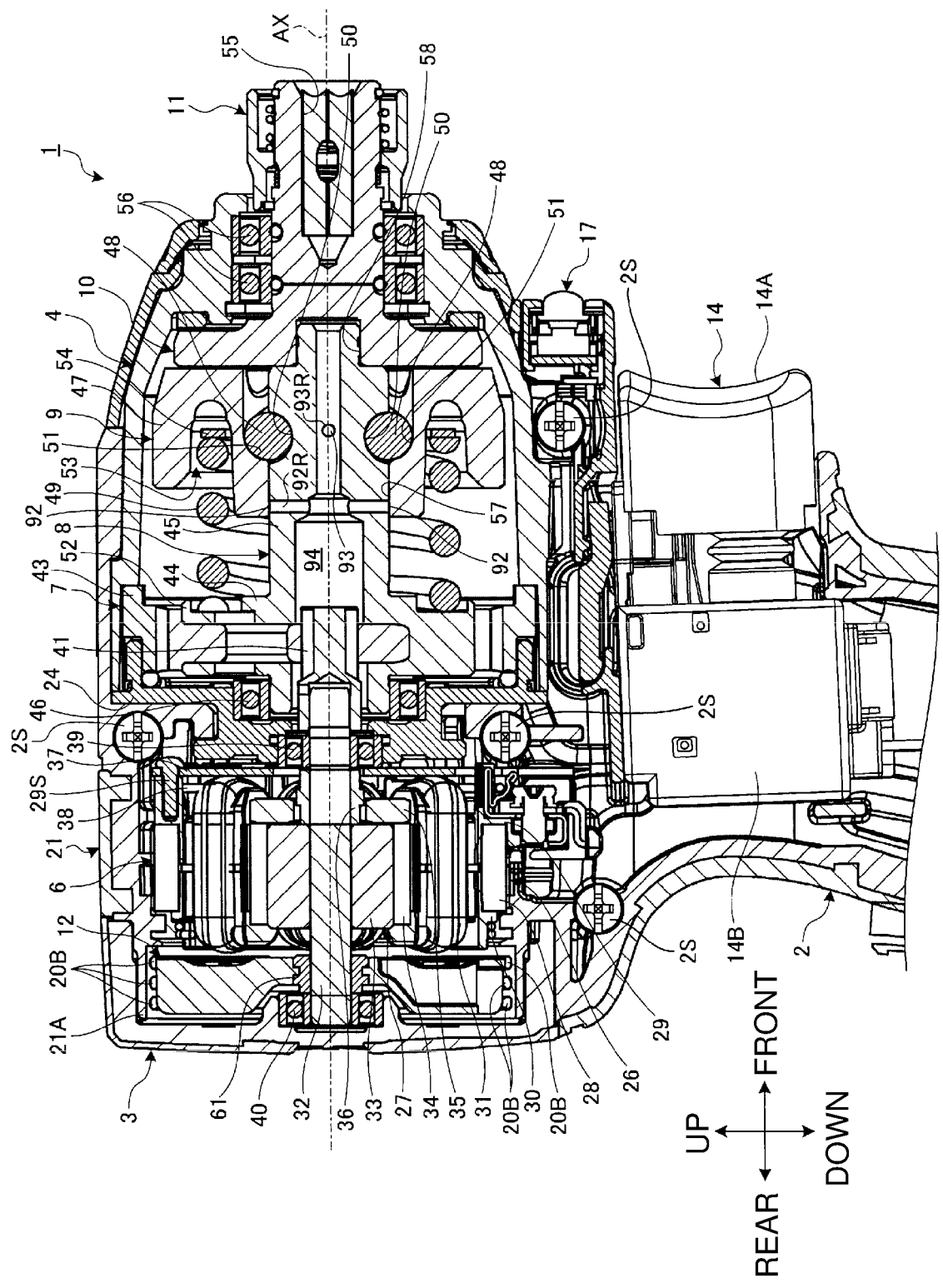
FIG. 5 is an enlarged sectional view of an upper portion of the power tool according to the embodiment.
Figure 6:
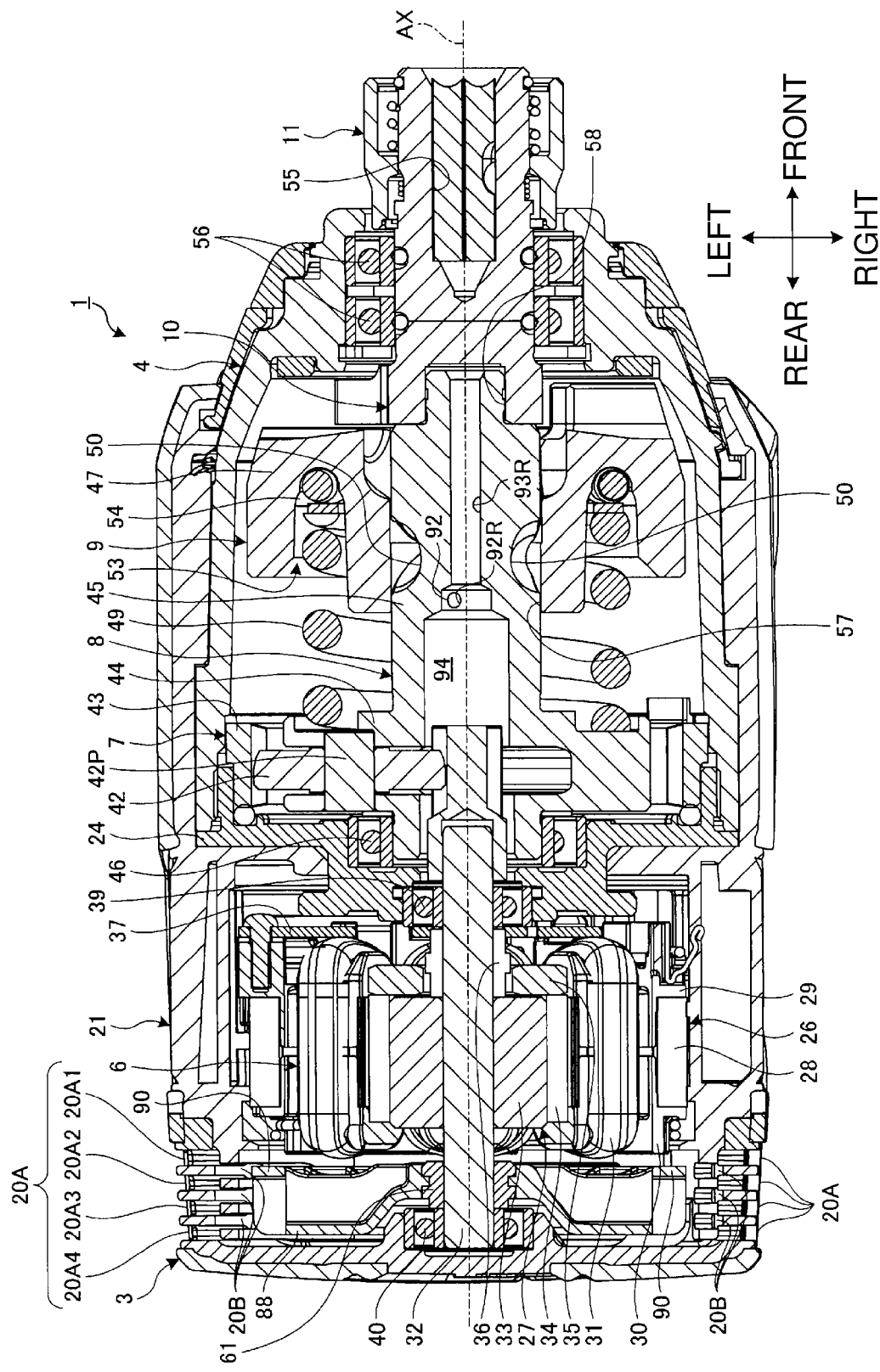
FIG. 6 is an enlarged sectional view of the upper portion of the power tool according to the embodiment.

FIG. 1 is a perspective view of the power tool 1 according to an embodiment. FIG. 2 is a side view of the power tool 1 according to the embodiment. FIG. 3 is a rear view of the power tool 1 according to the embodiment. FIG. 4 is a sectional view of the power tool 1 according to the embodiment. FIG. 5 is an enlarged longitudinal sectional view of an upper portion of the power tool 1 according to the embodiment. FIG. 6 is an enlarged cross-sectional view of the upper portion of the power tool 1 according to the embodiment.

The power tool 1 according to the embodiment is an impact driver. The power tool 1 includes a housing 2, a rear case 3, a hammer case 4, a battery mount 5, the motor 6, a reduction mechanism 7, a spindle 8, an impact mechanism 9, an anvil 10, a chuck sleeve 11, a fan 12, a controller 13, a trigger switch 14, a forward-reverse switch lever 15, an operation panel 16, a mode changing switch (mode switch) 17, and an illumination lamp 18.

The housing 2 is formed from a synthetic resin. The housing 2 in the embodiment is formed from nylon. The housing 2 includes a left housing 2L and a right housing 2R. The right housing 2R is located on the right of the left housing 2L. As shown in FIGS. 2, 4, and 5, the left and right housings 2L and 2R are fastened together with multiple screws 2S. The housing 2 includes a pair of housing halves.

The housing 2 includes a motor compartment 21, a grip 22, and a controller compartment 23. The grip 22 is located below the motor compartment 21. The controller compartment 23 is located below the grip 22.

The motor compartment 21 is cylindrical. The motor compartment 21 accommodates at least a part of the motor 6.

The grip 22 protrudes downward from the motor compartment 21. The trigger switch 14 is located on the grip 22. The grip 22 is gripped by an operator.

The controller compartment 23 is connected to a lower end of the grip 22. The controller compartment 23 accommodates the controller 13. The controller compartment 23 has larger outer dimensions than the grip 22 in the front-rear and lateral directions.

The rear case 3 is formed from a synthetic resin. The rear case 3 is located behind the motor compartment 21. The rear case 3 accommodates at least a part of the fan 12. The rear case 3 covers a rear opening of the motor compartment 21. As shown in FIG. 3, the rear case 3 is fastened to the motor compartment 21 with two screws 3S.

The motor compartment 21 has inlets 19 and first outlets 20B. The first outlets 20B are formed in a cylinder 21A in a rear portion of the motor compartment 21. The rear case 3 has second outlets 20A. Air outside the housing 2 flows into the internal space of the housing 2 through the inlets 19. Air in the internal space of the housing 2 passes through the first outlets 20B and then the second outlets 20A. Air in the internal space of the housing 2 flows out of the housing 2 through the first and second outlets 20B and 20A.

The hammer case 4 is formed from metal. The hammer case 4 in the embodiment is formed from aluminum. The hammer case 4 is located in front of the motor compartment 21. The hammer case 4 is cylindrical. The hammer case 4 has a smaller inner diameter in its front portion than in its rear portion. The rear portion of the hammer case 4 is received in a front opening of the motor compartment 21. The rear portion of the hammer case 4 is fitted into the motor compartment 21. The motor compartment 21 and the hammer case 4 are connected with a bearing retainer 24. The bearing retainer 24 is located at least partially in the hammer case 4.

The hammer case 4 accommodates at least parts of the reduction mechanism 7, the spindle 8, the impact mechanism 9, and the anvil 10. The reduction mechanism 7 is located at least partially in the bearing retainer 24.

The battery mount 5 is located below the controller compartment 23. A battery pack 25 is detachable from the battery mount 5. The battery pack 25 may be a secondary battery. The battery pack 25 according to the embodiment may be a rechargeable lithium-ion battery. The battery pack 25 is attached to the battery mount 5 of power the power tool 1. The motor 6 is driven by electrical power supplied from the battery pack 25. The controller 13 and the operation panel 16 operate on power supplied from the battery pack 25.

The motor 6 is a rotating power source for the power tool 1. The motor 6 is an inner-rotor brushless motor. The motor 6 includes a stator 26 and a rotor 27. The rotor 27 is located inside the stator 26.

The stator 26 includes a stator core 28, a front insulator 29, a rear insulator 30, and multiple coils 31. The front insulator 29 is located on the front of the stator core 28. The rear insulator 30 is located on the rear of the stator core 28. The coils 31 are wound around the stator core 28 with the front insulator 29 and the rear insulator 30 in between.

The stator core 28 includes multiple steel plates stacked on one another. The steel plates are metal plates formed from iron as a main component. The stator core 28 is cylindrical. The stator core 28 has multiple teeth to support the coils 31. The front insulator 29 and the rear insulator 30 are electrical insulating members formed from a synthetic resin. The front insulator 29 partially covers the surfaces of the teeth. The rear insulator 30 partially covers the surfaces of the teeth. The coils 31 surround the teeth with the front insulator 29 and the rear insulator 30 in between. The coils 31 and the stator core 28 are electrically insulated from each other using the front insulator 29 and the rear insulator 30.

The rotor 27 rotates about the rotation axis AX. The rotor 27 includes a rotor shaft 32, a rotor core 33, a permanent magnet 34, and a sensor permanent magnet 35. The rotor core 33 surrounds the rotor shaft 32. The permanent magnet 34 surrounds the rotor core 33. The rotor shaft 32 extends in the axial direction. The rotor core 33 is cylindrical. The rotor core 33 includes multiple steel plates stacked on one another. The permanent magnet 34 is cylindrical. The permanent magnet 34 includes first permanent magnets with a first polarity and second permanent magnets with a second polarity. The first permanent magnets and the second permanent magnets alternate in the circumferential direction in the cylindrical permanent magnet 34. The sensor permanent magnet 35 is located in front of the rotor core 33 and the permanent magnet 34. A resin sleeve 36 is located at least partially inside the sensor permanent magnet 35. The resin sleeve 36 is cylindrical. The resin sleeve 36 is attached to a front portion of the rotor shaft 32.

A sensor board 37 and a coil terminal 38 are attached to the front insulator 29. The sensor board 37 and the coil terminal 38 are fastened to the front insulator 29 with a screw 29S. The sensor board 37 includes an annular circuit board, and a rotation detecting element that is supported on the circuit board. The rotation detecting element detects the position of the sensor permanent magnet 35 in the rotor 27 to detect the position of the rotor 27 in the rotation direction. The coil terminal 38 connects the multiple coils 31 to three power supply lines from the controller 13.

The rotor shaft 32 is rotatably supported by a front bearing 39 and a rear bearing 40. The front bearing 39 is held by the bearing retainer 24. The rear bearing 40 is held by the rear case 3. The front bearing 39 supports the front portion of the rotor shaft 32. The rear bearing 40 supports a rear portion of the rotor shaft 32. The front end of the rotor shaft 32 is located in the internal space of the hammer case 4 through an opening of the bearing retainer 24.

A pinion gear 41 is located at the front end of the rotor shaft 32. The rotor shaft 32 is connected to the reduction mechanism 7 via the pinion gear 41.

The reduction mechanism 7 is located in front of the motor 6. The reduction mechanism 7 connects the rotor shaft 32 and the spindle 8 together. The reduction mechanism 7 transmits power generated by the motor 6 to the spindle 8. The reduction mechanism 7 rotates the spindle 8 at a lower rotational speed than the rotor shaft 32. The reduction mechanism 7 includes a planetary gear mechanism.

The reduction mechanism 7 includes multiple planetary gears 42 and an internal gear 43. The multiple planetary gears 42 surround the pinion gear 41. The internal gear 43 surrounds the multiple planetary gears 42. Each of the planetary gears 42 meshes with the pinion gear 41. The planetary gears 42 are rotatably supported by the spindle 8 via a pin 42P. The internal gear 43 includes internal teeth that mesh with the planetary gears 42. The internal gear 43 is fixed to the hammer case 4. The internal gear 43 is constantly nonrotatable relative to the hammer case 4.

When the rotor shaft 32 rotates as driven by the motor 6, the pinion gear 41 rotates, and the planetary gears 42 revolve about the pinion gear 41. The planetary gears 42 revolve while meshing with the internal teeth of the internal gear 43. The revolving planetary gears 42 rotate the spindle 8, connected to the planetary gears 42 via the pin 42P, at a lower rotational speed than the rotor shaft 32.

The spindle 8 is located frontward from the motor 6. The spindle 8 is located at least partially in front of the reduction mechanism 7. The spindle 8 includes a flange 44 and a rod 45. The rod 45 protrudes frontward from the flange 44. The planetary gears 42 are rotatably supported by the flange 44 via the pin 42P. The rotation axis of the spindle 8 aligns with the rotation axis AX of the motor 6. The spindle 8 rotates about the rotation axis AX. The spindle 8 is rotatably supported by a rear bearing 46. The rear bearing 46 is held by the bearing retainer 24. The rear bearing 46 supports the rear end of the spindle 8.

The spindle 8 includes first feed ports 93 and second feed ports 92. The first and second feed ports 93 and 92 feed lubricating oil. The lubricating oil includes grease. The first and second feed ports 93 and 92 are formed in the rod 45. The spindle 8 has an internal space 94 that contains the lubricating oil. The first feed ports 93 connect with the internal space 94 through a first channel 93R. The second feed ports 92 connect with the internal space 94 through a second channel 92R. The lubricating oil is fed at least partially around the spindle 8 through the first and second feed ports 93 and 92 by the centrifugal force of the spindle 8.

The impact mechanism 9 strikes the anvil 10 in the rotation direction in response to rotation of the spindle 8. The impact mechanism 9 includes a hammer 47, balls 48, and a coil spring 49. The hammer 47 partially surrounds the spindle 8. The balls 48 are located between the spindle 8 and the hammer 47. The coil spring 49 is supported by the spindle 8 and the hammer 47. The hammer 47 is located frontward from the reduction mechanism 7.

Figure 7:
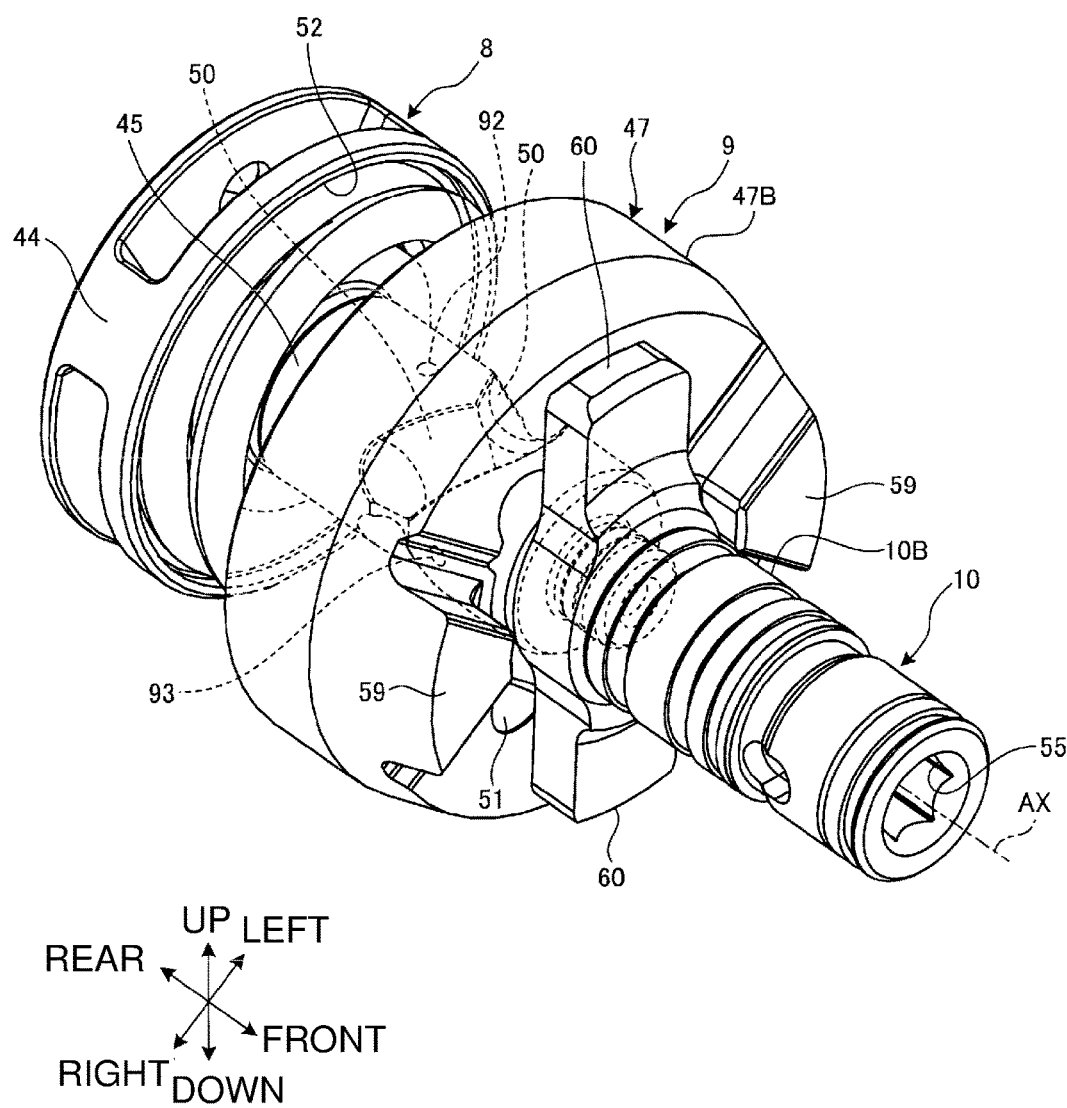
FIG. 7 is a perspective view of a spindle, an impact mechanism, and an anvil in the embodiment.
Figure 8:
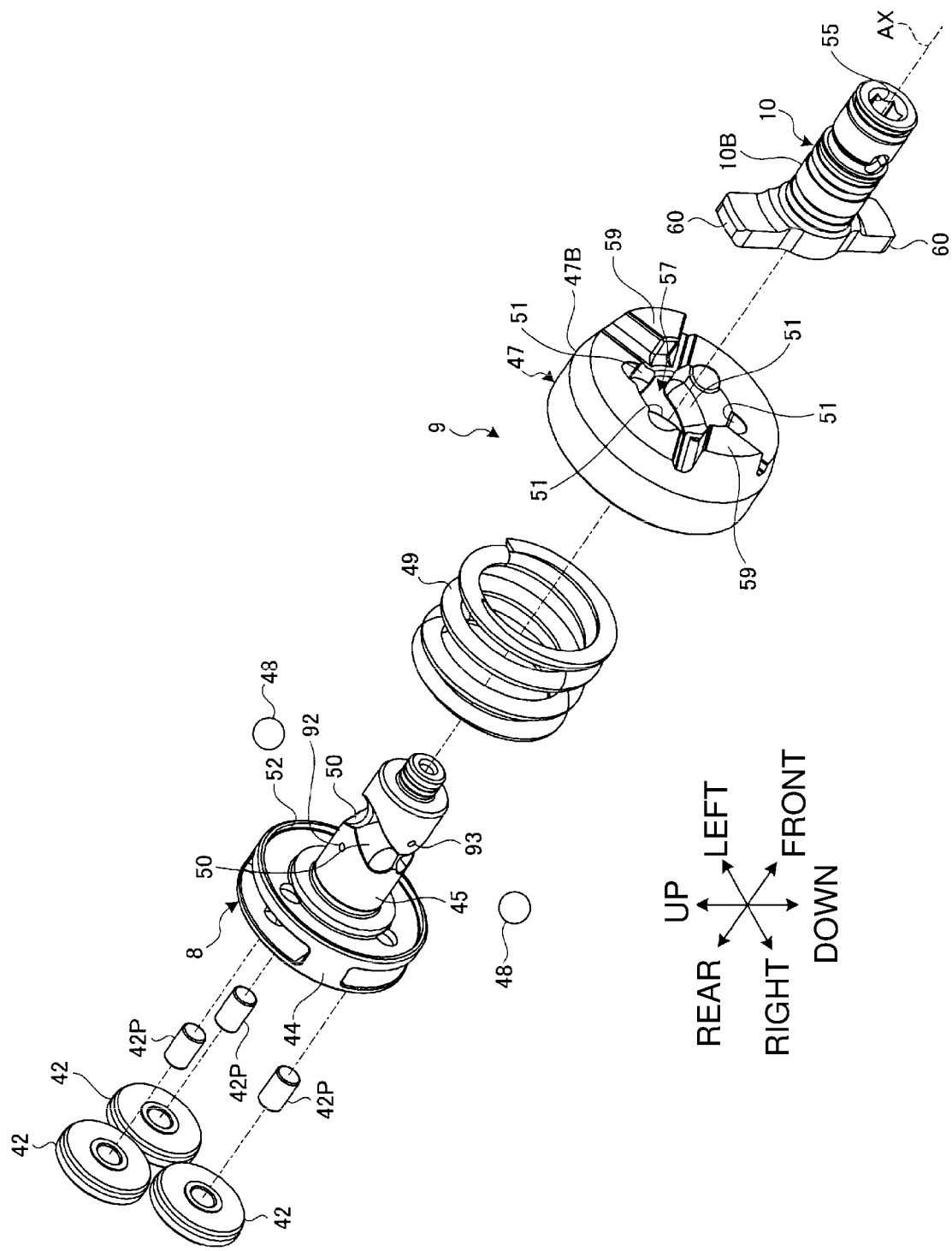
FIG. 8 is an exploded front perspective view of the spindle, the impact mechanism, and the anvil in the embodiment.

FIG. 7 is a perspective view of the spindle 8, the impact mechanism 9, and the anvil 10 in the embodiment. FIG. 8 is an exploded front perspective view of the spindle 8, the impact mechanism 9, and the anvil 10 in the embodiment.

Figure 9:
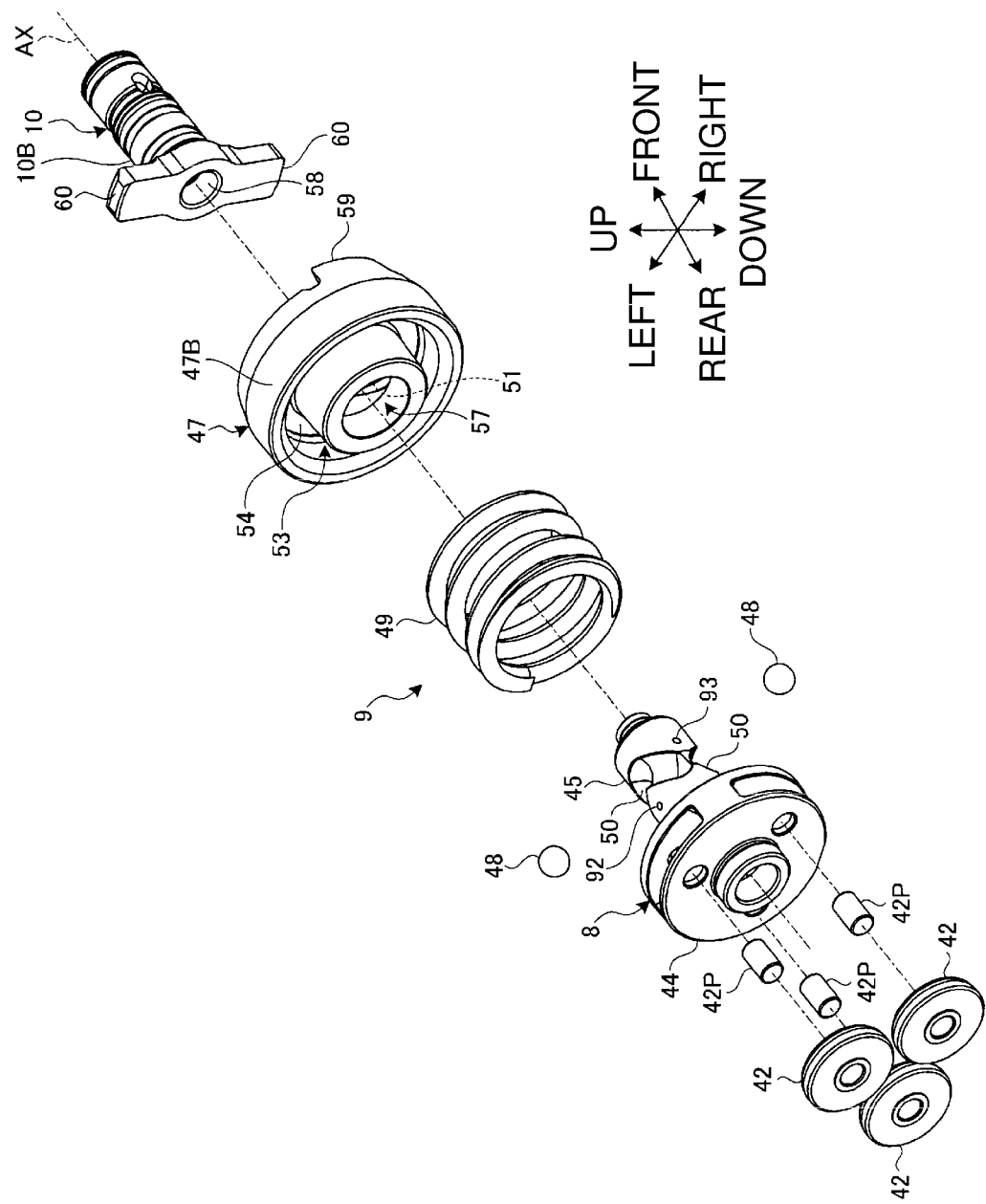
FIG. 9 is an exploded rear perspective view of the spindle, the impact mechanism, and the anvil in the embodiment.

FIG. 9 is an exploded rear perspective view of the spindle 8, the impact mechanism 9, and the anvil 10 in the embodiment. FIG. 7 does not show the balls 48 and the coil spring 49.

As shown in FIGS. 4 to 9, the hammer 47 is cylindrical. The hammer 47 surrounds the rod 45. The hammer 47 has a hole 57 that receives the rod 45. The hammer 47 and the spindle 8 are rotatable together. The rotation axis of the hammer 47 aligns with the rotation axis AX of the motor 6.

The balls 48 are formed from metal such as steel. The balls 48 are located between the rod 45 and the hammer 47. The spindle 8 has a spindle groove 50 that receives at least parts of the balls 48. The spindle groove 50 is formed in a portion of the outer surface of the rod 45. The hammer 47 has a hammer groove 51 that receives at least parts of the balls 48. The hammer groove 51 is formed in a portion of the inner surface of the hammer 47. The balls 48 are located between the spindle groove 50 and the hammer groove 51. The balls 48 roll along the spindle groove 50 and the hammer groove 51. The hammer 47 is movable together with the balls 48. The spindle 8 and the hammer 47 are movable relative to each other in the axial direction and in the rotation direction within a movable range defined by the spindle groove 50 and the hammer groove 51.

The coil spring 49 generates an elastic force for moving the hammer 47 forward. The coil spring 49 is located between the flange 44 and the hammer 47. An annular ridge 52 is located on a front surface of the flange 44. The ridge 52 protrudes frontward from the rim of the front surface of the flange 44. An annular recess 53 is formed on a rear surface of the hammer 47. The recess 53 is recessed frontward from the rear surface of the hammer 47. A washer 54 is received in the recess 53. The rear end of the coil spring 49 is located inside the ridge 52 and supported by the flange 44. The front end of the coil spring 49 is received in the recess 53 and supported by the washer 54.

The anvil 10 is located in front of the hammer 47. The anvil 10 has an insertion hole 55 that receives a tip tool. The insertion hole 55 is formed in the front end of the anvil 10. The tip tool is attached to the anvil 10. The anvil 10 has a hole 58 that receives the front end of the rod 45. The hole 58 is formed in the rear end of the anvil 10. The front end of the rod 45 is received in the hole 58.

The anvil 10 is rotatable together with the hammer 47. The rotation axis of the anvil 10 aligns with the rotation axis AX of the motor 6. The anvil 10 is rotatably supported by a pair of front bearings 56. The pair of front bearings 56 are held by the hammer case 4.

The hammer 47 includes a cylindrical body 47B and hammer protrusions 59. The recess 53 is formed on the rear surface of the body 47B. The hammer protrusions 59 are located in the front of the body 47B. The hammer 47 includes two hammer protrusions 59. The hammer protrusions 59 protrude frontward from the front of the body 47B.

The anvil 10 includes a rod-like body 10B and anvil protrusions 60. The insertion hole 55 is formed in the front end of the body 10B. The anvil protrusions 60 are located at the rear end of the anvil 10. The anvil 10 includes two anvil protrusions 60. The anvil protrusions 60 protrude radially outward from the rear end of the body 10B.

The hammer protrusions 59 and the anvil protrusions 60 can come in contact with each other. When the motor 6 operates while the hammer protrusions 59 and the anvil protrusions 60 are in contact with each other, the anvil 10 rotates together with the hammer 47 and the spindle 8.

The anvil 10 is struck by the hammer 47 in the rotation direction. When, for example, the anvil 10 receives a higher load in a screw fastening operation, the anvil 10 may fail to rotate with power generated by the motor 6 alone. When the anvil 10 fails to rotate with power generated by the motor 6 alone, the anvil 10 and the hammer 47 stop rotating. The spindle 8 and the hammer 47 are movable relative to each other in the axial direction and in the circumferential direction via the balls 48. Although the hammer 47 stops rotating, the spindle 8 continues to rotate with power generated by the motor 6. When the hammer 47 stops rotating and the spindle 8 rotates, the balls 48 move rearward as being guided along the spindle groove 50 and the hammer groove 51. The hammer 47 receives a force from the balls 48 to move rearward with the balls 48. In other words, the hammer 47 moves rearward when the anvil 10 stops rotating and the spindle 8 rotates. As the hammer 47 moves rearward, the hammer protrusions 59 are apart from the anvil protrusions 60.

The coil spring 49 urges the hammer 47 forward. The hammer 47 moving rearward moves forward under the elastic force from the coil spring 49. When moving forward, the hammer 47 receives a force in the rotation direction from the balls 48. In other words, the hammer 47 moves forward while rotating. When the hammer 47 moves forward while rotating, the hammer protrusions 59 come in contact with the anvil protrusions 60 while rotating. Thus, the anvil protrusions 60 are struck by the hammer protrusions 59 in the rotation direction. The anvil 10 receives power from the motor 6 and the inertial force from the hammer 47. The anvil 10 thus rotates about the rotation axis AX at high torque.

The chuck sleeve 11 surrounds a front portion of the anvil 10. The chuck sleeve 11 holds a tip tool received in the insertion hole 55.

As shown in FIGS. 4 and 5, the fan 12 is located behind the motor 6. The fan 12 generates an airflow for cooling the motor 6. The fan 12 is fastened to at least a part of the rotor 27. The fan 12 is fastened to the rear portion of the rotor shaft 32 with a bush 61. The fan 12 is located between the rear bearing 40 and the stator 26. The fan 12 rotates as the rotor 27 rotates. The fan 12 and the rotor shaft 32 rotate together. As the fan 12 rotates, air outside the housing 2 flows into the internal space of the housing 2 through the inlets 19. Air flowing into the internal space of the housing 2 flows through the housing 2 and cools the motor 6. The air passing through the housing 2 flows out of the housing 2 through the first and second outlets 20B and 20A.

As shown in FIG. 4, the controller 13 is accommodated in the controller compartment 23. The controller 13 outputs control signals for controlling the motor 6. The controller 13 includes a board on which multiple electronic components are mounted. Examples of the electronic components mounted on the board include a processor such as a central processing unit (CPU), a nonvolatile memory such as a read-only memory (ROM) or a storage device, a volatile memory such as a random-access memory (RAM), a transistor, and a resistor.

The power tool 1 includes a controller case 62. The controller case 62 accommodates at least a part of the controller 13. The controller case 62 is located in the internal space of the controller compartment 23.

The controller 13 changes the control mode of the motor 6 in accordance with the operation of the power tool 1. The control mode of the motor 6 refers to a method or pattern for controlling the motor 6.

As shown in FIGS. 1, 4, and 5, the trigger switch 14 is located on the grip 22. The trigger switch 14 is operated by the operator to activate the motor 6. The trigger switch 14 includes a trigger 14A and a switch circuit 14B. The switch circuit 14B is accommodated in the grip 22. The trigger 14A protrudes frontward from the upper front of the grip 22. The trigger 14A is operable by the operator. The trigger 14A is operated to switch the motor 6 between the driving state and the stopped state.

As shown in FIG. 1, the forward-reverse switch lever 15 is located in an upper portion of the grip 22. The forward-reverse switch lever 15 is operated by the operator. The forward-reverse switch lever 15 is operated to switch the rotation direction of the motor 6 between forward and reverse. This operation switches the rotation direction of the spindle 8.

As shown in FIGS. 1 and 4, the operation panel 16 is located in the controller compartment 23. The operation panel 16 is operable by the operator to change the control mode of the motor 6. The operation panel 16 has a plate shape. The controller compartment 23 has an opening 63 to receive the operation panel 16. The opening 63 is formed in the upper surface of the controller compartment 23 frontward from the grip 22. The operation panel 16 is received at least partially in the opening 63.

The operation panel 16 includes an impact force changing switch (impact switch) 64 and a specific mode changing switch (specific switch) 65. The impact switch 64 and the specific switch 65 are operated by the operator. At least either the impact switch 64 or the specific switch 65 changes the control mode of the motor 6.

The mode switch 17 is located above the trigger 14A. The mode switch 17 is operated by the operator. The mode switch 17 changes the control mode of the motor 6.

The illumination lamps 18 are located on the right and left of the motor compartment 21. The lamps 18 emit illumination light to illuminate ahead of the power tool 1. The lamps 18 include, for example, light-emitting diodes (LEDs).

Operation of Power Tool

The operation of the power tool 1 will now be described. To perform, for example, a screw fastening operation on a workpiece, a tip tool for the screw fastening operation is placed into the insertion hole 55 in the anvil 10. The tip tool placed in the insertion hole 55 is held by the chuck sleeve 11. After the tip tool is attached to the anvil 10, the operator holds the grip 22 to operate the trigger switch 14. Thus, electrical power is supplied from the battery pack 25 to the motor 6 to activate the motor 6.

As the motor 6 is activated, the rotor shaft 32 rotates. Thus, the rotational force of the rotor shaft 32 is transmitted to the planetary gears 42 via the pinion gear 41. The planetary gears 42 revolve about the pinion gear 41 while rotating and meshing with the internal teeth of the internal gear 43. The planetary gears 42 are rotatably supported by the spindle 8 via the pin 42P. The revolving planetary gears 42 rotate the spindle 8 at a lower rotational speed than the rotor shaft 32.

When the spindle 8 rotates, with the hammer protrusions 59 and the anvil protrusions 60 in contact with each other, the anvil 10 rotates together with the hammer 47 and the spindle 8. Thus, the screw fastening operation proceeds.

When the anvil 10 receives a predetermined or higher load as the screw fastening operation proceeds, the anvil 10 and the hammer 47 stop rotating. When the hammer 47 stops rotating and the spindle 8 rotates, the hammer 47 moves rearward. Thus, the hammer protrusions 59 and the anvil protrusions 60 are apart from each other.

The hammer 47 moving rearward moves forward while rotating under the elastic force from the coil spring 49. Thus, the anvil 10 is struck by the hammer 47 in the rotation direction. The anvil 10 thus rotates about the rotation axis AX at high torque. The screw is thus fastened to the workpiece at high torque.

Controller

Figure 10:
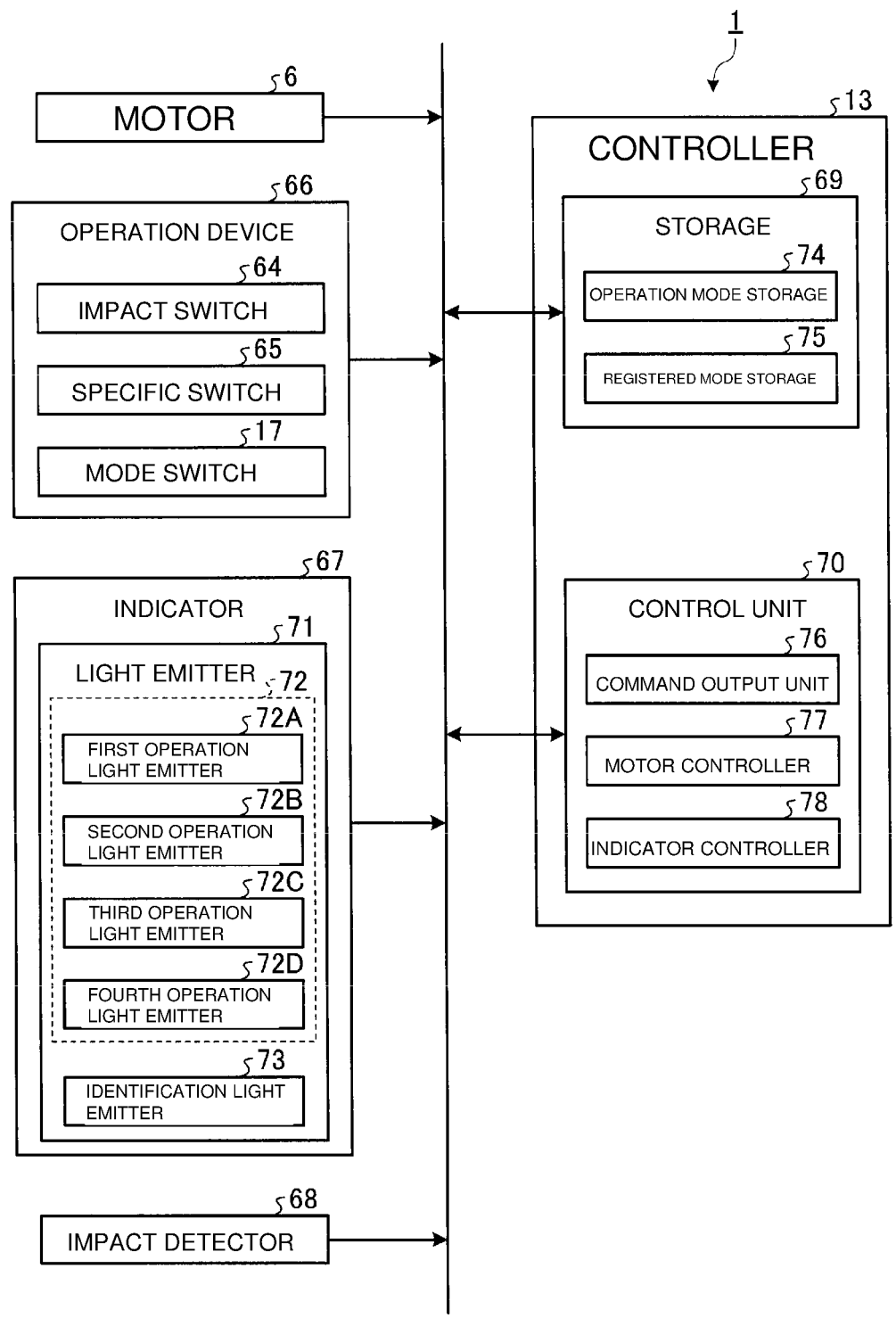
FIG. 10 is a block diagram of the power tool including a controller according to the embodiment.

FIG. 10 is a block diagram of the power tool 1 including the controller 13 according to the embodiment. The power tool 1 includes the motor 6, the controller 13, an operation device 66, an indicator 67, and an impact detector 68.

The controller 13 includes a computer system. The controller 13 changes the control mode of the motor 6 in accordance with the operation of the power tool 1.

The controller 13 includes a storage 69 and a control unit 70. The storage 69 includes a nonvolatile memory such as a ROM or a storage device. The storage 69 may include a volatile memory such as a RAM. The control unit 70 includes a processor such as a CPU.

When operated by the operator, the operation device 66 outputs operation signals. The operation device 66 includes multiple switches. The control mode of the motor 6 is set in response to the operation signals output from the operation device 66. The operation device 66 is operated to change the control mode of the motor 6. The operation device 66 in the embodiment includes the impact switch 64, the specific switch 65, and the mode switch 17. The impact switch 64 is located on the operation panel 16. The specific switch 65 is located on the operation panel 16. The mode switch 17 is located above the trigger 14A.

The indicator 67 includes light emitters 71. The light emitters 71 operate in accordance with the control mode of the motor 6 set by the operation on the operation device 66. The indicator 67 includes multiple light emitters 71. The light emitters 71 include multiple operation light emitters 72 and an identification light emitter 73. The light emitters 71 include four operation light emitters 72. More specifically, the operation light emitters 72 include a first operation light emitter 72A, a second operation light emitter 72B, a third operation light emitter 72C, and a fourth operation light emitter 72D. The light emitters 71 include one identification light emitter 73. The indicator 67 in the embodiment includes five light emitters 71.

The impact detector 68 detects the hammer 47 striking the anvil 10. The impact detector 68 includes a rotational speed sensor that detects the rotational speed of the motor 6. As the hammer 47 starts striking, the motor 6 changes its rotational speed. As detecting the rotational speed of the motor 6, the impact detector 68 detects the anvil 10 being struck.

The impact detector 68 may include a current sensor that detects a current supplied to the motor 6. As the hammer 47 starts striking, the current supplied to the motor 6 changes. The impact detector 68 detects the current supplied to the motor 6 to detect the anvil 10 being struck.

The impact detector 68 may include a vibration sensor that detects vibrations acting on the power tool 1. As the hammer 47 starts striking, the amplitude of vibrations acting on the power tool 1 changes. When detecting vibrations acting on the power tool 1, the impact detector 68 detects the anvil 10 being struck.

The storage 69 stores multiple control modes of the motor 6. The control modes in the embodiment include multiple operation modes and a registered mode selected from the multiple operation modes. The storage 69 includes an operation mode storage 74 and a registered mode storage 75. The operation mode storage 74 stores the multiple operation modes. The registered mode storage 75 stores the registered mode.

The control unit 70 outputs control signals for controlling the motor 6 and the indicator 67. The control unit 70 includes a command output unit 76, a motor controller 77, and an indicator controller 78.

Figure 11:
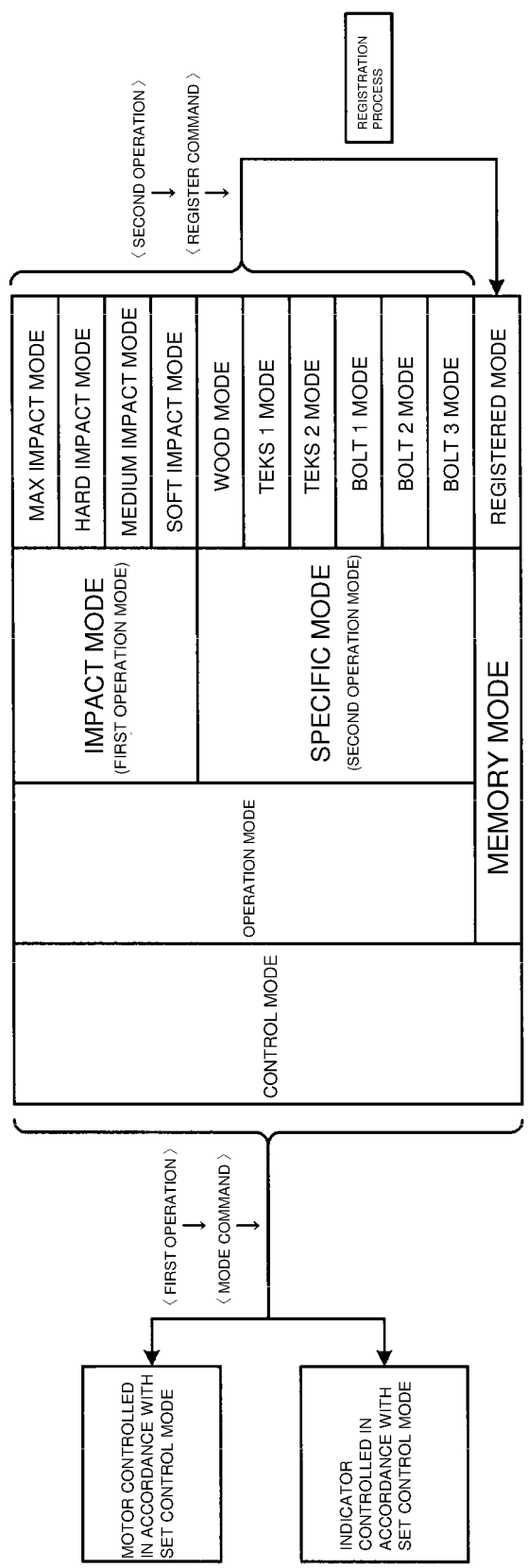
FIG. 11 is a schematic diagram showing the operation of the controller according to the embodiment.

FIG. 11 is a schematic diagram showing the operation of the controller 13 according to the embodiment. As shown in FIG. 11, the control modes of the motor 6 include the operation modes and a memory mode. The operation modes include multiple first operation modes and multiple second operation modes.

The first operation modes correspond to impact modes indicating general-purpose operation modes. The second operation modes correspond to specific modes indicating specific-purpose operation modes designed for different workpieces. The first operation modes are hereafter referred to as impact modes, and the second operation modes are hereafter referred to as specific modes.

The impact modes include a maximum (max) impact mode, a hard impact mode, a medium impact mode, and a soft impact mode. The specific modes include a wood mode, Teks modes, and bolt modes. The Teks modes include a Teks 1 mode and a Teks 2 mode. The bolt modes include a bolt 1 mode, a bolt 2 mode, and a bolt 3 mode. The memory mode includes a registered mode.

The operation mode storage 74 stores the multiple operation modes (max, hard, medium, and soft impact modes, and wood, Teks 1, Teks 2, bolt 1, bolt 2, and bolt 3 modes). The registered mode storage 75 stores the registered mode.

The operation mode storage 74 stores ten operation modes. The registered mode storage 75 stores at least one selected from the ten operation modes as a registered mode. The registered mode storage 75 in the embodiment stores a single registered mode. The storage 69 stores eleven control modes.

The indicator 67 includes five light emitters 71. The storage 69 stores the eleven control modes. In other words, the indicator 67 includes the light emitters 71, which are fewer than the control modes.

The command output unit 76 outputs a mode command for setting the control mode in response to the operation signal output from the operation device 66. The motor 6 operates in accordance with the set control mode.

In response to the operation signal output from the operation device 66, the command output unit 76 outputs a register command for registering the operation mode selected from the multiple operation modes as the registered mode with the registered mode storage 75. The registered mode storage 75 stores the selected operation mode as the registered mode.

In response to a first operation on the operation device 66, the command output unit 76 outputs a mode command. When receiving the first operation, the operation device 66 outputs a first operation signal. In response to the first operation signal output from the operation device 66, the command output unit 76 outputs a mode command for setting one of the eleven control modes stored in the storage 69.

In response to a second operation on the operation device 66, the command output unit 76 outputs a register command. When receiving the second operation, the operation device 66 outputs a second operation signal. In response to the second operation signal output from the operation device 66, the command output unit 76 outputs a register command for registering one of the ten operation modes stored in the operation mode storage 74.

In other words, in response to the mode command output through the first operation on the operation device 66, one control mode specified through the first operation is selected from the eleven control modes stored in the storage 69. The motor 6 is set to the selected control mode.

In response to the register command output through the second operation on the operation device 66, one operation mode specified through the second operation is selected from the ten operation modes stored in the operation mode storage 74. The registered mode storage 75 stores the selected operation mode as the registered mode.

Registering the operation mode selected in response to the register command with the registered mode storage 75 as a registered mode will be hereafter referred to as a registration process. Setting the motor 6 to a specific control mode will be referred to as setting a control mode. Registering the selected operation mode as the registered mode with the registered mode storage 75 will be referred to as registering an operation mode. Setting the motor 6 to the registered mode will be referred to as setting to a memory mode.

The first operation includes operating one of the multiple switches in the operation device 66. The second operation includes concurrently operating at least two of the multiple switches in the operation device 66.

In the embodiment, the first operation includes at least one of operating the impact switch 64 alone, operating the specific switch 65 alone, or operating the mode switch 17 alone.

The impact switch 64 alone is operated to cause the command output unit 76 to output a mode command for setting the impact mode. In response to the output mode command, one impact mode is selected from the four impact modes stored in the operation mode storage 74. The motor 6 is thus set to the selected impact mode.

The specific switch 65 alone is operated to cause the command output unit 76 to output a mode command for setting the specific mode. In response to the output mode command, one specific mode is selected from the six specific modes stored in the operation mode storage 74. The motor 6 is set to the selected specific mode.

The mode switch 17 alone is operated to cause the command output unit 76 to output a mode command for setting the memory mode. In response to the output mode command, the registered mode stored in the registered mode storage 75 is selected. The motor 6 is set to the memory mode.

The second operation includes at least concurrently operating the impact switch 64 and the mode switch 17 or concurrently operating the specific switch 65 and the mode switch 17.

The impact switch 64 and the mode switch 17 are concurrently operated to cause the command output unit 76 to output a register command for registering the impact mode. In response to the output register command, one impact mode is selected from the four impact modes stored in the operation mode storage 74. The selected impact mode is registered with the registered mode storage 75.

The specific switch 65 and the mode switch 17 are concurrently operated to cause the command output unit 76 to output a register command for registering the specific mode. In response to the output register command, one specific mode is selected from the six specific modes stored in the operation mode storage 74. The selected specific mode is registered with the registered mode storage 75.

In response to the mode command output from the command output unit 76, the motor controller 77 outputs a control signal for controlling the motor 6. In accordance with the control mode set through the first operation on the operation device 66, the motor controller 77 controls the motor 6.

In response to the mode command output from the command output unit 76, the indicator controller 78 outputs a control signal for controlling the indicator 67. In accordance with the control mode set through the first operation on the operation device 66, the indicator controller 78 controls the indicator 67. The indicator controller 78 individually controls the light emitters 71 in response to the mode commands.

In response to the register command output from the command output unit 76, the indicator controller 78 outputs a control signal for controlling the indicator 67. In accordance with the registration process performed through the second operation on the operation device 66, the indicator controller 78 controls the indicator 67. The indicator controller 78 individually controls the light emitters 71 in response to the register command.

The indicator controller 78 controls the operation patterns of the light emitters 71, which are fewer than the control modes, to indicate the set state of the control modes and the state of the registration process. The indicator controller 78 controls the operation patterns of the light emitters 71 to indicate the set control mode. The indicator controller 78 controls the operation patterns of the light emitters 71 to indicate the state of the registration process.

When the registration process is to be performed in response to the register command, the indicator controller 78 outputs a control signal to set the light emitters 71 to a first state. When the memory mode is set in response to the mode command, the indicator controller 78 outputs a control signal to set the light emitters 71 to a second state different from the first state.

Control Mode

Figure 12:
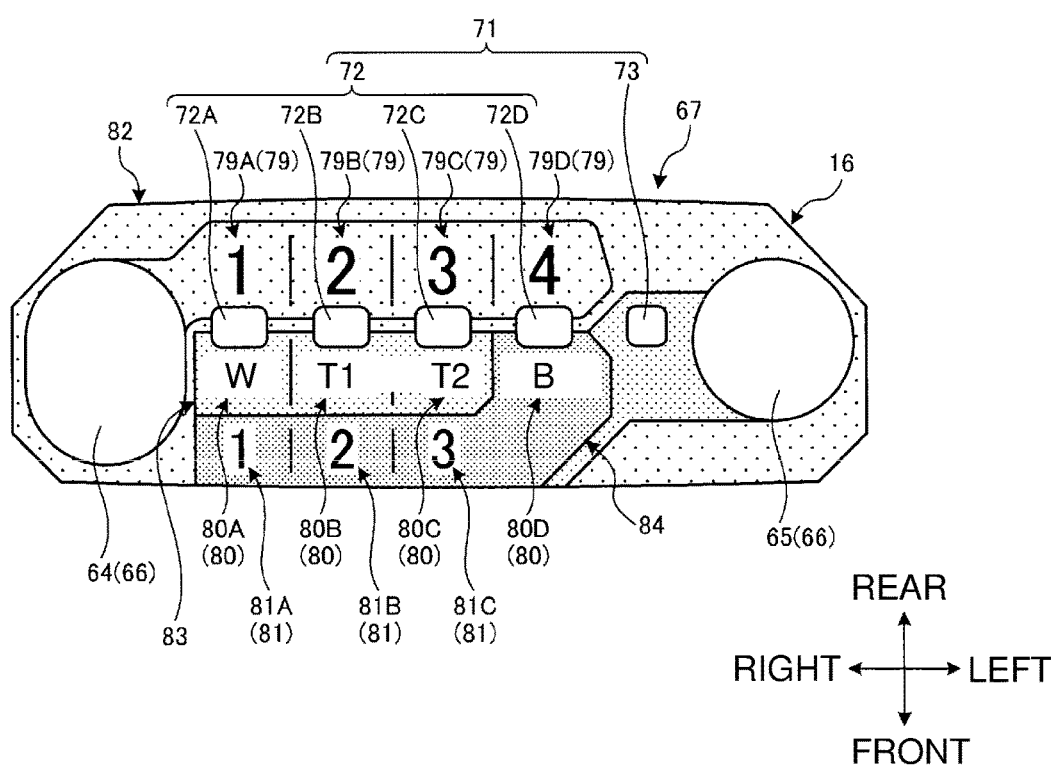
FIG. 12 is a diagram showing an operation panel in the embodiment.

FIG. 12 shows the operation panel 16 in the embodiment. As shown in FIG. 12, the operation panel 16 includes at least parts of the operation device 66 and the indicator 67 including the multiple light emitters 71. The operation panel 16 includes the impact switch 64 and the specific switch 65. The impact switch 64 serving as the operation device 66 is operated to set the impact mode. The specific switch 65 serving as the operation device 66 is operated to set the specific mode. The impact switch 64 is located on the right of the operation panel 16. The specific switch 65 is located on the left of the operation panel 16.

The light emitters 71 include light-emitting diodes (LEDs). The multiple light emitters 71 are arranged at intervals in the lateral (right-left) direction. The multiple light emitters 71 are located between the impact switch 64 and the specific switch 65 in the lateral direction.

The light emitters 71 include the operation light emitters 72 and the identification light emitter 73. The operation light emitters 72 operate in accordance with the set control mode. The identification light emitter 73 operates to identify the multiple operation modes.

The operation light emitters 72 include the first operation light emitter 72A, the second operation light emitter 72B, the third operation light emitter 72C, and the fourth operation light emitter 72D. The four operation light emitters 72 are arranged at intervals in the lateral direction.

The identification light emitter 73 functions as a first identification light emitter that operates to identify the impact mode and the specific mode. The identification light emitter 73 is located on the left of the operation light emitters 72.

The operation panel 16 includes first symbols 79 and second symbols 80. The first symbols 79 are located at least partially around the multiple operation light emitters 72. The second symbols 80 are located at least partially around the multiple operation light emitters 72. The second symbols 80 represent the respective specific modes. The operation panel 16 also includes third symbols 81. The third symbols 81 are located at least partially around the multiple operation light emitters 72. The third symbols 81 represent the respective specific modes.

The first symbols 79 identify the multiple impact modes. The first symbols 79 are, for example, printed on the surface of the operation panel 16. The first symbols 79 include at least one selected from numerals, characters, symbols, and illustrations. The first symbols 79 include a symbol 79A representing the soft impact mode, a symbol 79B representing the medium impact mode, a symbol 79C representing the hard impact mode, and a symbol 79D representing the max impact mode. In the embodiment, the symbols 79A, 79B, 79C, and 79D are respectively represented by numerals 1, 2, 3, and 4.

The first symbols 79 are located to correspond to the respective operation light emitters 72. The symbols 79A to 79D are respectively located behind the first to fourth operation light emitters 72A to 72D.

The first symbols 79 are located in an area 82 of the operation panel 16 including the rear end. The area 82 is colored with a first color. The first color may be black.

The second symbols 80 identify the multiple impact modes. The second symbols 80 are, for example, printed on the surface of the operation panel 16. The second symbols 80 include at least one selected from numerals, characters, symbols, and illustrations. The second symbols 80 include a symbol 80A representing the wood mode, a symbol 80B representing the Teks 1 mode, a symbol 80C representing the Teks 2 mode, and a symbol 80D representing the bolt mode (bolt 1, bolt 2, or bolt 3 mode). In the embodiment, the symbol 80A is denoted by a character W representing the wood mode. The symbol 80B is denoted by a character and a numeral T1 representing the Teks 1 mode. The symbol 80C is denoted by a character and a numeral T2 representing the Teks 2 mode. The symbol 80D is denoted by a character B representing the bolt mode.

The second symbols 80 may not be characters or numerals. The second symbols 80 may be, for example, illustrations.

The second symbols 80 are located to correspond to the respective operation light emitters 72. The symbols 80A to 80D are located in front of the first to fourth operation light emitters 72A to 72D.

The second symbols 80 are located in an area 83 of the operation panel 16 including the front end. The area 83 is colored with a second color different from the first color. The second color may be light blue.

The third symbols 81 identify the multiple bolt modes (bolt 1, bolt 2, and bolt 3 modes), which are examples of the specific mode. The third symbols 81 are, for example, printed on the surface of the operation panel 16. The third symbols 81 include at least one selected from numerals, characters, symbols, and illustrations. The third symbols 81 include a symbol 81A representing the bolt 1 mode, a symbol 81B representing the bolt 2 mode, and a symbol 81C representing the bolt 3 mode. In the embodiment, the symbols 81A, 81B, and 81C are respectively denoted by numerals 1, 2, and 3.

The third symbols 81 are located to correspond to the respective operation light emitters 72. The symbol 81A is located in front of the first operation light emitter 72A and the symbol 80A. The symbol 81B is located in front of the second operation light emitter 72B and the symbol 80B. The symbol 81C is located in front of the third operation light emitter 72C and the symbol 80C.

The third symbols 81 are located in an area 84, which is a part of the area 83. The area 84 is colored with a third color different from the first and second colors. The third color may be blue.

The area 82 colored with the first color is partially located around the impact switch 64. The area 83 colored with the second color is partially located around the specific switch 65. The impact switch 64 is located in the area 82 colored with the first color. The operator can thus visually associate the impact switch 64 with the first symbols 79 that identify the multiple impact modes. The specific switch 65 is located in the area 83 colored with the second color. The operator can thus visually associate the specific switch 65 with the second symbols 80 that identify the multiple specific modes.

Figure 13:
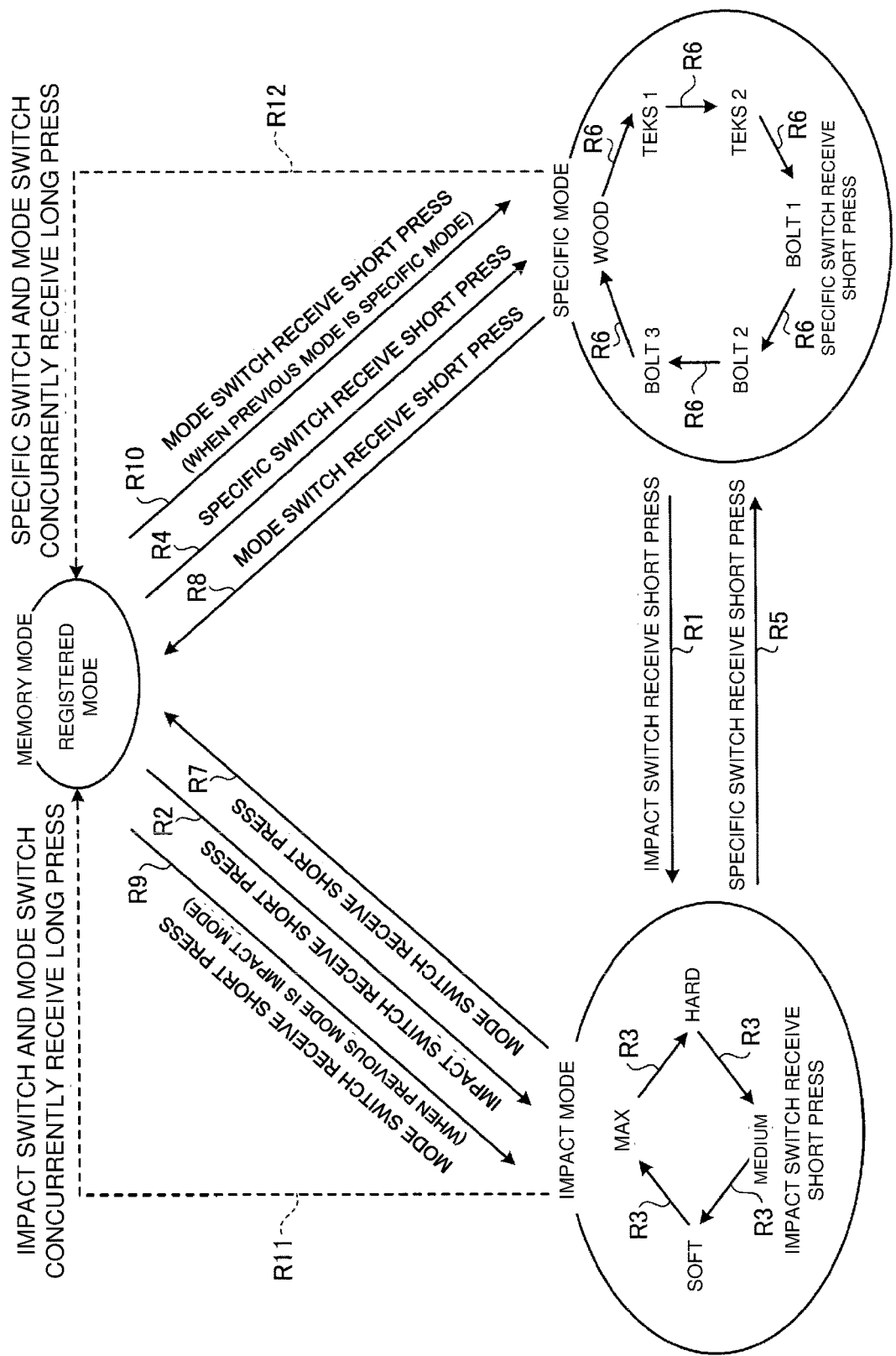
FIG. 13 is a schematic diagram of a control mode switching method according to the embodiment.

FIG. 13 is a schematic diagram of a control mode switching method according to the embodiment. The operation device 66 switches the eleven control modes through the first operation.

To change from the specific mode to the impact mode, the operator performs a short press on the impact switch 64, as indicated with arrow R1. To change from the memory mode to the impact mode, the operator performs a short press on the impact switch 64, as indicated with arrow R2. After being changed to the impact mode, the control mode is sequentially switched in the order of the max, hard, medium, soft, and max impact modes every time the impact switch 64 receives a short press, as indicated with arrows R3.

To change from the memory mode to the specific mode, the operator presses the specific switch 65, as indicated with arrow R4. To change from the impact mode to the specific mode, the operator performs a short press on the specific switch 65, as indicated with arrow R5. After being changed to the specific mode, the control mode is sequentially switched in the order of the wood, Teks 1, Teks 2, bolt 1, bolt 2, bolt 3, and wood modes every time the specific switch 65 receives a short press, as indicated with arrows R6.

To change from the impact mode to the memory mode, the operator performs a short press on the mode switch 17, as indicated with arrow R7. To change from the specific mode to the memory mode, the operator performs a short press on the mode switch 17, as indicated with arrow R8.

To change to the impact mode after the mode is changed from the impact mode to the memory mode, the operator performs a short press on the mode switch 17, as indicated with arrow R9.

To change to the specific mode after the mode is changed from the specific mode to the memory mode, the operator performs a short press on the mode switch 17, as indicated with arrow R10.

The operation device 66 performs the registration process of registering a specific operation mode through the second operation.

For example, to register one of the four impact modes, the operator concurrently performs a long press on each of the impact switch 64 and the mode switch 17, as indicated with arrow R11, while the intended impact mode is set. For example, to register the hard impact mode, the operator performs a short press on the impact switch 64 to set the hard impact mode. After setting the hard impact mode, the operator concurrently performs a long press on each of the impact switch 64 and the mode switch 17. Thus, the hard impact mode is registered as the registered mode.

To register one of the six specific modes, the operator concurrently performs a long press on each of the specific switch 65 and the mode switch 17, as indicated with arrow R12, while the intended specific mode is set. For example, to register the wood mode, the operator performs a short press on the specific switch 65 to set the wood mode. After setting the wood mode, the operator concurrently performs a long press on each of the specific switch 65 and the mode switch 17. Thus, the wood mode is registered as the registered mode.

In the embodiment, the impact switch 64 functions as an illumination switch for turning on or off the lamps 18. For example, as the impact switch 64 receives a long press, the lamps 18 are turned on or off.

Control Characteristics

Figure 14:
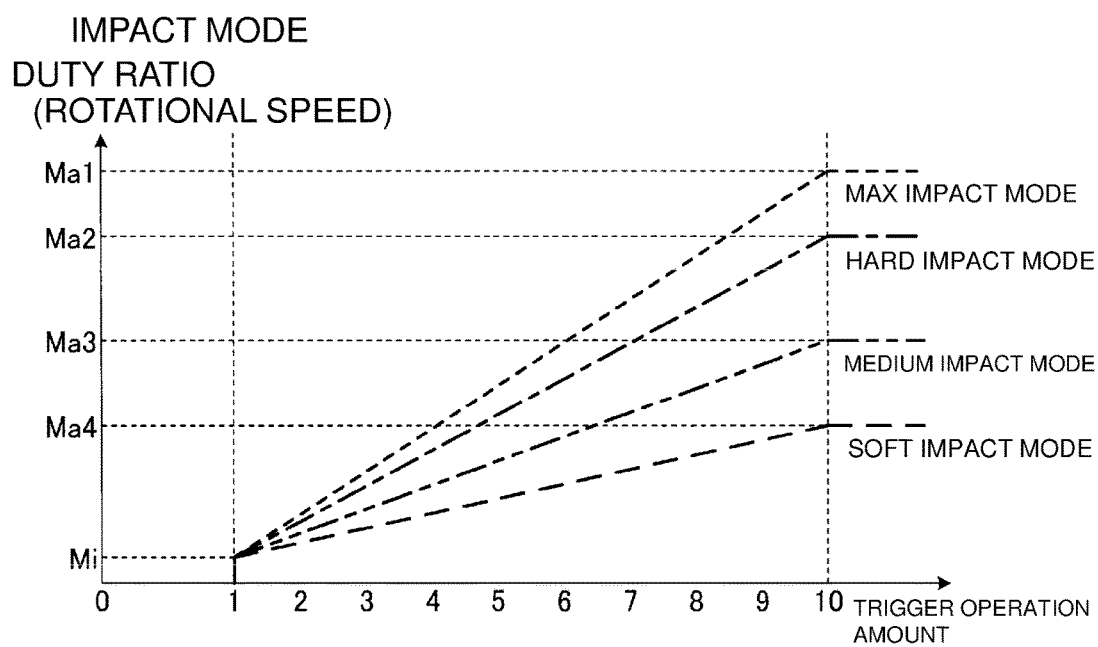
FIG. 14 is a graph showing the control characteristics of an impact mode in the embodiment.

FIG. 14 is a graph showing the control characteristics of the impact mode in the embodiment. In FIG. 14, the horizontal axis indicates the amount of operation on the trigger 14A, and the vertical axis indicates the duty ratio of the control signal for driving the motor 6.

As shown in FIG. 14, in the impact mode, the duty ratio of the control signal for driving the motor 6 is changed based on the amount of operation on the trigger 14A. The duty ratio of the control signal determines the rotational speed of the motor 6. As the duty ratio of the control signal is changed, the rotational speed of the motor 6 changes accordingly. In other words, the rotational speed of the motor 6 is changed based on the amount of operation on the trigger 14A. In the example shown in FIG. 14, the amount of operation on the trigger 14A is rated using ten levels from 1 to 10. As the amount of operation on the trigger 14A increases, the duty ratio of the control signal increases.

In the impact mode, an upper limit Ma of the duty ratio of the control signal is set. In other words, in the impact mode, the upper limit Ma of the rotational speed of the motor 6 is set. An upper limit Ma1 in the max impact mode is the highest, followed by an upper limit Ma2 in the hard impact mode, and followed by an upper limit Ma3 in the medium impact mode. An upper limit Ma4 in the soft impact mode is the lowest.

At the largest operation amount of the level 10, the motor 6 rotates at the rotational speed of the upper limit Ma. At the smallest operation amount of the level 1, the motor 6 rotates at the rotational speed of a lower limit Mi. The rotational speed of the lower limit Mi is the same in the max, hard, medium, and soft impact modes.

In the impact mode, the hammer 47 strikes the anvil 10 in the rotation direction when the screw fastening operation applies a higher load on the anvil 10.

Figure 15:
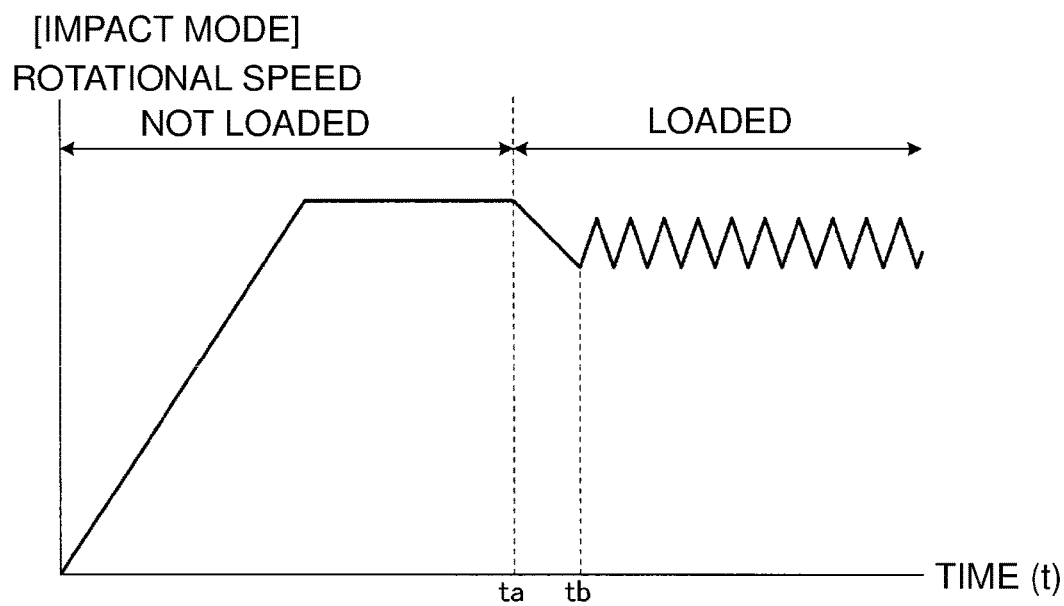
FIG. 15 is a graph showing the rotational speed of a motor when a hammer strikes the anvil in a rotation direction in the impact mode in the embodiment.

FIG. 15 is a graph showing the rotational speed of the motor 6 when the hammer 47 strikes the anvil 10 in the rotation direction in the impact mode in the embodiment. In FIG. 15, the horizontal axis indicates the time elapsed after the screw fastening operation is started, and the vertical axis indicates the rotational speed of the motor 6.

As shown in FIG. 15, as the screw fastening operation applies a higher load on the motor 6, the rotational speed of the motor 6 decreases at a time point ta. At a time point tb after the time point ta, the hammer 47 starts striking. A smaller load is then applied on the motor 6, thus changing the rotational speed of the motor 6.

Figure 16:
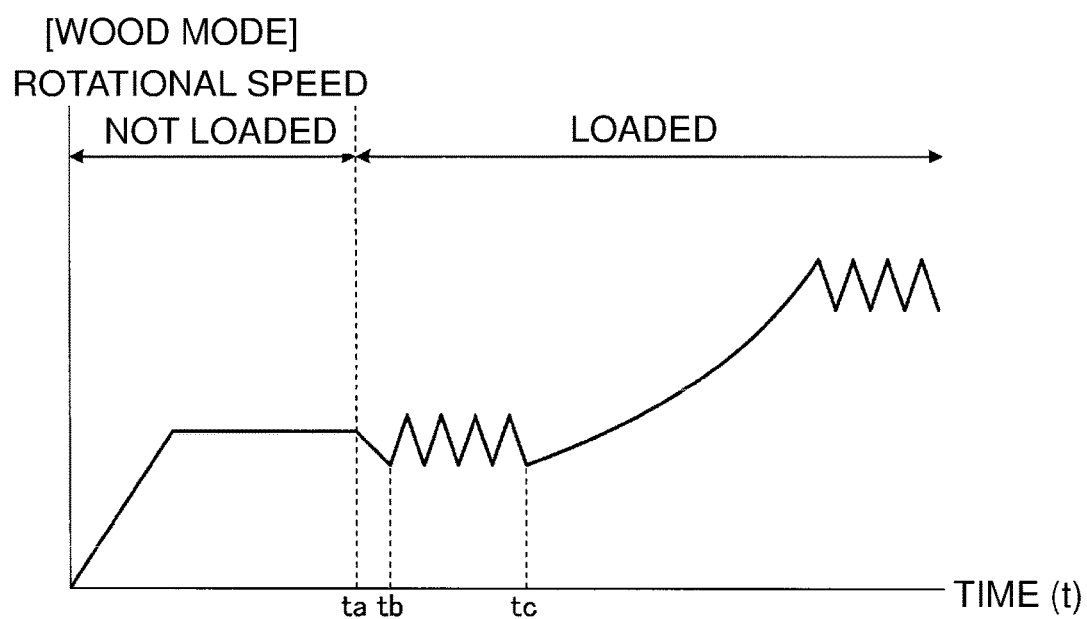
FIG. 16 is a graph showing the control characteristics of a wood mode in the embodiment.

FIG. 16 is a graph showing the control characteristics of the wood mode in the embodiment. In FIG. 16, the horizontal axis indicates the time elapsed after the screw fastening operation is started, and the vertical axis indicates the rotational speed of the motor 6.

As shown in FIG. 16, as the operation on the trigger 14A is started to increase the amount of operation on the trigger 14A, the duty ratio of the control signal increases. A control signal has a smaller duty ratio in the wood mode than in the max impact mode. Immediately after the screw fastening operation on wood is started, a screw is to be rotated slowly for securely being screwed into the wood. In other words, the motor 6 is to be rotated at a low rotational speed immediately after starting driving. With a control signal having a smaller duty ratio in the wood mode than in the max impact mode, the screw rotates slowly.

As the load on the motor 6 increases, the rotational speed of the motor 6 decreases at the time point ta. At the time point tb after the time point ta, the hammer 47 starts striking. The impact detector 68 detects the number of strikes by the hammer 47. When determining that the number of strikes by the hammer 47 exceeds a predetermined number based on a detection signal from the impact detector 68, the motor controller 77 increases the duty ratio of the control signal at a time point tc after the time point tb. More specifically, when the number of strikes by the hammer 47 exceeds the predetermined number, the motor controller 77 determines that the screw has been screwed into wood, and thus increases the rotational speed of the motor 6. As the rotational speed of the motor 6 is increased after the screw is screwed into the wood, the screw is efficiently fastened to the wood in a short time.

The Teks modes are operation modes for fastening Teks screws on a workpiece. The Teks 2 mode is selected for a thick workpiece. The Teks 1 mode is selected for a thin workpiece. The operator can select the Teks 2 or Teks 1 mode as appropriate.

Figure 17:
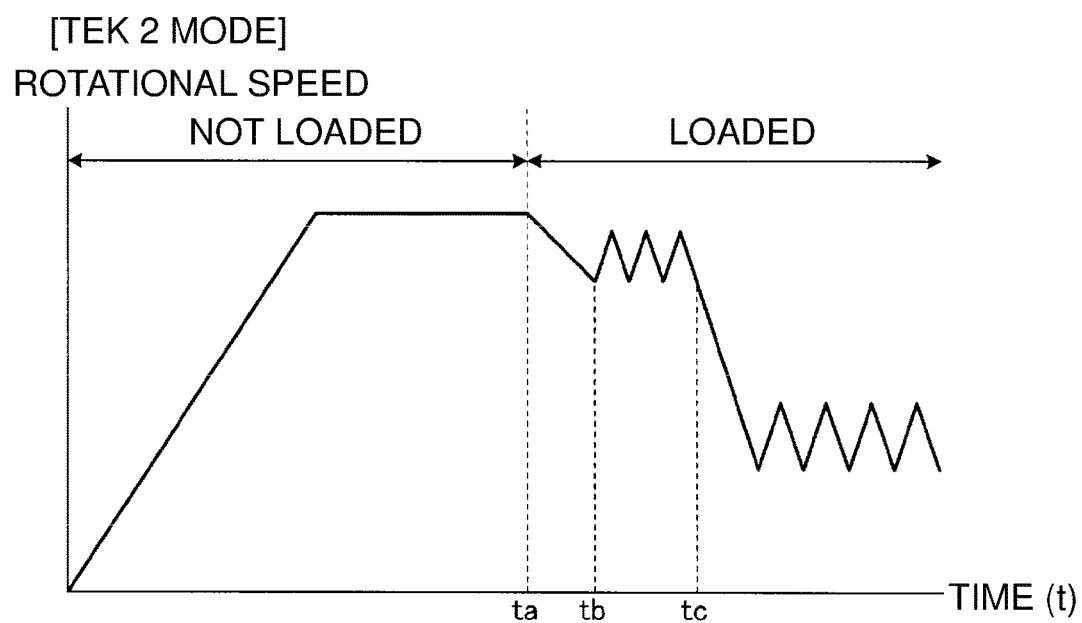
FIG. 17 is a graph showing the control characteristics of a Teks 2 mode in the embodiment.

FIG. 17 is a graph showing the control characteristics of the Teks 2 mode in the embodiment. In FIG. 17, the horizontal axis indicates the time elapsed after the screw fastening operation is started, and the vertical axis indicates the rotational speed of the motor 6.

As shown in FIG. 17, as the operation on the trigger 14A is started and the amount of operation on the trigger 14A increases, the duty ratio of the control signal increases. As the load on the motor 6 increases, the rotational speed of the motor 6 decreases at the time point ta. At the time point tb after the time point ta, the hammer 47 starts striking. The impact detector 68 detects the number of strikes by the hammer 47. When determining that the number of strikes by the hammer 47 exceeds the predetermined number based on the detection signal from the impact detector 68, the motor controller 77 decreases the duty ratio of the control signal at the time point tc after the time point tb.

Although not shown, when determining that the number of strikes by the hammer 47 exceeds the predetermined number in the Teks 1 mode, the motor controller 77 stops driving the motor 6.

The bolt mode is a control mode for fastening or unfastening a bolt. The bolt mode is also selected to fasten or unfasten a nut. The operation of fastening or unfastening a bolt will now be described.

To fasten a bolt, the motor 6 rotates forward. To unfasten a bolt, the motor 6 rotates reversely.

Figure 18:
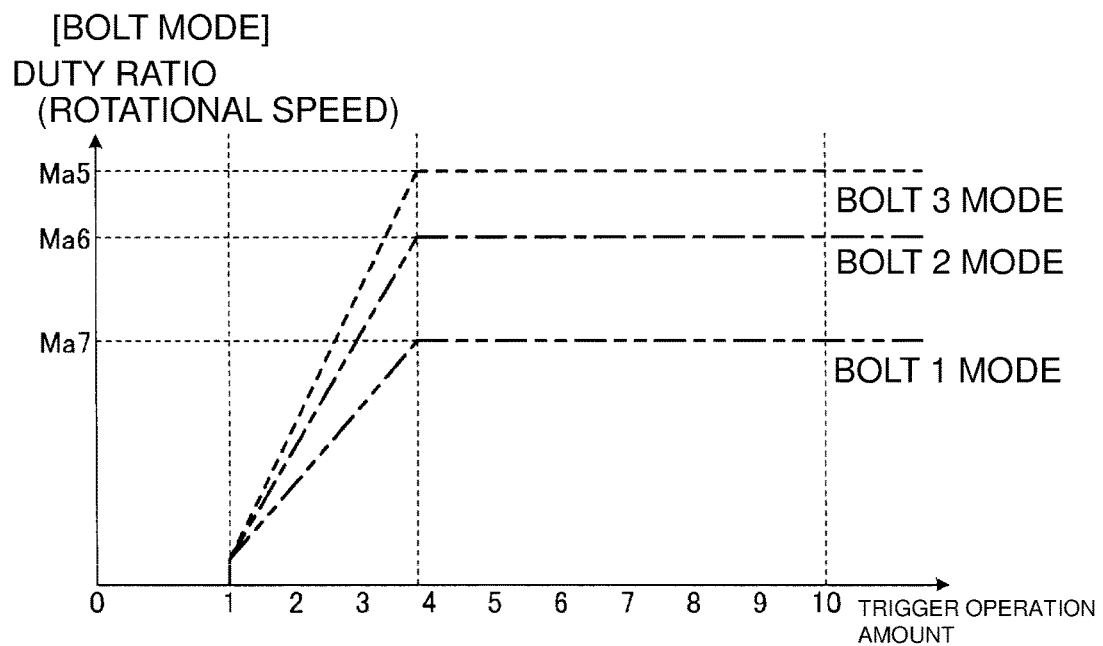
FIG. 18 is a graph showing the control characteristics of a bolt mode during a bolt fastening operation in the embodiment.

FIG. 18 is a graph showing the control characteristics of the bolt mode during the bolt fastening operation in the embodiment. In FIG. 18, the horizontal axis indicates the time elapsed after the bolt fastening operation is started, and the vertical axis indicates the rotational speed of the motor 6.

As shown in FIG. 18, in the bolt mode, the upper limit Ma of the rotational speed of the motor 6 is set. An upper limit Ma5 in the bolt 3 mode is the highest, followed by an upper limit Ma6 in the bolt 2 mode. An upper limit Ma1 in the bolt 1 mode is the lowest.

In the bolt mode, the rotational speed of the motor 6 reaches the upper limit Ma before the amount of operation on the trigger 14A reaches level 10. In other words, in the bolt mode, the rotational speed of the motor 6 reaches the upper limit Ma when the amount of operation on the trigger 14A is small.

To rotate a bolt, a tip tool fittable to a bolt head is used. The tip tool is thus less likely to separate from the bolt. Thus, in the bolt mode, the rotational speed of the motor 6 is set to reach the upper limit Ma with a small amount of operation on the trigger 14A. Thus, the bolt is efficiently fastened in a short time.

When determining that the hammer 47 starts striking based on the detection signal from the impact detector 68, the motor controller 77 stops driving the motor 6.

Figure 19:
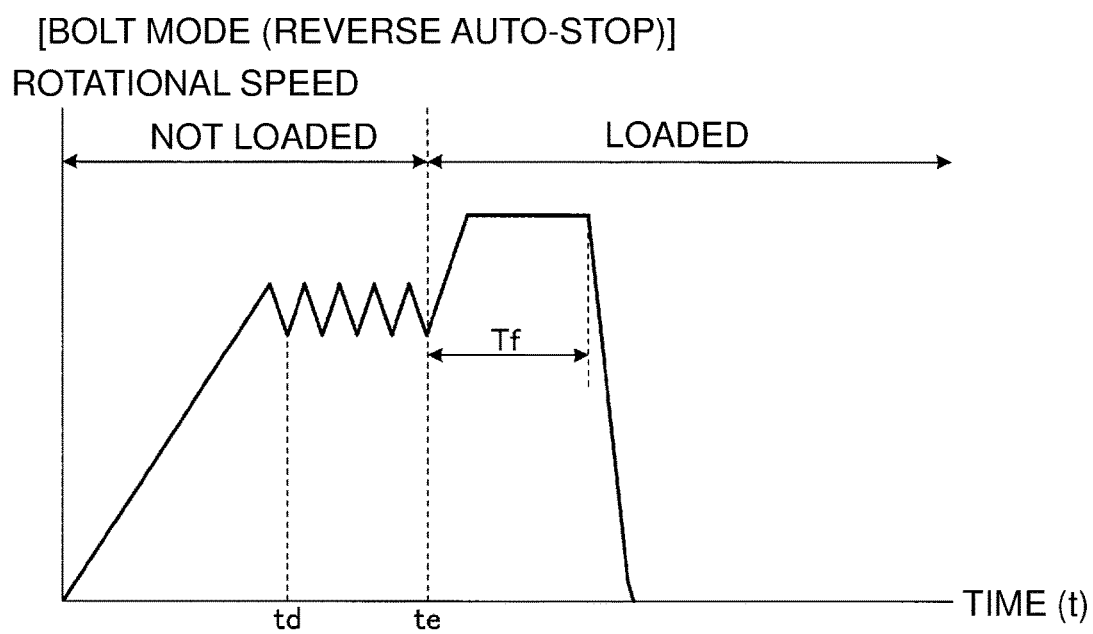
FIG. 19 is a graph showing the control characteristics of the bolt mode during a bolt unfastening operation in the embodiment.

FIG. 19 is a graph showing the control characteristics of the bolt mode during the bolt unfastening operation in the embodiment. In FIG. 19, the horizontal axis indicates the time elapsed after the bolt unfastening operation is started, and the vertical axis indicates the rotational speed of the motor 6.

In the bolt unfastening operation, the motor 6 receives a high load immediately after starting driving. Thus, the hammer 47 starts striking at a time point td immediately after the motor 6 starts driving.

As the bolt is unfastened by the strikes of the hammer 47, the load on the motor 6 decreases. As the load on the motor 6 decreases, the hammer 47 stops striking. The rotational speed of the motor 6 increases from a time point te at which the hammer 47 stops striking. When no strikes are detected for a predetermined time period Tf from the time point te at which the hammer 47 stops striking, the motor controller 77 stops driving the motor 6 or decreases the rotational speed of the motor 6. This structure reduces the likelihood that the bolt falls off the tip tool.

Indicator

The operation of the indicator 67 will now be described. In accordance with the control mode set in response to the mode command, the indicator controller 78 changes the operation patterns of the multiple operation light emitters 72. In accordance with the control mode set in response to the mode command, the indicator controller 78 changes the operation patterns of the identification light emitter 73.

The multiple light emitters 71 are associated with the set control modes. A specific light emitter 71 for a specific control mode is a light emitter 71 that mainly operates to indicate the set control mode. The operator can recognize the set control mode by checking the state of the specific light emitter 71 for the control mode.

In the impact mode, a specific operation light emitter 72 for the max impact mode is the fourth operation light emitter 72D. A specific operation light emitter 72 for the hard impact mode is the third operation light emitter 72C. A specific operation light emitter 72 for the medium impact mode is the second operation light emitter 72B. A specific operation light emitter 72 for the soft impact mode is the first operation light emitter 72A.

In the specific mode, a specific operation light emitter 72 for the wood mode is the first operation light emitter 72A. A specific operation light emitter 72 for the Teks 1 mode is the second operation light emitter 72B. A specific operation light emitter 72 for the Teks 2 mode is the third operation light emitter 72C.

Specific operation light emitters 72 for the bolt 1 mode are the first and fourth operation light emitters 72A and 72D. Specific operation light emitters 72 for the bolt 2 mode are the second and fourth operation light emitters 72B and 72D.

Specific operation light emitters 72 for the bolt 3 mode are the third and fourth operation light emitters 72C and 72D.

Figure 20:
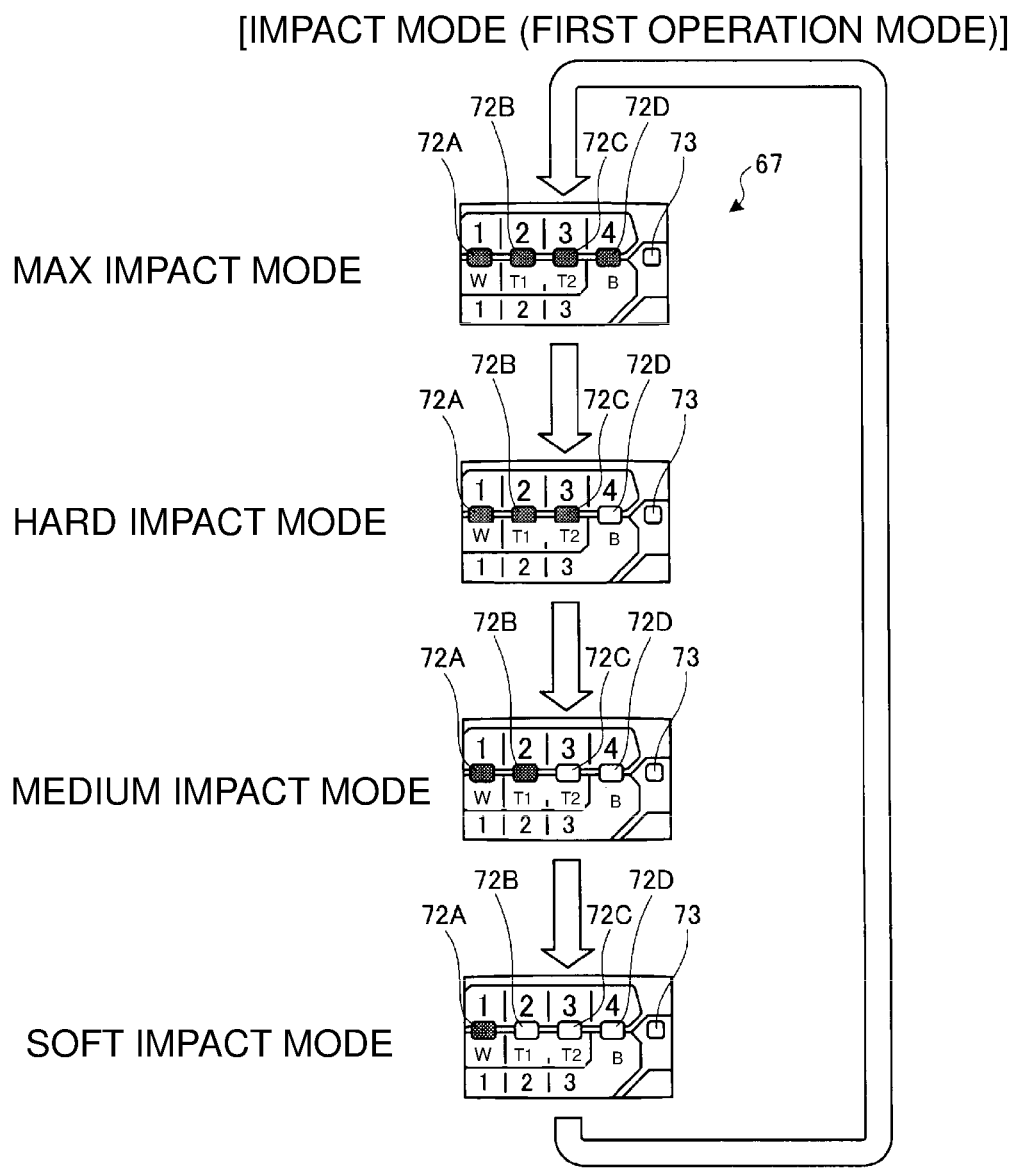
FIG. 20 is a transition diagram showing the states of an indicator for setting the impact mode in the embodiment.
Figure 21:
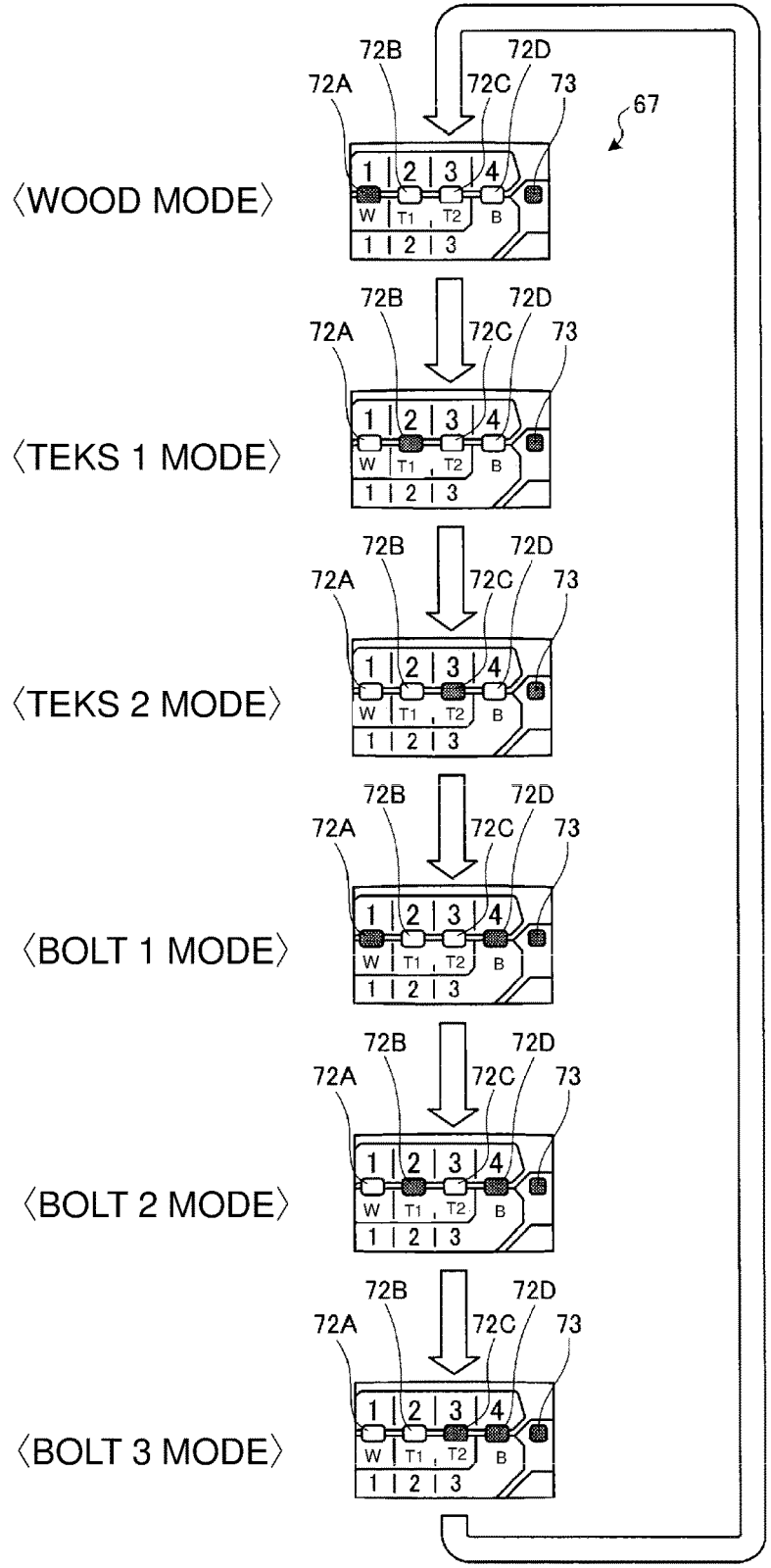
FIG. 21 is a transition diagram showing the indicator states for setting a specific mode in the embodiment.

The operation of the indicator 67 performed when the mode command is output will be described with reference to FIGS. 20 and 21. FIG. 20 is a transition diagram showing the states of the indicator 67 for setting the impact mode in the embodiment. FIG. 21 is a transition diagram showing the states of the indicator 67 for setting the specific mode in the embodiment.

In the impact mode, as indicated with arrows R3 in FIG. 13, the mode command is output from the command output unit 76 every time the impact switch 64 receives a short press. The impact mode is sequentially switched in the order of the max, hard, medium, soft, and max impact modes.

In the specific mode, as indicated with arrows R6 in FIG. 13, the mode command is output from the command output unit 76 every time the specific switch 65 receives a short press. The specific mode is sequentially switched in the order of the wood, Teks 1, Teks 2, bolt 1, bolt 2, bolt 3, and wood modes.

As shown in FIG. 20, when the impact mode is set in response to the mode command, the indicator controller 78 controls the identification light emitter 73 to enter a fifth state. In other words, the indicator controller 78 controls the identification light emitter 73 to enter the fifth state in each of the max, hard, medium, and soft impact modes. In the embodiment, the fifth state includes a light-off state. When each of the max, hard, medium, soft impact modes is set, the indicator controller 78 controls the identification light emitter 73 to enter the light-off state.

The identification light emitter 73 operates to identify the impact mode and the specific mode. As the identification light emitter 73 enters the light-off state, the operator can recognize that the impact mode is set.

In accordance with the set impact mode, the indicator controller 78 changes the operation patterns of the multiple operation light emitters 72. Thus, the indicator 67 indicates each of the multiple impact modes.

When the max impact mode is set in response to the mode command, the indicator controller 78 controls the fourth operation light emitter 72D for the max impact mode to enter a third state. In the embodiment, the third state includes a light-on state. When the max impact mode is set, the indicator controller 78 continuously lights the fourth operation light emitter 72D.

The indicator controller 78 controls, in addition to the fourth operation light emitter 72D, each of the first to third operation light emitters 72A to 72C to enter the third state (light-on state).

When the hard impact mode is set in response to the mode command, the indicator controller 78 controls the third operation light emitter 72C for the hard impact mode to enter the third state (light-on state).

The indicator controller 78 controls, in addition to the third operation light emitter 72C, the first and second operation light emitters 72A and 72B to enter the third state (light-on state). The indicator controller 78 controls the fourth operation light emitter 72D to enter the light-off state.

When the medium impact mode is set in response to the mode command, the indicator controller 78 controls the second operation light emitter 72B for the medium impact mode to enter the third state (light-on state).

The indicator controller 78 controls, in addition to the second operation light emitter 72B, the first operation light emitter 72A to enter the third state (light-on state). When the medium impact mode is selected, the indicator controller 78 controls the third and fourth operation light emitters 72C and 72D to enter the light-off state.

When the soft impact mode is set in response to the mode command, the indicator controller 78 controls the first operation light emitter 72A for the soft impact mode to enter the third state (light-on state).

The indicator controller 78 controls the second to fourth operation light emitters 72B to 72D to enter the light-off state.

As shown in FIG. 21, when the specific mode is set in response to the mode command, the indicator controller 78 controls the identification light emitter 73 to enter a sixth state different from the fifth state. In other words, the indicator controller 78 controls the identification light emitter 73 to enter the sixth state in each of the wood, Teks 1, Teks 2, bolt 1, bolt 2, and bolt 3 modes. In the embodiment, the sixth state includes the light-on state. When each of the wood, Teks 1, Teks 2, bolt 1, bolt 2, and bolt 3 modes is set, the indicator controller 78 controls the identification light emitter 73 to enter the light-on state.

The identification light emitter 73 operates to identify the impact mode and the specific mode. When the identification light emitter 73 enters the light-on state, the operator can recognize that the specific mode is set.

In accordance with the set specific mode, the indicator controller 78 changes the operation patterns of the multiple operation light emitters 72. Thus, the indicator 67 indicates each of the multiple specific modes.

When the wood mode is set in response to the mode command, the indicator controller 78 controls the first operation light emitter 72A for the wood mode to enter the third state (light-on state).

The indicator controller 78 controls the second to fourth operation light emitters 72B to 72D to enter the light-off state.

When the Teks 1 mode is set in response to the mode command, the indicator controller 78 controls the second operation light emitter 72B for the Teks 1 mode to enter the third state (light-on state).

The indicator controller 78 controls the first, third, and fourth operation light emitters 72A, 72C, and 72D to enter the light-off state.

When the Teks 2 mode is set in response to the mode command, the indicator controller 78 controls the third operation light emitter 72C for the Teks 2 mode to enter the third state (light-on state).

The indicator controller 78 controls the first, second, and fourth operation light emitters 72A, 72B, and 72D to enter the light-off state.

When the bolt 1 mode is set in response to the mode command, the indicator controller 78 controls the first and fourth operation light emitters 72A and 72D for the bolt 1 mode to enter the third state (light-on state).

The indicator controller 78 controls the second and third operation light emitters 72B and 72C to enter the light-off state.

When the bolt 2 mode is set in response to the mode command, the indicator controller 78 controls the second and fourth operation light emitters 72B and 72D for the bolt 2 mode to enter the third state (light-on state).

The indicator controller 78 controls the first and third operation light emitters 72A and 72C to enter the light-off state.

When the bolt 3 mode is set in response to the mode command, the indicator controller 78 controls the third and fourth operation light emitters 72C and 72D for the bolt 3 mode to enter the third state (light-on state).

The indicator controller 78 controls the first and second operation light emitters 72A and 72B to enter the light-off state.

As shown in FIG. 21, in the specific mode, the fourth operation light emitter 72D functions as a second identification light emitter that operates to identify the multiple specific modes. The states of the identification light emitter 73 (first identification light emitter) are combined with the fourth operation light emitter 72D (second identification light emitter) to distinguish the wood, Teks 1, and Teks 2 modes from the bolt mode (bolt 1, bolt 2, or bolt 3 mode).

In the specific mode, when the identification light emitter 73 is in the sixth state (light-on state) and the fourth operation light emitter 72D is in the fifth state (light-off state), the operator can recognize that the set specific mode is not the bolt mode (bolt 1, bolt 2, or bolt 3 mode). When the identification light emitter 73 is in the light-on state, and the fourth operation light emitter 72D is in the light-off state, any one of the first to third operation light emitters 72A to 72C enters the third state (light-on state). Thus, the operator can recognize that any of the wood, Teks 1, and Teks 2 modes is set.

In the specific mode, when the identification light emitter 73 and the fourth operation light emitter 72D is in the sixth state (light-on state), the operator can recognize that the set specific mode is the bolt mode (bolt 1, bolt 2, or bolt 3 mode). When the identification light emitter 73 and the fourth operation light emitter 72D are in the light-on state, any one of the first to third operation light emitters 72A to 72C enters the third state (light-on state). Thus, the operator can recognize that any of the bolt 1, bolt 2, and bolt 3 modes is set.

In the embodiment, the fifth state is the light-off state, and the sixth state is the light-on state. In some embodiments, the fifth state may be the light-on state and the sixth state may be the light-off state.

Figure 22:
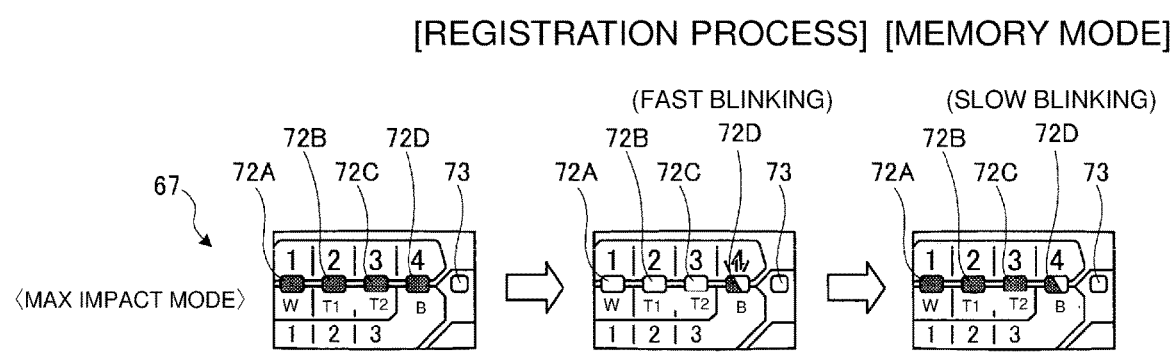
FIG. 22 is a transition diagram showing the indicator states for registering a maximum (max) impact mode and setting a memory mode in the embodiment.
Figure 23:
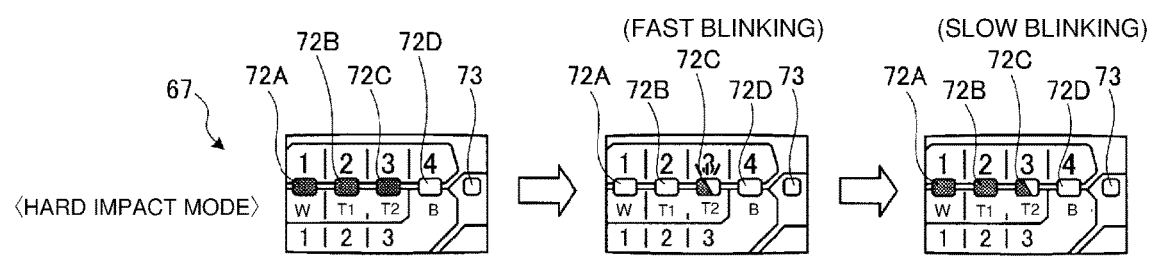
FIG. 23 is a transition diagram showing the indicator states for registering a hard impact mode and setting the memory mode in the embodiment.
Figure 24:
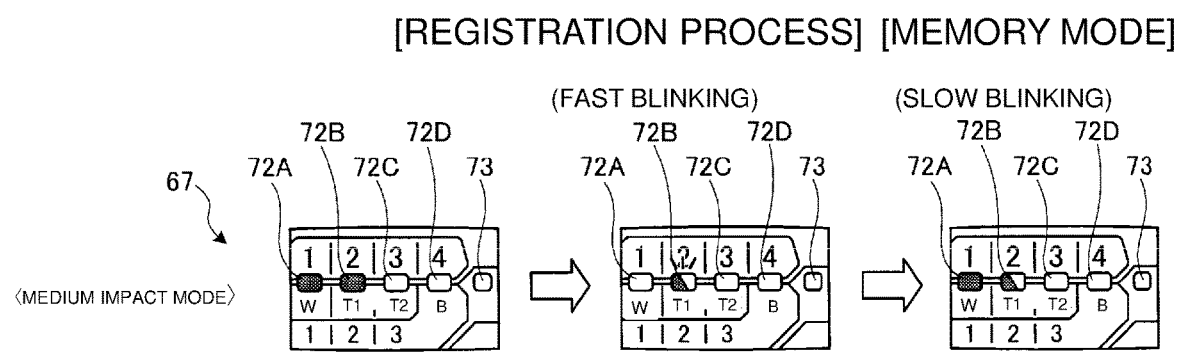
FIG. 24 is a transition diagram showing the indicator states for registering a medium impact mode and setting the memory mode in the embodiment.
Figure 25:
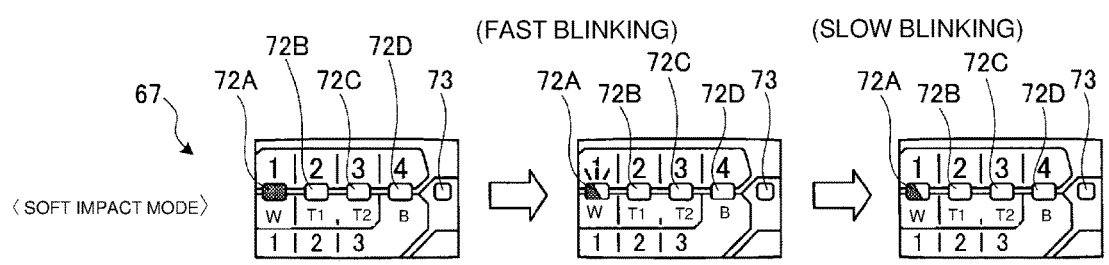
FIG. 25 is a transition diagram showing the indicator states for registering a soft impact mode and setting the memory mode in the embodiment.
Figure 26:
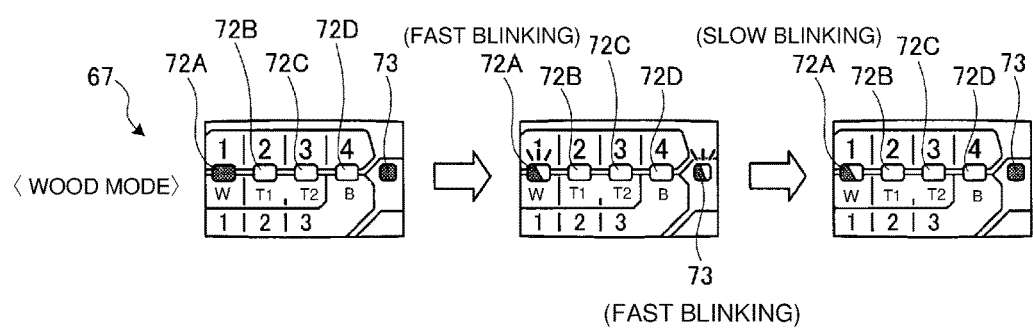
FIG. 26 is a transition diagram showing the indicator states for registering the wood mode and setting the memory mode in the embodiment.
Figure 27:
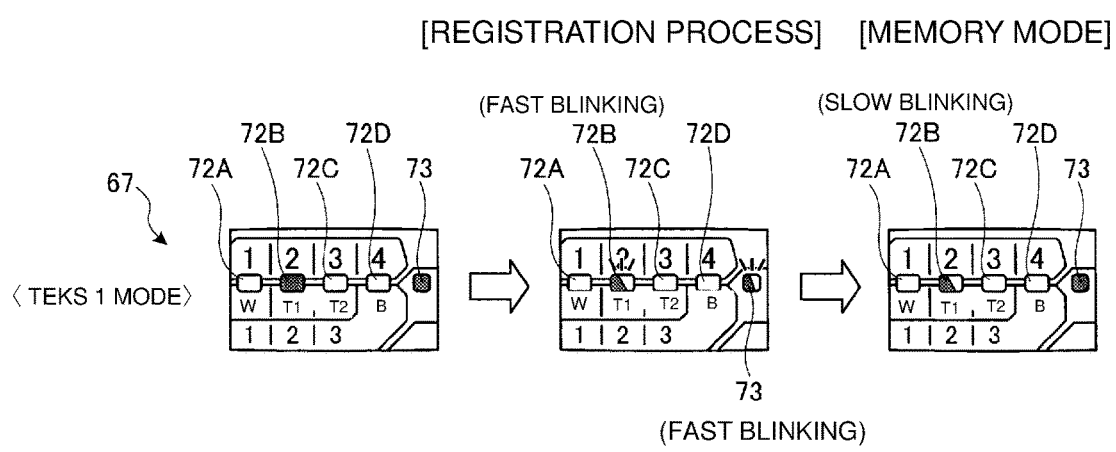
FIG. 27 is a transition diagram showing the indicator states for registering a Teks 1 mode and setting the memory mode in the embodiment.
Figure 28:
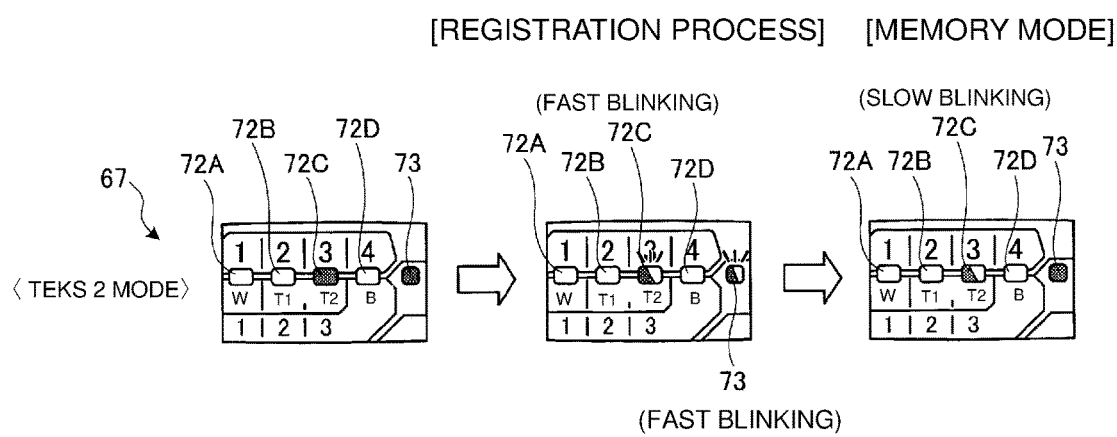
FIG. 28 is a transition diagram showing the indicator states for registering the Teks 2 mode and setting the memory mode in the embodiment.
Figure 29:
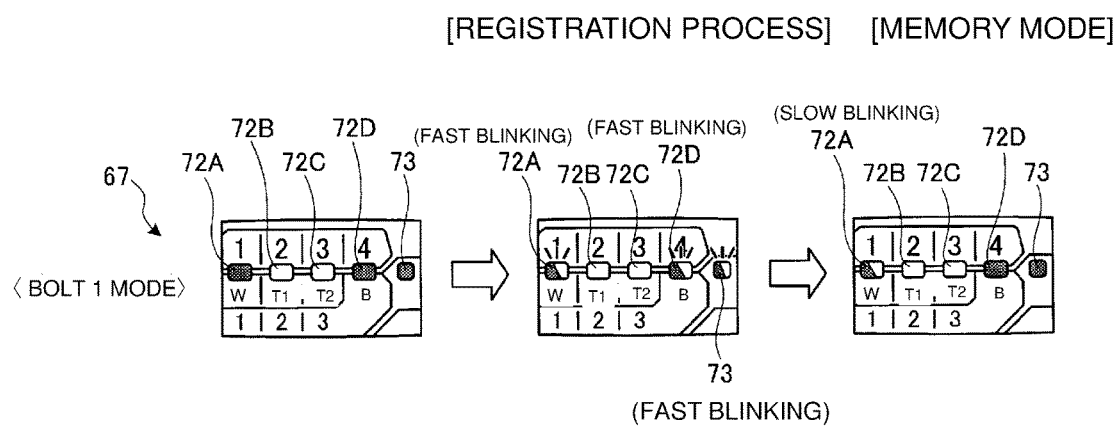
FIG. 29 is a transition diagram showing the indicator states for registering a bolt 1 mode and setting the memory mode in the embodiment.
Figure 30:
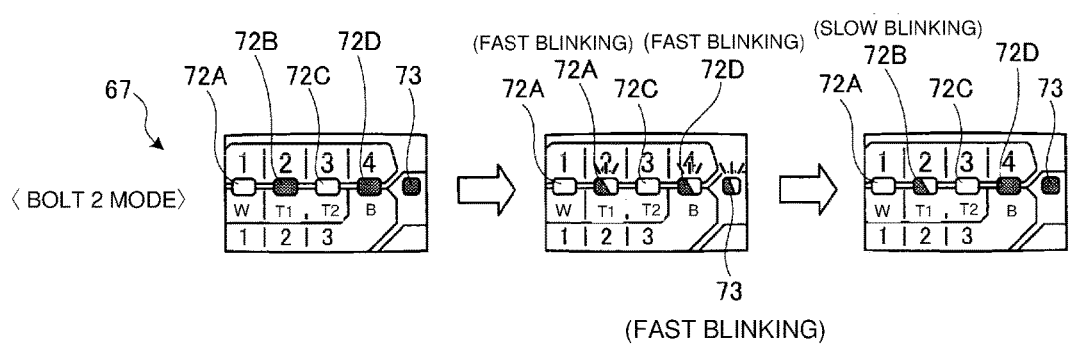
FIG. 30 is a transition diagram showing the indicator states for registering a bolt 2 mode and setting the memory mode in the embodiment.
Figure 31:
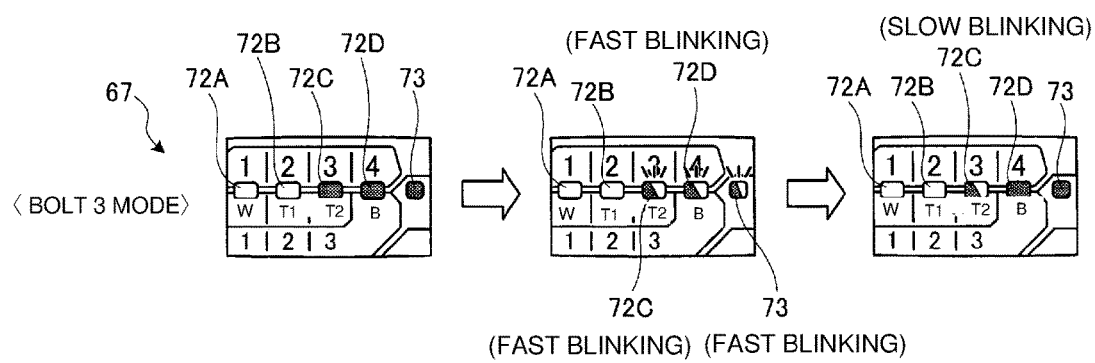
FIG. 31 is a transition diagram showing the indicator states for registering a bolt 3 mode and setting the memory mode in the embodiment.

The operation of the indicator 67 in response to an output of the register command will now be described with reference to FIGS. 22 to 31. FIG. 22 is a transition diagram showing the states of the indicator 67 for registering the max impact mode and setting the memory mode in the embodiment. FIG. 23 is a transition diagram showing the states of the indicator 67 for registering the hard impact mode and setting the memory mode in the embodiment. FIG. 24 is a transition diagram showing the states of the indicator 67 for registering the medium impact mode and setting the memory mode in the embodiment. FIG. 25 is a transition diagram showing the states of the indicator 67 for registering the soft impact mode and setting the memory mode in the embodiment. FIG. 26 is a transition diagram showing the states of the indicator 67 for registering the wood mode and setting the memory mode in the embodiment. FIG. 27 is a transition diagram showing the states of the indicator 67 for registering the Teks 1 mode and setting the memory mode in the embodiment. FIG. 28 is a transition diagram showing the states of the indicator 67 for registering the Teks 2 mode and setting the memory mode in the embodiment. FIG. 29 is a transition diagram showing the states of the indicator 67 for registering the bolt 1 mode and setting the memory mode in the embodiment. FIG. 30 is a transition diagram showing the states of the indicator 67 for registering the bolt 2 mode and setting the memory mode in the embodiment. FIG. 31 is a transition diagram showing the states of the indicator 67 for registering the bolt 3 mode and setting the memory mode in the embodiment.

To register the impact mode, as indicated with arrow R11 in FIG. 13, the impact switch 64 and the mode switch 17 concurrently receive a long press while the intended impact mode is set. To set the memory mode including the impact mode, the mode switch 17 receives a short press, as indicated with arrow R7 in FIG. 13.

To register the specific mode, as indicated with arrow R12 in FIG. 13, the specific switch 65 and the mode switch 17 concurrently receive a long press while the intended specific mode is set. To set the memory mode including the specific mode, the mode switch 17 receives a short press, as indicated with arrow R8 in FIG. 13.

To perform the registration process, the indicator controller 78 controls the light emitters 71 to enter the first state. When the memory mode is set, the indicator controller 78 controls the light emitters 71 to enter the second state.

The first state includes first blinking of a specific light emitter 71 for the registered mode. The second state includes second blinking of a specific light emitter 71 for the registered mode. In the embodiment, the first blinking refers to blinking of a specific light emitter 71 at first time intervals. The second blinking refers to blinking of a specific light emitter 71 at second time intervals longer than the first time intervals. In other words, the first blinking is fast blinking. The second blinking is slow blinking.

As shown in FIGS. 22 to 25, to register the impact mode and to set the memory mode, the indicator controller 78 controls the identification light emitter 73 to enter the light-off state.

As shown in FIG. 22, the max impact mode is set to register the max impact mode. The indicator controller 78 controls the first to fourth operation light emitters 72A to 72D to enter the third state (light-on state).

When the impact switch 64 and the mode switch 17 concurrently receive a long press after the max impact mode is set, the registration process of the max impact mode is started. In the registration process, the indicator controller 78 controls the fourth operation light emitter 72D for the max impact mode to enter the first state (fast blinking state). The indicator controller 78 controls the first to third operation light emitters 72A to 72C to enter the light-off state.

When the memory mode including the max impact mode is set, the indicator controller 78 controls the fourth operation light emitter 72D for the max impact mode to enter the second state (slow blinking state). The indicator controller 78 controls the first to third operation light emitters 72A to 72C to enter the light-on state.

As shown in FIG. 23, the hard impact mode is set to register the hard impact mode. The indicator controller 78 controls the first to third operation light emitters 72A to 72C to enter the third state (light-on state).

When the impact switch 64 and the mode switch 17 concurrently receive a long press after the hard impact mode is set, the registration process of the hard impact mode is started. In the registration process, the indicator controller 78 controls the third operation light emitter 72C for the hard impact mode to enter a first blinking state (fast blinking state). The indicator controller 78 controls the first, second, and fourth operation light emitters 72A, 72B, and 72D to enter the light-off state.

When the memory mode including the hard impact mode is set, the indicator controller 78 controls the third operation light emitter 72C for the hard impact mode to enter the second state (slow blinking state). The indicator controller 78 controls the first and second operation light emitters 72A and 72B to enter the light-on state.

As shown in FIG. 24, the medium impact mode is set to register the medium impact mode. The indicator controller 78 controls the first and second operation light emitters 72A and 72B to enter the third state (light-on state).

When the impact switch 64 and the mode switch 17 concurrently receive a long press after the medium impact mode is set, the registration process of the medium impact mode is started. In the registration process, the indicator controller 78 controls the second operation light emitter 72B for the medium impact mode to enter the first state (fast blinking state). The indicator controller 78 controls the first, third, and fourth operation light emitters 72A, 72C, and 72D to enter the light-off state.

When the memory mode including the medium impact mode is set, the indicator controller 78 controls the second operation light emitter 72B for the medium impact mode to enter the second state (slow blinking state). The indicator controller 78 controls the first operation light emitter 72A to enter the light-on state.

As shown in FIG. 25, the soft impact mode is set to register the soft impact mode. The indicator controller 78 controls the first operation light emitter 72A to enter the third state (light-on state).

When the impact switch 64 and the mode switch 17 concurrently receive a long press after the soft impact mode is set, the registration process of the soft impact mode is started. In the registration process, the indicator controller 78 controls the first operation light emitter 72A for the soft impact mode to enter the first state (fast blinking state). The indicator controller 78 controls the second to fourth operation light emitters 72B to 72D to enter the light-off state.

When the memory mode including the soft impact mode is set, the indicator controller 78 controls the first operation light emitter 72A for the soft impact mode to enter the second state (slow blinking state).

Thus, to register the impact mode, the indicator controller 78 controls the specific light emitter 71 for the registered mode to enter the first state (fast blinking state). When the memory mode is set in response to the mode command, the indicator controller 78 controls the specific light emitter 71 for the set memory mode to enter the second state (slow blinking state) different from the first state. Thus, the operator can recognize whether the mode is registered, and whether the memory mode is set.

When the operation mode is set in response to the mode command, the indicator controller 78 controls the specific light emitter 71 for the set operation mode to enter the third state (light-on state). When the memory mode is set in response to the mode command, the indicator controller 78 controls the specific light emitter 71 for the set memory mode to enter a fourth state (slow blinking state).

As described with reference to, for example, FIG. 20, when the max impact mode is set in response to the mode command, the indicator controller 78 controls the fourth operation light emitter 72D for the max impact mode to enter the third state (light-on state). As described with reference to FIG. 22, the indicator controller 78 controls the fourth operation light emitter 72D for the memory mode (max impact mode) to enter the fourth state (slow blinking state). The operator can thus identify the set max impact mode being either the operation mode or the memory mode.

Similarly, when the hard impact mode is set in response to the mode command, the indicator controller 78 controls the third operation light emitter 72C for the hard impact mode to enter the third state (light-on state). When the memory mode including the hard impact mode is set in response to the mode command, the indicator controller 78 controls the third operation light emitter 72C for the memory mode (hard impact mode) to enter the fourth state (slow blinking state). The same control is performed for the medium and soft impact modes. The operator can thus identify the set impact mode being either the operation mode or the memory mode.

The second and fourth states may be the same or different. The third and fourth states are different.

As shown in FIGS. 26 to 31, in the registration process of the specific mode, the indicator controller 78 controls the identification light emitter 73 to enter a seventh state. To set the memory mode including the specific mode, the indicator controller 78 controls the identification light emitter 73 to enter an eighth state. The seventh and eighth states are different. In the embodiment, the seventh state is the fast blinking state. The eighth state is the light-on state.

As shown in FIG. 26, the wood mode is set to register the wood mode. The indicator controller 78 controls the first operation light emitter 72A to enter the third state (light-on state).

When the specific switch 65 and the mode switch 17 concurrently receive a long press after the wood mode is set, the registration process of the wood mode is started. In the registration process, the indicator controller 78 controls the first operation light emitter 72A for the wood mode to enter the first state (fast blinking state), controls the identification light emitter 73 to enter the seventh state (fast blinking state), and controls the second to fourth operation light emitters 72B to 72D to enter the light-off state.

When the memory mode including the wood mode is set, the indicator controller 78 controls the first operation light emitter 72A for the wood mode to enter the second state (slow blinking state), and controls the identification light emitter 73 to enter the eighth state (light-on state).

As shown in FIG. 27, the Teks 1 mode is set to register the Teks 1 mode. The indicator controller 78 controls the second operation light emitter 72B to enter the third state (light-on state).

When the specific switch 65 and the mode switch 17 concurrently receive a long press after the Teks 1 mode is set, the registration process of the Teks 1 mode is started. In the registration process, the indicator controller 78 controls the second operation light emitter 72B for the Teks 1 mode to enter the first state (fast blinking state), controls the identification light emitter 73 to enter the seventh state (fast blinking state), and controls the first, third, and fourth operation light emitters 72A, 72C, and 72D to enter the light-off state.

When the memory mode including the Teks 1 mode is set, the indicator controller 78 controls the second operation light emitter 72B for the Teks 1 mode to enter the second state (slow blinking state), and controls the identification light emitter 73 to enter the eighth state (light-on state).

As shown in FIG. 28, the Teks 2 mode is set to register the Teks 2 mode. The indicator controller 78 controls the third operation light emitter 72C to enter the third state (light-on state).

When the specific switch 65 and the mode switch 17 concurrently receive a long press after the Teks 2 mode is set, the registration process of the Teks 2 mode is started. In the registration process, the indicator controller 78 controls the third operation light emitter 72C for the Teks 2 mode to enter the first state (fast blinking state), controls the identification light emitter 73 to enter the seventh state (fast blinking state), and controls the first, second, and fourth operation light emitters 72A, 72B, and 72D to enter the light-off state.

When the memory mode including the Teks 2 mode is set, the indicator controller 78 controls the third operation light emitter 72C for the Teks 2 mode to enter the second state (slow blinking state), and controls the identification light emitter 73 to enter the eighth state (light-on state).

As shown in FIG. 29, the bolt 1 mode is set to register the bolt 1 mode. The indicator controller 78 controls the first and fourth operation light emitters 72A and 72D to enter the third state (light-on state).

When the specific switch 65 and the mode switch 17 concurrently receive a long press after the bolt 1 mode is set, the registration process of the bolt 1 mode is started. In the registration process, the indicator controller 78 controls the first operation light emitter 72A for the bolt 1 mode to enter the first state (fast blinking state), controls the fourth operation light emitter 72D functioning as the second identification light emitter to enter the seventh state (fast blinking state), and controls the identification light emitter 73 to enter the seventh state (fast blinking state). The indicator controller 78 controls the second and third operation light emitters 72B and 72C to enter the light-off state.

When the memory mode including the bolt 1 mode is set, the indicator controller 78 controls the first operation light emitter 72A for the bolt 1 mode to enter the second state (slow blinking state), controls the fourth operation light emitter 72D functioning as the second identification light emitter to enter the eighth state (light-on state), and controls the identification light emitter 73 to enter the eighth state (light-on state).

As shown in FIG. 30, the bolt 2 mode is set to register the bolt 2 mode. The indicator controller 78 controls the second and fourth operation light emitters 72B and 72D to enter the third state (light-on state).

When the specific switch 65 and the mode switch 17 concurrently receive a long press after the bolt 2 mode is set, the registration process of the bolt 2 mode is started. In the registration process, the indicator controller 78 controls the second operation light emitter 72B for the bolt 2 mode to enter the first state (first blinking state or fast blinking state), controls the fourth operation light emitter 72D functioning as the second identification light emitter to enter the seventh state (fast blinking state), and controls the identification light emitter 73 to enter the seventh state (fast blinking state). The indicator controller 78 controls the first and third operation light emitters 72A and 72C to enter the light-off state.

When the memory mode including the bolt 2 mode is set, the indicator controller 78 controls the second operation light emitter 72B for the bolt 2 mode to enter the second state (slow blinking state), controls the fourth operation light emitter 72D functioning as the second identification light emitter to enter the eighth state (light-on state), and controls the identification light emitter 73 to enter the eighth state (light-on state).

As shown in FIG. 31, the bolt 3 mode is set to register the bolt 3 mode. The indicator controller 78 controls the third and fourth operation light emitters 72C and 72D to enter the third state (light-on state).

When the specific switch 65 and the mode switch 17 concurrently receive a long press after the bolt 3 mode is set, the registration process of the bolt 3 mode is started. In the registration process, the indicator controller 78 controls the third operation light emitter 72C for the bolt 3 mode to enter the first state (fast blinking state), controls the fourth operation light emitter 72D functioning as the second identification light emitter to enter the seventh state (fast blinking state), and controls the identification light emitter 73 to enter the seventh state (fast blinking state). The indicator controller 78 controls the first and second operation light emitters 72A and 72B to enter the light-off state.

When the memory mode including the bolt 3 mode is set, the indicator controller 78 controls the third operation light emitter 72C for the bolt 3 mode to enter the second state (slow blinking state), controls the fourth operation light emitter 72D functioning as the second identification light emitter to enter the eighth state (light-on state), and controls the identification light emitter 73 to enter the eighth state (light-on state).

Thus, to register the specific mode, the indicator controller 78 controls the specific light emitter 71 for the registered mode to enter the first state (fast blinking state). When the memory mode is set in response to the mode command, the indicator controller 78 controls the specific light emitter 71 for the set memory mode to enter the second state (slow blinking state) different from the first state. Thus, the operator can recognize whether the mode is registered, and whether the memory mode is set.

When the operation mode is set in response to the mode command, the indicator controller 78 controls the specific light emitter 71 for the set operation mode to enter the third state (light-on state). When the memory mode is set in response to the mode command, the indicator controller 78 controls the specific light emitter 71 for the set memory mode to enter the fourth state (slow blinking state).

As described with reference to, for example, FIG. 21, when the wood mode is set in response to the mode command, the indicator controller 78 controls the first operation light emitter 72A for the wood mode to enter the third state (light-on state). As described with reference to FIG. 26, when the memory mode including the wood mode is set in response to the mode command, the indicator controller 78 controls the first operation light emitter 72A for the memory mode (wood mode) to enter the fourth state (slow blinking state). The operator can thus identify the set wood mode being either the operation mode or the memory mode.

Similarly, when the Teks 1 mode is set in response to the mode command, the indicator controller 78 controls the specific second operation light emitter 72B for the Teks 1 mode to enter the third state (light-on state), and when the memory mode including the Teks 1 mode is set in response to the mode command, the indicator controller 78 controls the specific second operation light emitter 72B for the memory mode (Teks 1 mode) to enter the fourth state (slow blinking state). The same control is performed for the Teks 2, bolt 1, bolt 2, and bolt 3 modes. The operator can thus identify the set specific mode being either the operation mode or the memory mode.

Deformation Reducing Member

Figure 32:
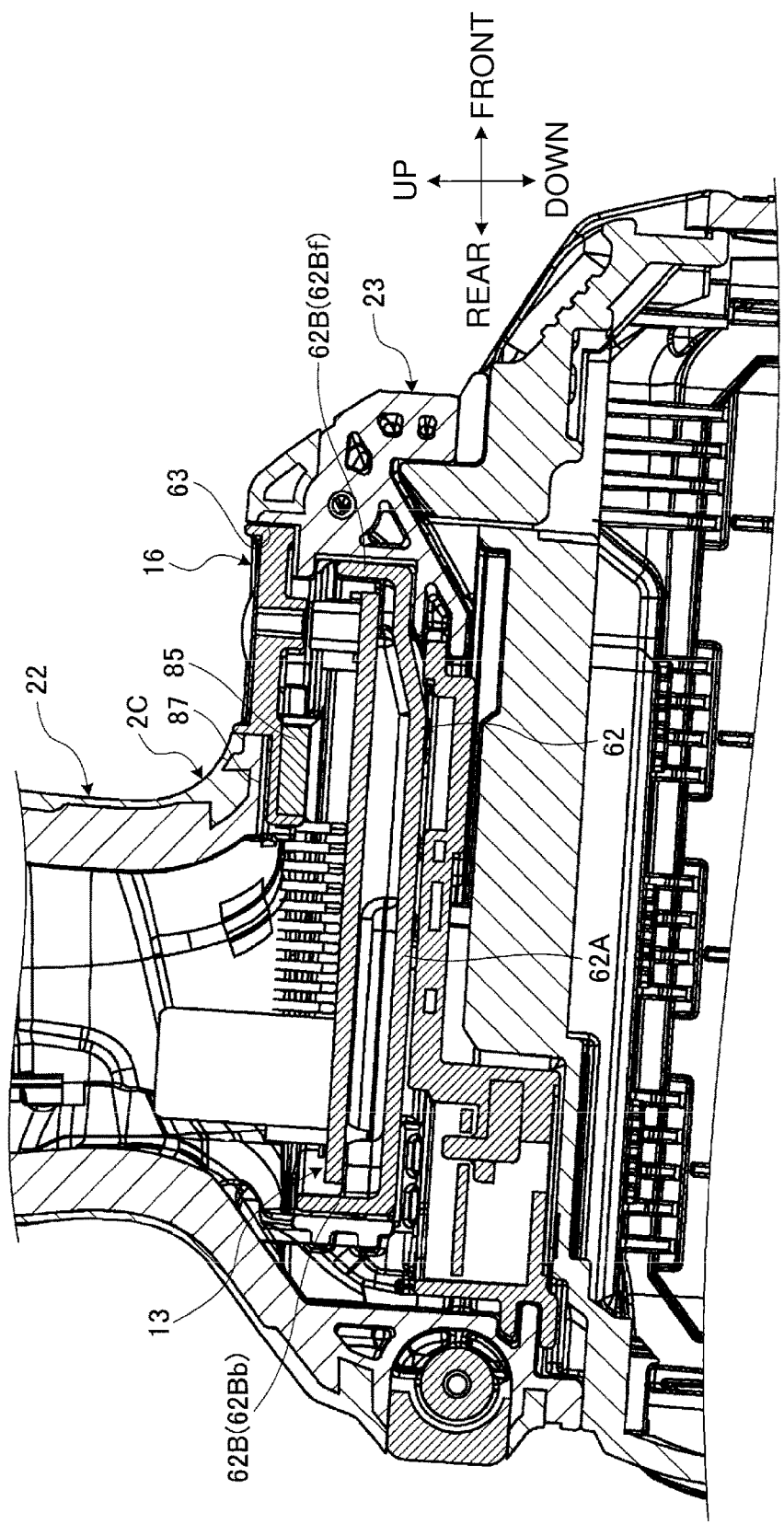
FIG. 32 is an enlarged sectional view of a lower portion of the power tool according to the embodiment.
Figure 33:
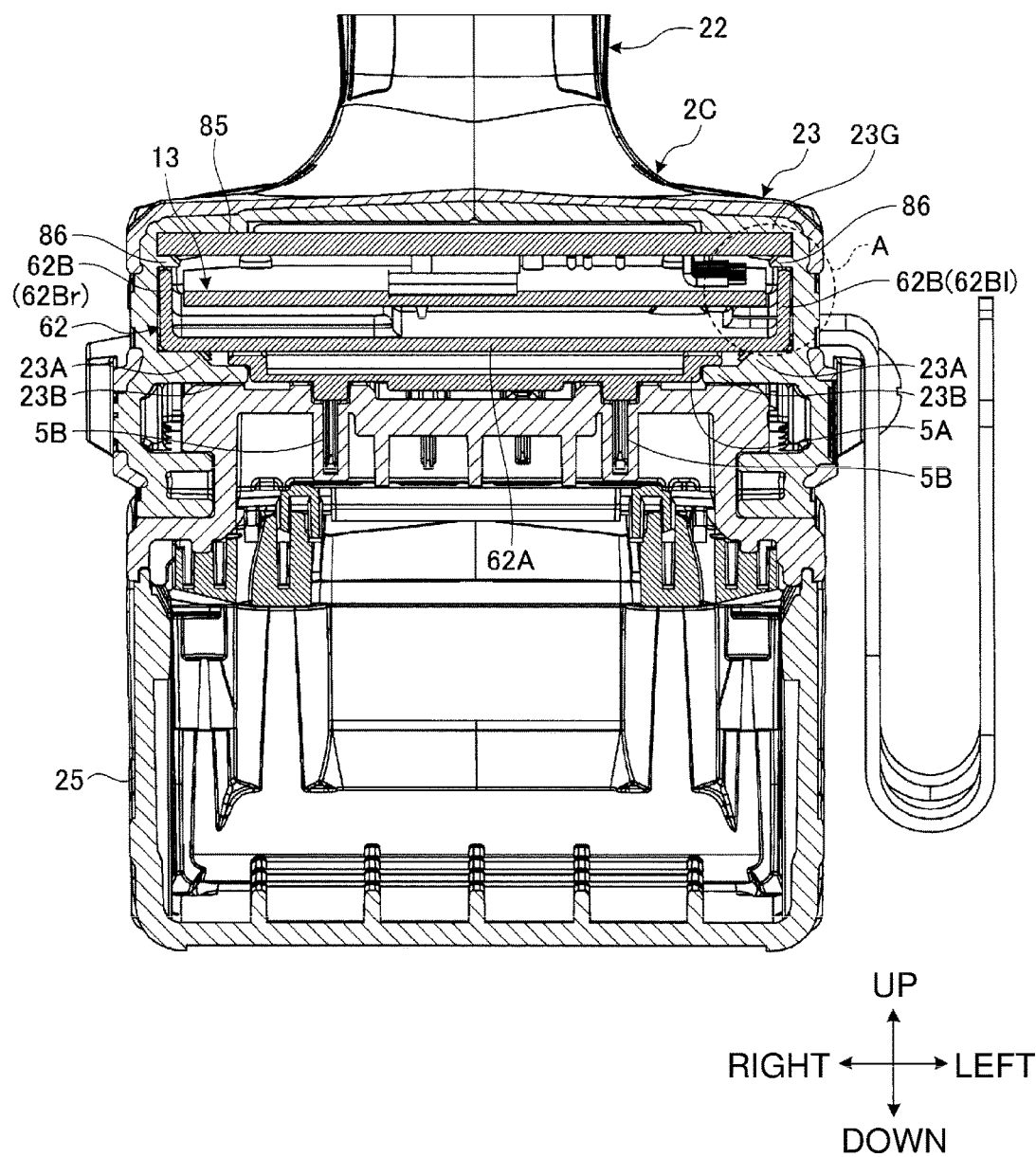
FIG. 33 is an enlarged sectional view of the lower portion of the power tool according to the embodiment.

FIG. 32 is an enlarged sectional view of a lower portion of the power tool 1 according to the embodiment. FIG. 33 is an enlarged sectional view of the lower portion of the power tool 1 according to the embodiment. As shown in FIGS. 4, 32, and 33, the controller compartment 23 accommodates the controller 13 and the controller case 62.

The controller case 62 includes a bottom plate 62A and wall plates 62B. The wall plates 62B protrude upward from the rim of the bottom plate 62A. The bottom plate 62A is rectangular. The wall plates 62B include a front wall plate 62Bf, a rear wall plate 62Bb, a left wall plate 62Bl, and a right wall plate 62Br. The front wall plate 62Bf protrudes upward from the front end of the bottom plate 62A. The rear wall plate 62Bb protrudes upward from the rear end of the bottom plate 62A. The left wall plate 62Bl protrudes upward from the left end of the bottom plate 62A. The right wall plate 62Br protrudes upward from the right end of the bottom plate 62A.

The controller case 62 has an opening at the top. The controller 13 is accommodated at least partially in the controller case 62 through the opening.

The power tool 1 includes a deformation reducing member 85 located at or around an interface 2C between the grip 22 and the controller compartment 23. The controller compartment 23 is connected to a lower end of the grip 22. The interface 2C includes at least either the lower end of the grip 22 or the upper end of the controller compartment 23. The deformation reducing member 85 reduces deformation of the housing 2.

The housing 2 is formed from a synthetic resin. The deformation reducing member 85 has higher rigidity than the housing 2. The deformation reducing member 85 is formed from metal. The deformation reducing member 85 in the embodiment is formed from iron. The deformation reducing member 85 may be formed from aluminum or carbon.

The deformation reducing member 85 is a plate elongated in the lateral direction. In the cross section taken parallel to the rotation axis AX and orthogonal to the upper surface of the operation panel 16, the deformation reducing member 85 is rectangular. The deformation reducing member 85 has a larger outer dimension than the grip 22 in the lateral direction.

The deformation reducing member 85 is located in an upper portion of the internal space of the controller compartment 23. The deformation reducing member 85 is connected to the inner surface of the housing 2 at the interface 2C. The deformation reducing member 85 internally supports the housing 2.

The deformation reducing member 85 is located above the controller 13 and the controller case 62. The deformation reducing member 85 is located at least partially above the wall plates 62B.

The deformation reducing member 85 and the controller case 62 have substantially the same dimensions in the lateral direction. The deformation reducing member 85 may have a larger dimension than the controller case 62 in the lateral direction. As shown in FIG. 33, the left end of the deformation reducing member 85 is located above the left wall plate 62B1. The right end of the deformation reducing member 85 is located above the right wall plate 62Br.

Figure 34:
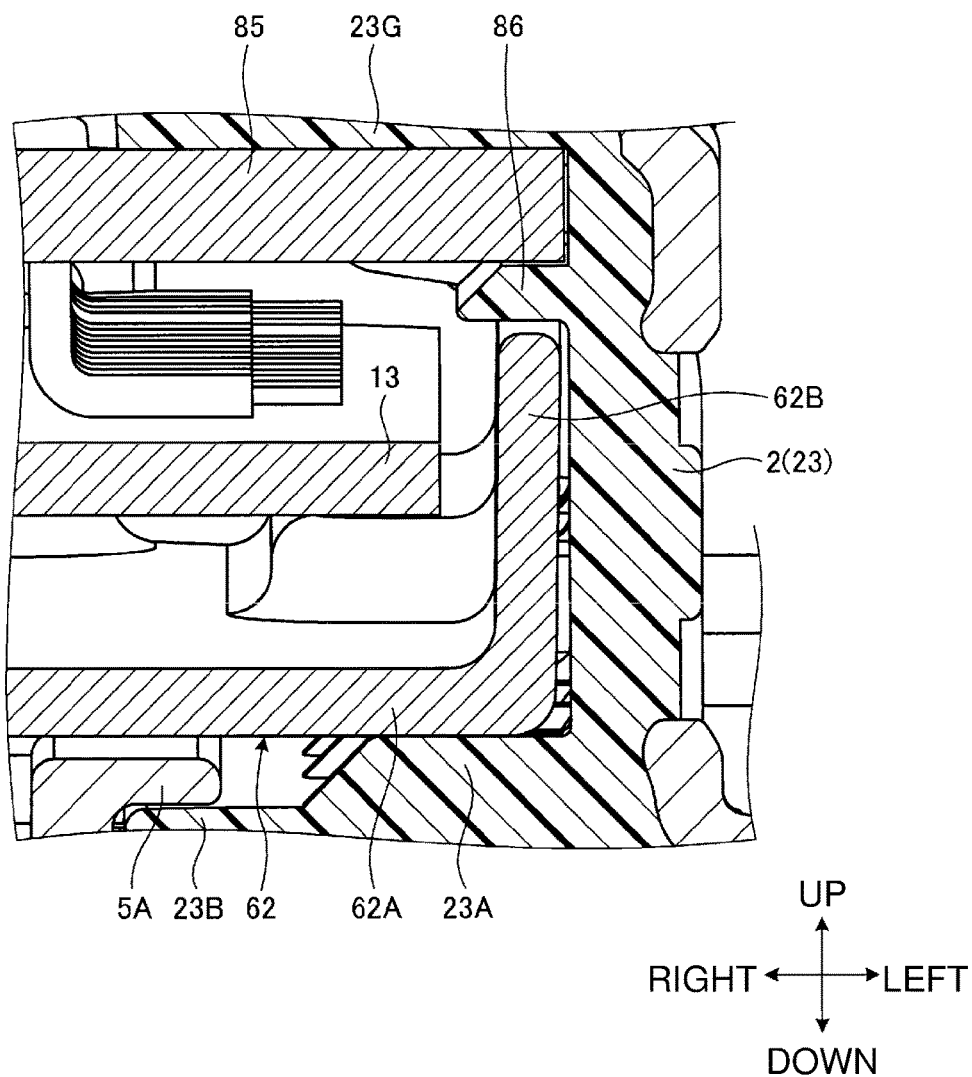
FIG. 34 is an enlarged partial sectional view of a deformation reducing member and a controller case in the embodiment.

FIG. 34 is an enlarged partial sectional view of the deformation reducing member 85 and the controller case 62 in the embodiment. FIG. 34 corresponds to an enlarged view of area A in FIG. 33.

As shown in FIG. 34, an end of the deformation reducing member 85 is located above the upper end of the wall plate 62B in the lateral direction. The power tool 1 includes buffer layers 86 between the lower surface of the deformation reducing member 85 and the upper ends of the wall plates 62B. The buffer layers 86 are located between the left end of the deformation reducing member 85 and the upper end of the left wall plate 62B1, and between the right end of the deformation reducing member 85 and the upper end of the right wall plate 62Br.

Each buffer layer 86 includes at least a part of the controller compartment 23. The inner surface of the controller compartment 23 protrudes at least partially toward the center of the internal space of the controller compartment 23. Each protrusion protruding from the inner surface of the controller compartment 23 is held between the deformation reducing member 85 and the upper end of the corresponding wall plate 62B.

The housing 2 is formed from a synthetic resin such as nylon. The buffer layer 86 is formed from a synthetic resin.

The buffer layer 86 may be separate from the housing 2. The buffer layer 86 may be formed from rubber or a thermoplastic elastomer (TPE).

As shown in FIGS. 4, 33, and 34, a terminal block 5A is held by the controller compartment 23. The terminal block 5A includes tool terminals 5B. The tool terminals 5B are in contact with a battery terminal of the battery pack 25. The tool terminals 5B are connected to the controller 13 with lead wires. The battery pack 25 powers the controller 13 through the tool terminals 5B and the lead wires.

The controller compartment 23 includes a panel holder 23C, a front case holder 23D, a front block holder 23E, a rear block holder 23F, side case holders 23A, a contact 23G, and side block holders 23B.

The panel holder 23C holds a front portion of the operation panel 16 from below. The front case holder 23D holds a front portion of the controller case 62 from below. The front block holder 23E holds a front portion of the terminal block 5A from below. The rear block holder 23F is fitted into a recess located in a lower rear portion of the terminal block 5A. The contact 23G is in contact with at least a part of the upper surface of the deformation reducing member 85. The side case holders 23A hold the left wall plate 62B1 and the right wall plate 62Br from below. The side block holders 23B hold the right and left ends of the terminal block 5A from below.

Figure 35:
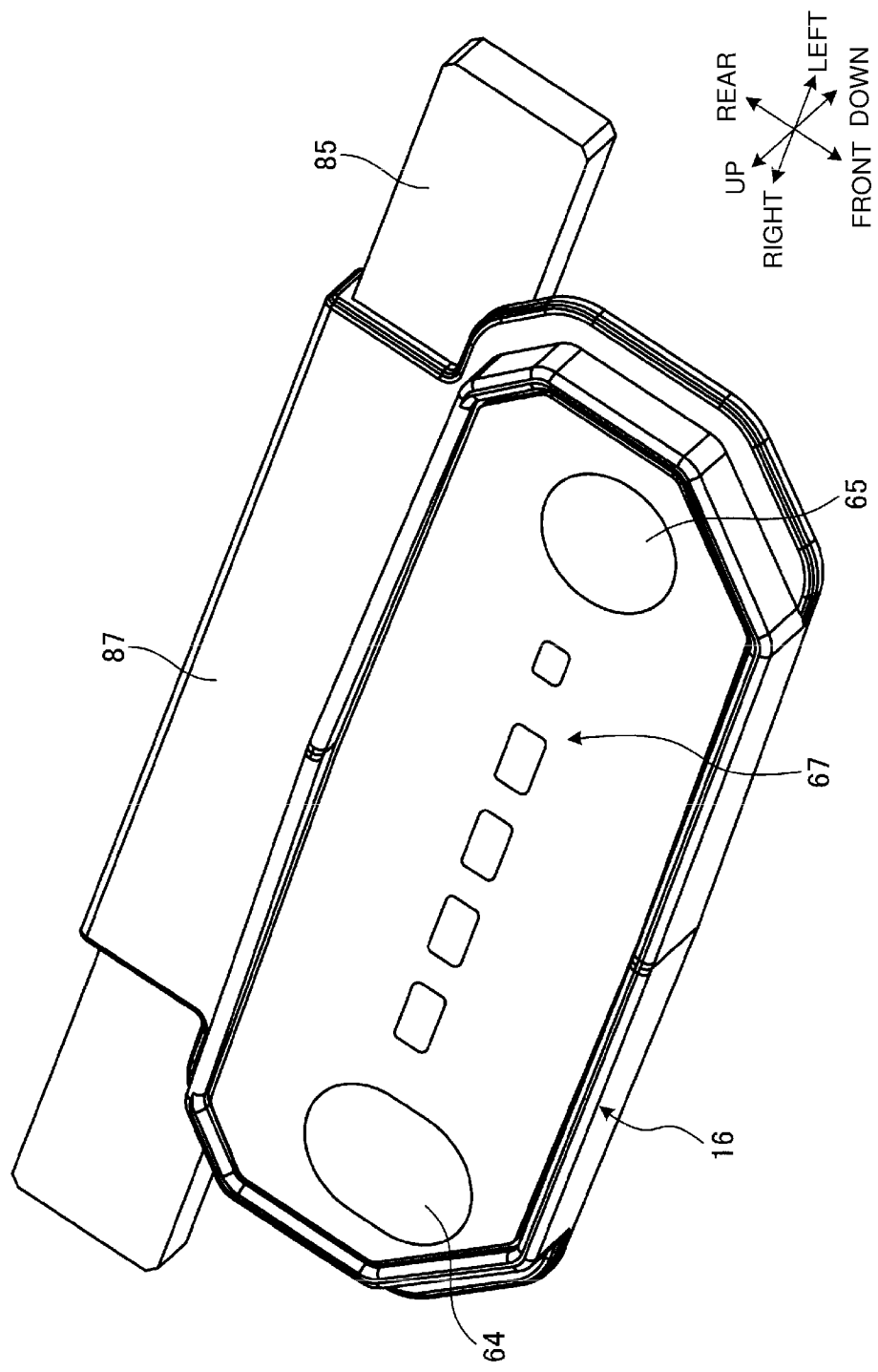
FIG. 35 is a perspective view of the operation panel and the deformation reducing member in the embodiment.
Figure 36:
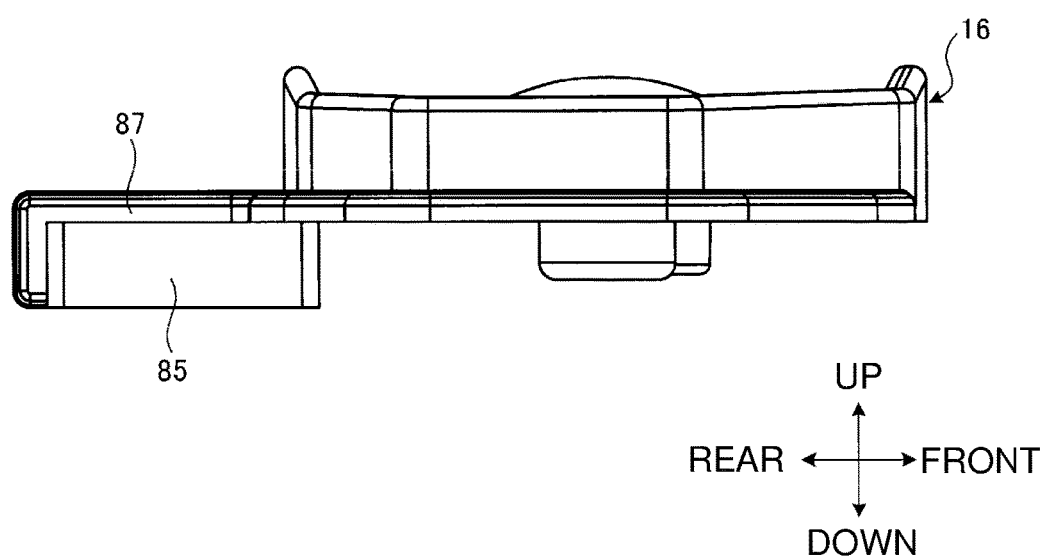
FIG. 36 is a side view of the operation panel and the deformation reducing member in the embodiment.

FIG. 35 is a perspective view of the operation panel 16 and the deformation reducing member 85 in the embodiment. FIG. 36 is a side view of the operation panel 16 and the deformation reducing member 85 in the embodiment. As shown in FIGS. 35 and 36, the deformation reducing member 85 is fixed to the operation panel 16.

The deformation reducing member 85 and the operation panel 16 are connected together with a connection portion 87. The connection portion 87 is formed from a synthetic resin. The connection portion 87 is integral with the operation panel 16. The connection portion 87 at least partially surrounds the deformation reducing member 85. The connection portion 87 in the embodiment is connected to the upper and rear surfaces of the deformation reducing member 85. The deformation reducing member 85 is fixed to the connection portion 87. The connection portion 87 may be connected to the front surface or the lower surface of the deformation reducing member 85.

The base of the operation panel 16 and the connection portion 87 may be formed by, for example, injection molding. A synthetic resin is injected into an injection molding die in which the deformation reducing member 85 is placed to integrate the operation panel 16 and the connection portion 87 together and to fix the connection portion 87 to the deformation reducing member 85.

The operation panel 16 and the deformation reducing member 85 may be, for example, fastened together with a bolt or connected together with an adhesive.

As shown in FIG. 32, the connection portion 87 is in contact with the inner surface of the housing 2 at the interface 2C. The deformation reducing member 85 is connected to the inner surface of the housing 2 at the interface 2C with the connection portion 87 in between. The deformation reducing member 85 internally supports the housing 2 with the connection portion 87 in between.

The controller compartment 23 has the opening 63 for receiving the operation panel 16. The opening 63 is formed in the upper surface of the controller compartment 23 frontward from the grip 22. The opening 63 is located frontward from the interface 2C.

The deformation reducing member 85 is located on at least a periphery of the opening 63. As shown in FIG. 32, the deformation reducing member 85 is located at least partially between the interface 2C and the opening 63 in the front-rear direction.

The deformation reducing member 85 reduces deformation of the housing 2 at the interface 2C. This reduces breakage of the controller 13 and components around the controller 13.

Figure 37:
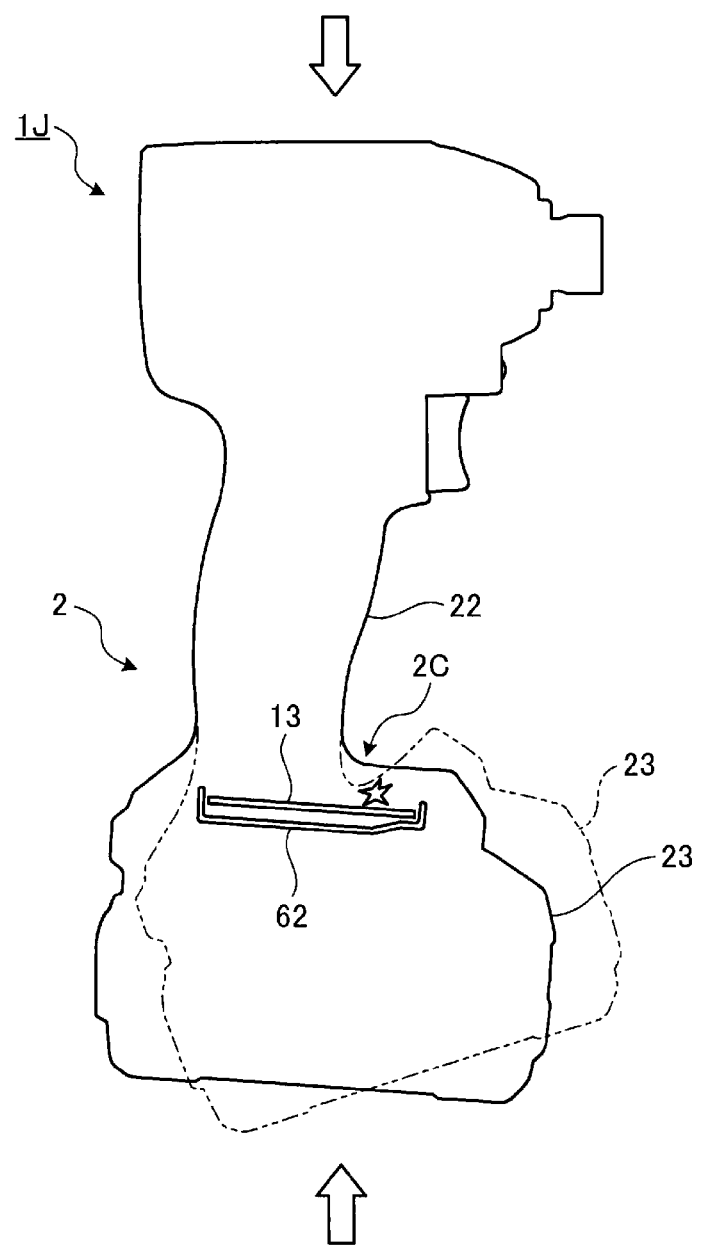
FIG. 37 is a schematic diagram of a power tool according to a comparative example receiving an external force.

FIG. 37 is a schematic diagram of a power tool 1J according to a comparative example receiving an external force. The power tool 1J according to the comparative example does not include the deformation reducing member 85. When the power tool 1J falls and receives an external force, the housing 2 may be deformed at least partially. The interface 2C between the grip 22 and the controller compartment 23 is bent. Thus, under the external force, the power tool 1J is highly likely to be deformed at the interface 2C. The inner surface of the housing 2 may come in contact with at least either the controller 13 or the components around the controller 13. Thus, at least either the controller 13 or the components around the controller 13 may be broken. Components accommodated in the controller compartment 23 are shown as examples of the components around the controller 13.

Figure 38:
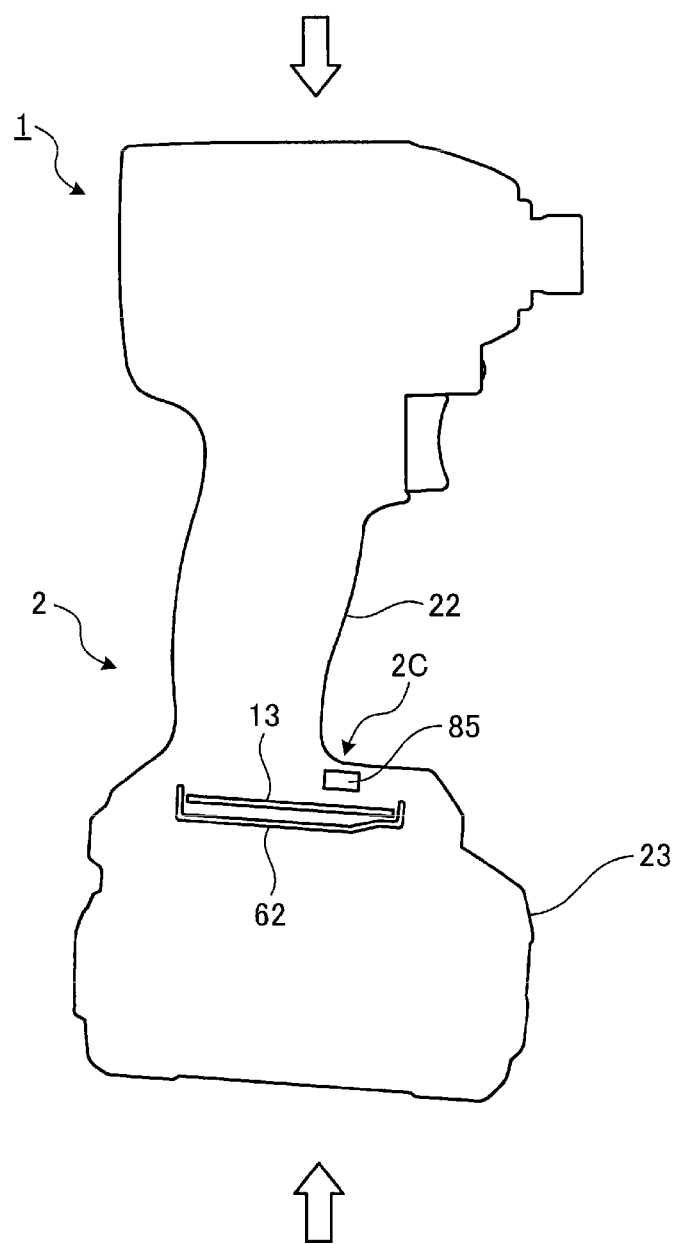
FIG. 38 is a schematic diagram of the power tool according to the embodiment receiving an external force.

FIG. 38 is a schematic diagram of the power tool 1 according to the embodiment receiving an external force. The power tool 1 according to the embodiment includes the deformation reducing member 85 located at the interface 2C. This reduces deformation of the housing 2 at or around the interface 2C.

Figure 39:
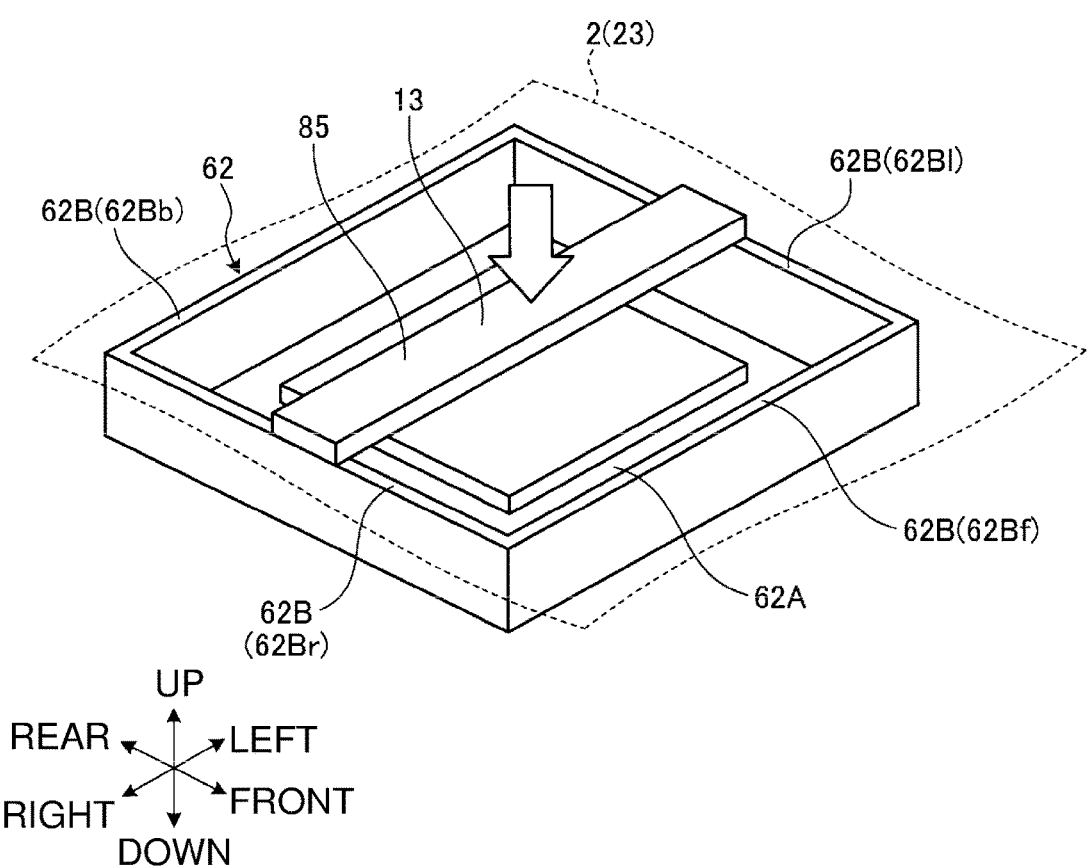
FIG. 39 is a schematic diagram of the deformation reducing member in the embodiment.

FIG. 39 is a schematic diagram of the deformation reducing member 85 in the embodiment. As shown in FIG. 39, the left end of the deformation reducing member 85 is located on the left wall plate 62B1. The right end of the deformation reducing member 85 is located on the right wall plate 62Br. The deformation reducing member 85 extends between the left and right wall plates 62B1 and 62Br. In the example shown in FIG. 39, the deformation reducing member 85 is in direct contact with the left and right wall plates 62B1 and 62Br.

The deformation reducing member 85 covers a part of the upper opening in the controller case 62. When the inner surface of the housing 2 is deformed toward the controller 13, the inner surface of the housing 2 comes in contact with the deformation reducing member 85 before coming in contact with the controller 13. This structure reduces the likelihood that the inner surface of the housing 2 comes in contact with the controller 13. The controller 13 is thus protected sufficiently and is less likely to be broken. The components around the controller 13 are also less likely to be broken.

Fan

The fan 12 will now be described. As shown in FIGS. 4 and 5, the fan 12 is fastened to at least a part of the rotor 27. The fan 12 is fastened to the rotor shaft 32. The fan 12 rotates together with the rotor shaft 32 as the rotor shaft 32 rotates. The fan 12 rotates about the rotation axis AX. The fan 12 is located behind the motor 6.

Figure 40:
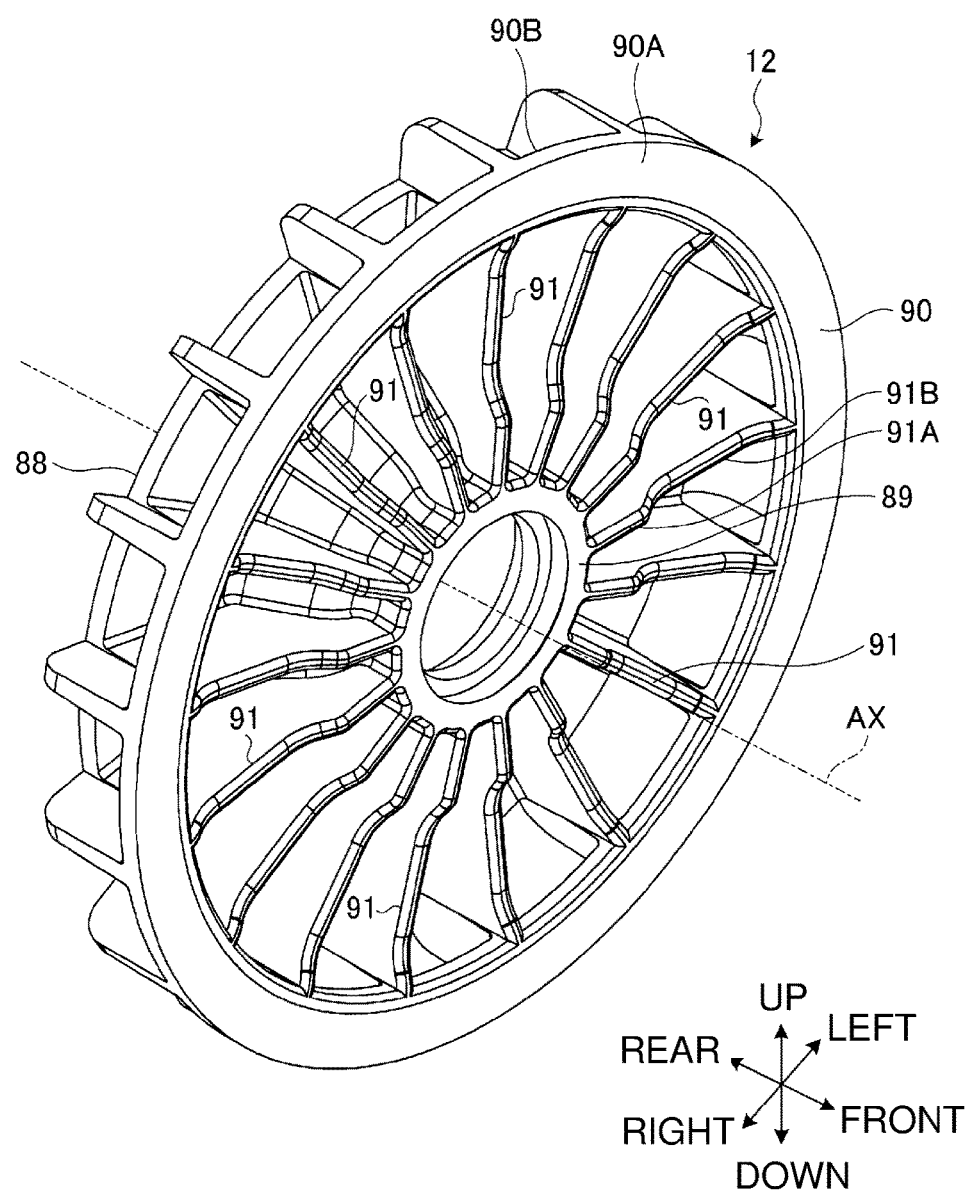
FIG. 40 is a front perspective view of a fan in the embodiment.
Figure 41:
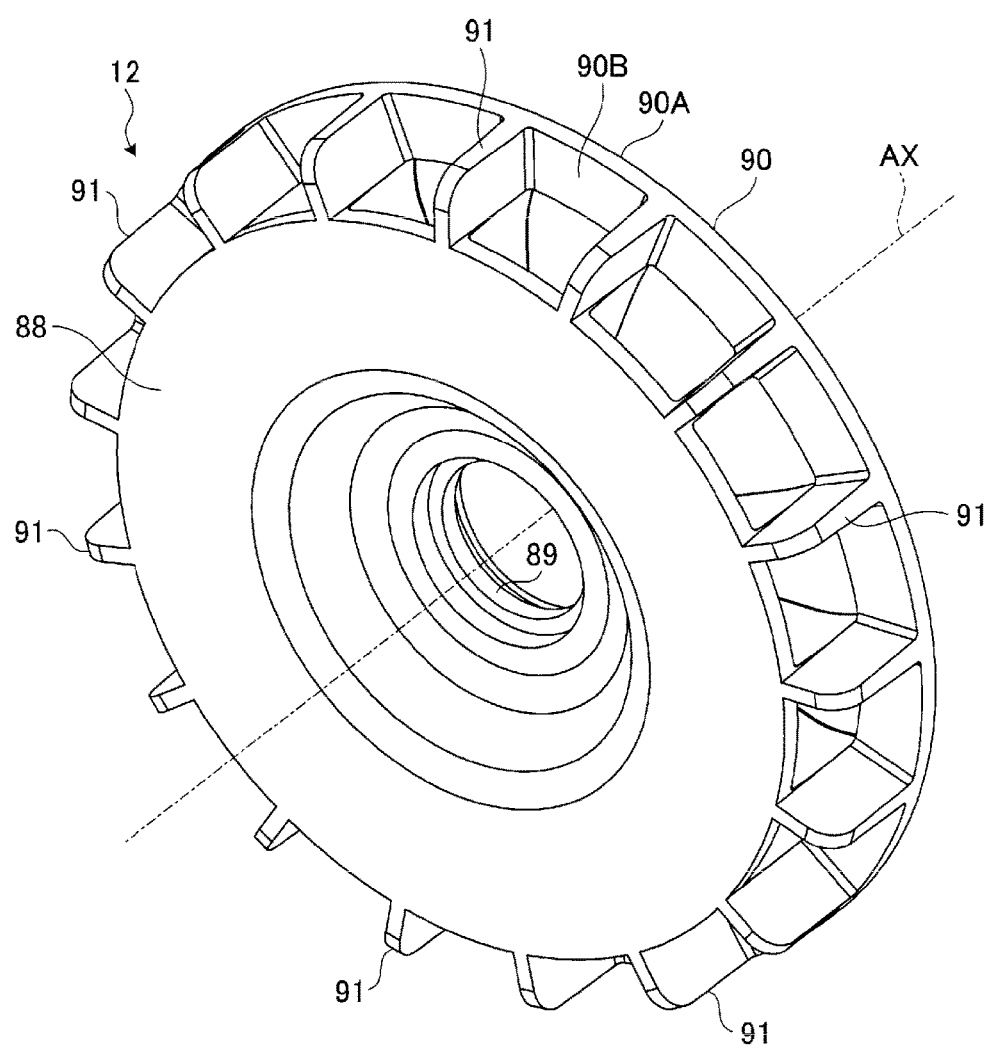
FIG. 41 is a rear perspective view of the fan in the embodiment.
Figure 41:
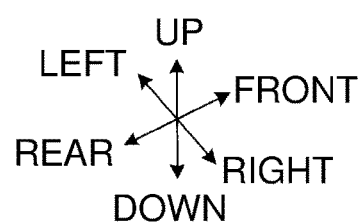
Figure 42:
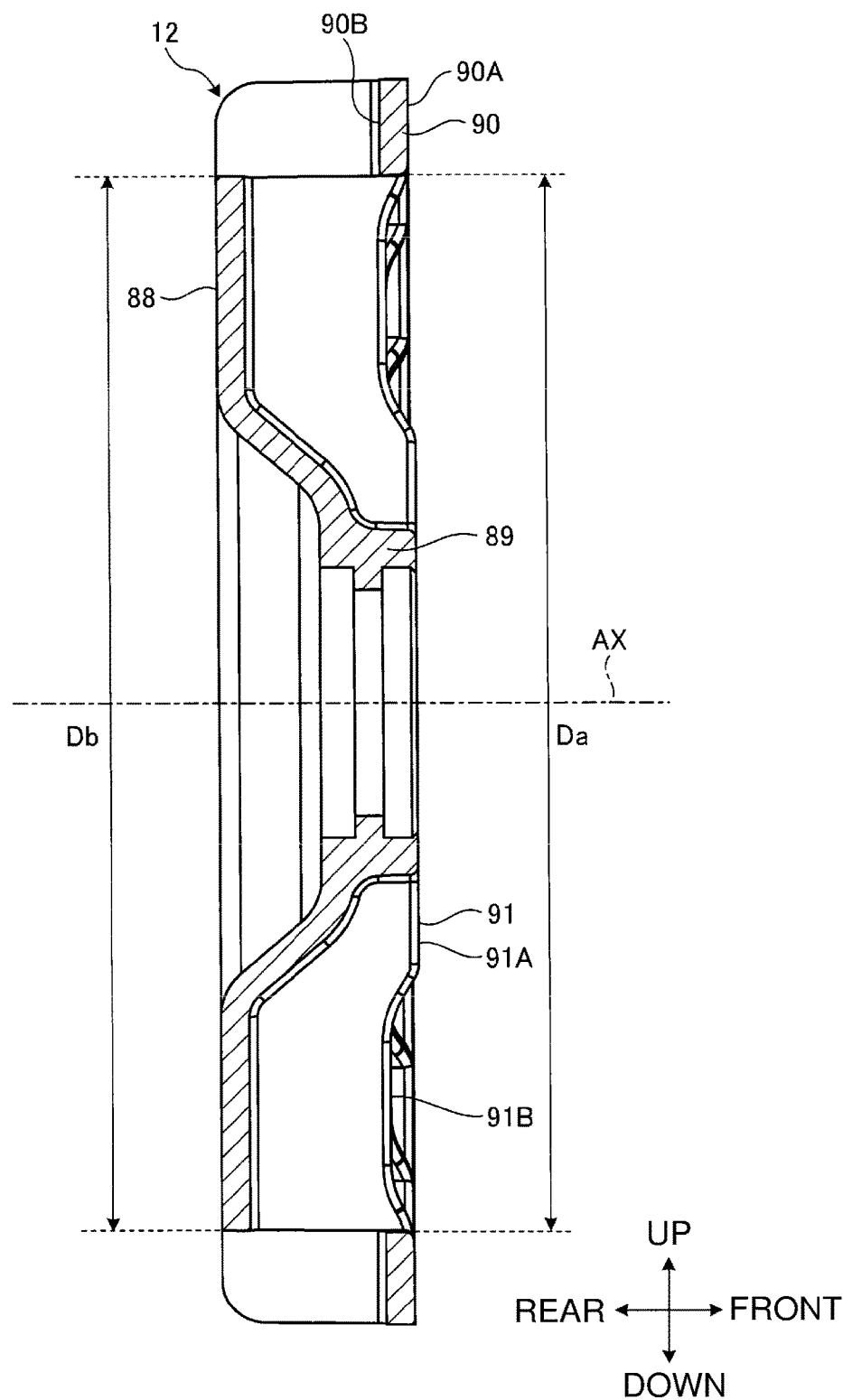
FIG. 42 is a sectional view of the fan in the embodiment.

FIG. 40 is a front perspective view of the fan 12 in the embodiment. FIG. 41 is a rear perspective view of the fan 12 in the embodiment. FIG. 42 is a sectional view of the fan 12 in the embodiment.

The fan 12 is a centrifugal fan. The fan 12 includes a main plate 88, a cylindrical portion 89, multiple blades 91, and a baffle 90. The cylindrical portion 89 protrudes frontward from the center portion of the main plate 88. The multiple blades 91 surround the cylindrical portion 89. The baffle 90 is annular and is located in front of the blades 91.

The main plate 88 has a disk shape. The main plate 88 is located behind the blades 91. The main plate 88 has an opening to receive the rotor shaft 32 in the center portion. The opening in the main plate 88 and the inner space of the cylindrical portion 89 connect with each other. The rotor shaft 32 is received in the cylindrical portion 89.

The multiple blades 91 are arranged at intervals around the cylindrical portion 89. The main plate 88 is connected to the rear surfaces of the blades 91. The front surface of each blade 91 has an inner portion 91A and an outer portion 91B. The inner portion 91A extends radially outward from the front portion of the cylindrical portion 89. The outer portion 91B is located radially outward from the inner portion 91A. The outer portion 91B is recessed rearward from the inner portion 91A. The outer portion 91B is located rearward from a front surface 90A of the baffle 90.

The cylindrical portion 89 is located inside the baffle 90. The bush 61 is located inside the cylindrical portion 89.

The baffle 90 is located frontward from the main plate 88. The baffle 90 is annular and flat. The baffle 90, the cylindrical portion 89, and the rotation axis AX are concentric. The baffle 90 is connected to the peripheries of the front surfaces of the blades 91.

The baffle 90 has an inner diameter Da greater than an outer diameter Db of the main plate 88. The baffle 90 and the main plate 88 do not overlap on the plane orthogonal to the rotation axis AX. The inner diameter Da of the baffle 90 may be equal to the outer diameter Db of the main plate 88.

With the fan 12 fastened to the rotor shaft 32, the baffle 90 faces at least a part of the stator 26. The baffle 90 has the front surface 90A facing frontward, and a rear surface 90B facing rearward opposite to the front surface 90A. With the fan 12 fastened to the rotor shaft 32, the front surface 90A faces at least a part of the stator 26.

The front surface 90A and the rear surface 90B are parallel to each other. The front surface 90A and the rear surface 90B are flat. The baffle 90 in the embodiment is a flat plate. With the fan 12 fastened to the rotor shaft 32, the front surface 90A and the rear surface 90B are orthogonal to the rotation axis AX.

Figure 43:
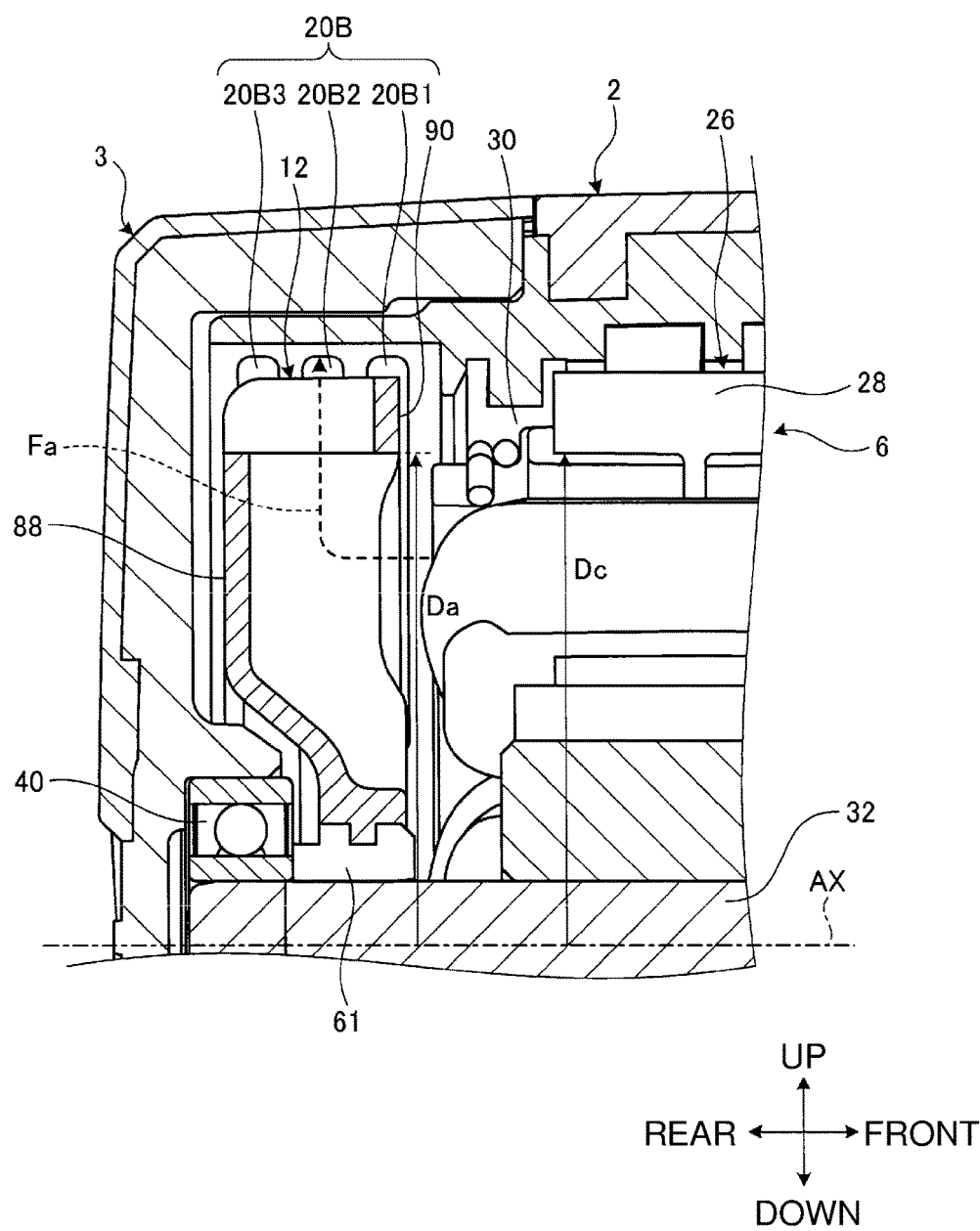
FIG. 43 is a partial sectional view of the fan and the motor in the embodiment.

FIG. 43 is a partial sectional view of the fan 12 and the motor 6 in the embodiment. As shown in FIG. 43, the baffle 90 aligns with at least a part of the stator core 28 in the radial direction. In other words, the baffle 90 faces the stator core 28 behind the motor 6. The stator 26 in the embodiment includes the rear insulator 30 supported by the stator core 28. The baffle 90 faces the rear insulator 30. The baffle 90 and the rear surface of the stator core 28 face each other with the rear insulator 30 in between.

The inner diameter Da of the baffle 90 is equal to the inner diameter Dc of the stator core 28. The inner diameter Da of the baffle 90 may be greater than the inner diameter Dc of the stator core 28. For the stator core 28 including teeth on the inner surface, the inner diameter Dc of the stator core 28 refers to the inner diameter of a portion of the stator core 28 without the teeth. In other words, the inner diameter Dc of the stator core 28 refers to the maximum inner diameter of the stator core 28.

The fan 12 generates an airflow for cooling the motor 6. As the rotor shaft 32 rotates, the fan 12 rotates together with the rotor shaft 32. Thus, air outside the housing 2 flows into the internal space of the housing 2 through the inlets 19. Air flowing into the internal space of the housing 2 flows through the housing 2 while coming in contact with the motor 6. Thus, the motor 6 is cooled. As indicated with arrow Fa in FIG. 43, air in contact with the motor 6 flows at least partially rearward toward the fan 12. Air from the motor 6 flows inside the baffle 90. The fan 12 rotates to allow the air flowing inside the baffle 90 to flow between the multiple blades 91 and then flow radially outward. After flowing radially outward between the multiple blades 91, the air passes through the first outlets 20B and then flows out of the housing 2 through the second outlets 20A.

As shown in FIG. 6, the first and second outlets 20B and 20A are displaced in the front-rear direction. As shown in FIG. 43, the first outlets 20B include an outlet 20B1, an outlet 20B2, and an outlet 20B3 arranged in the front-rear direction. The outlet 20B1 is located most frontward, followed by the outlet 20B2, and by the outlet 20B3 located most rearward. The outlet 20B1 aligns with at least a part of the baffle 90 in the front-rear direction. The outlet 20B3 aligns with at least a part of the main plate 88 in the front-rear direction.

As shown in FIG. 6, the second outlets 20A include outlets 20A1, outlets 20A2, outlets 20A3, and outlets 20A4 in the front-rear direction. Each outlet 20A1 is located most frontward, followed by the outlet 20A2, the outlet 20A3, and by the outlet 20A4 located most rearward. The outlet 20A1 is located frontward from the baffle 90. The outlet 20A4 aligns with at least a part of the main plate 88 in the front-rear direction.

The baffle 90 reduces generation of an air vortex at least partially around the fan 12. Without the baffle 90, rotation of the fan 12 highly likely generates an air vortex at, for example, the peripheries of the front surfaces of the blades 91. The flow rate of air passing through the fan 12 may decrease. Air flowing radially outward from the fan 12 may be disturbed. Thus, the motor 6 may not be cooled sufficiently.

The baffle 90 reduces generation of an air vortex. This structure facilitates airflow and is less likely to reduce the air flow rate. The motor 6 is thus cooled efficiently.

Spindle

Figure 44:
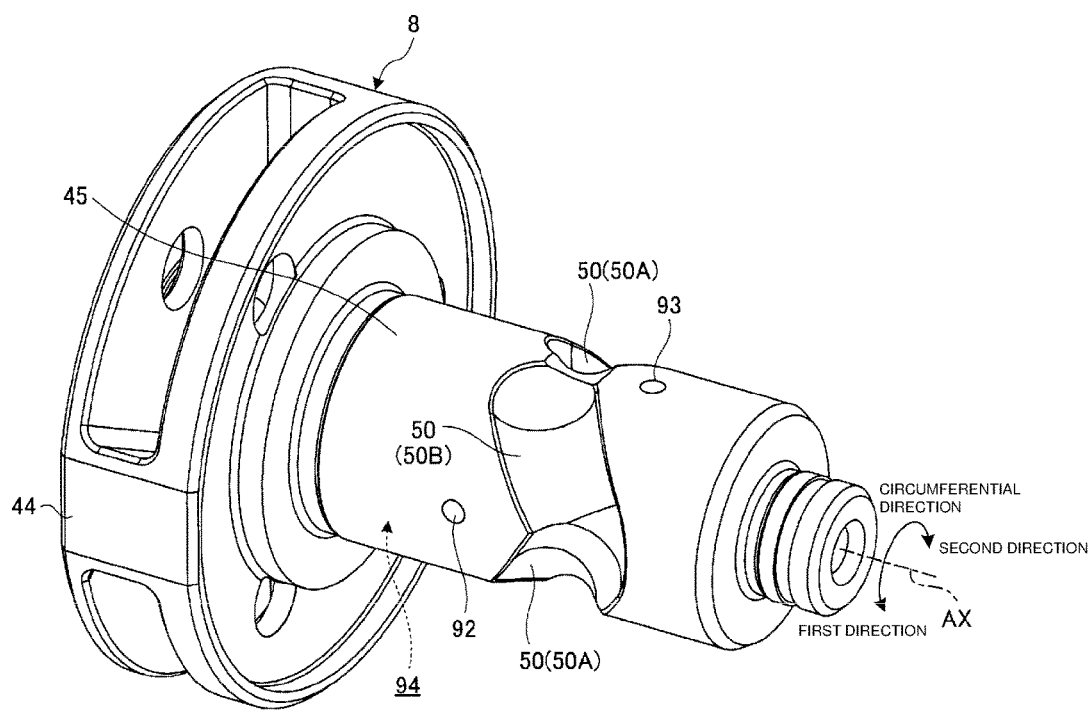
FIG. 44 is a perspective view of the spindle in the embodiment.
Figure 45:
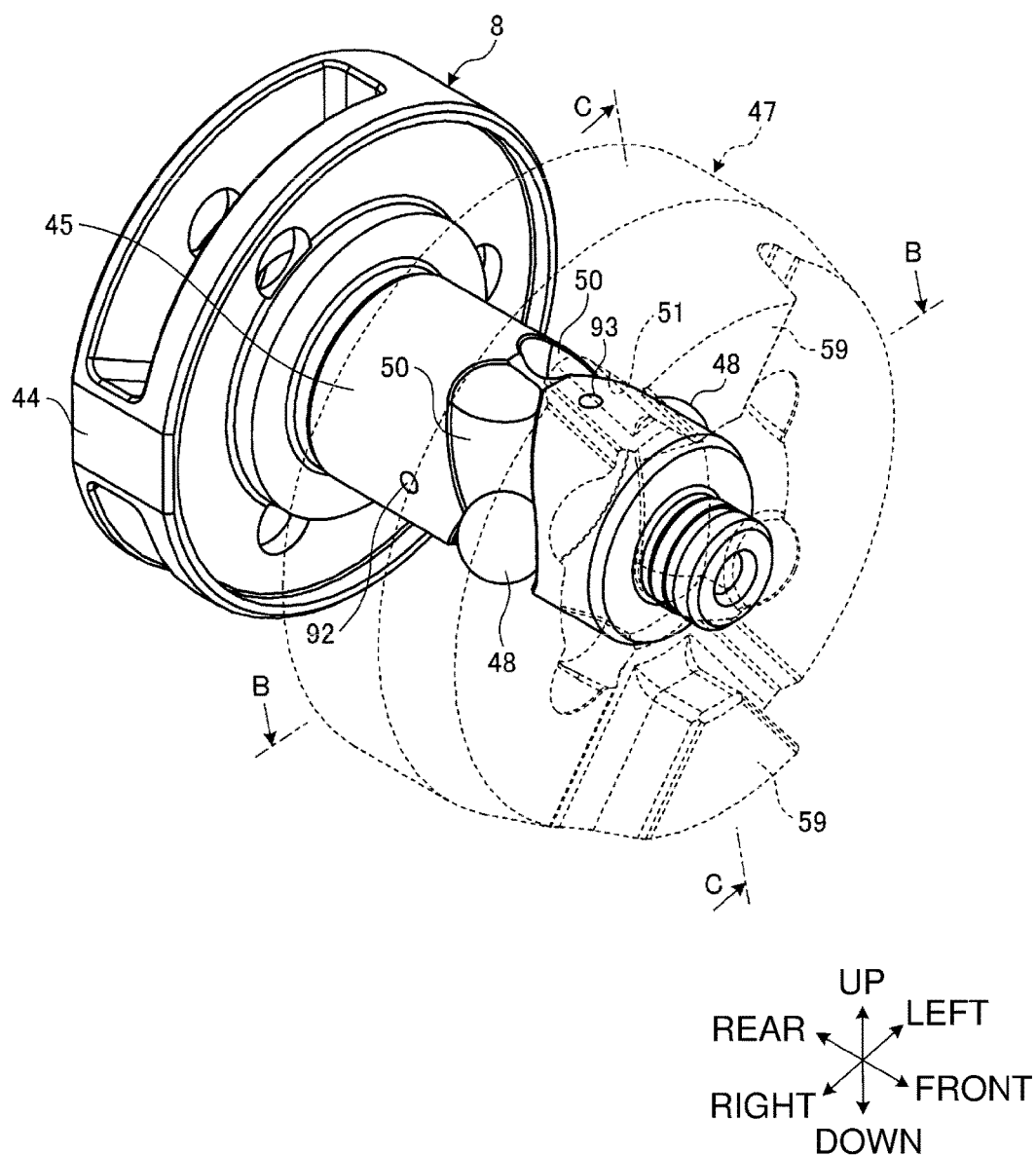
FIG. 45 is a perspective view of the spindle, balls, and the hammer in the embodiment.

The spindle 8 will now be described. FIG. 44 is a perspective view of the spindle 8 in the embodiment. FIG. 45 is a perspective view of the spindle 8, the balls 48, and the hammer 47 in the embodiment.

As shown in FIGS. 5, 44, and 45, the spindle 8 includes the flange 44, the rod 45, and the spindle groove 50. The rod 45 protrudes frontward from the flange 44. The spindle groove 50 receives at least parts of the balls 48.

The spindle groove 50 is formed on the outer surface of the rod 45. The spindle groove 50 includes first portions 50A and second portions 50B. The first portions 50A are inclined rearward in a first circumferential direction. The second portions 50B are inclined rearward in a second circumferential direction. The spindle groove 50 includes two first portions 50A and two second portions 50B. The first portions 50A and the second portions 50B alternate in the circumferential direction.

The spindle 8 includes the first and second feed ports 93 and 92 for feeding lubricating oil. The first feed ports 93 and the second feed ports 92 are formed in the rod 45.

As described with reference to FIG. 5, the spindle 8 has the internal space 94 containing the lubricating oil. The first feed ports 93 are located radially outward from the internal space 94. The second feed ports 92 are located radially outward from the internal space 94. The first feed ports 93 connect with the internal space 94 through the first channel 93R. The second feed ports 92 connect with the internal space 94 through the second channel 92R. The first feed ports 93 include openings located radially outward from the first channel 93R. The second feed ports 92 include openings located radially outward from the second channel 92R.

The first and second feed ports 93 and 92 are formed in the outer surface of the rod 45 outside the spindle groove 50. The second feed ports 92 are located rearward from the first feed ports 93.

The first channel 93R includes a through-hole intersecting with the center axis (rotation axis AX) of the spindle 8 and extending through the rod 45. The first feed ports 93 are at two positions on the outer surface of the rod 45. The second channel 92R includes a through-hole intersecting with the center axis (rotation axis AX) of the spindle 8 and extending through the rod 45. The second feed ports 92 are at two positions on the outer surface of the rod 45.

The balls 48 are located radially outward from the first feed ports 93. The washer 54 is located radially outward from the first feed ports 93. The first feed ports 93 may be located rearward from the balls 48 and the washer 54. The first feed ports 93 may be located, for example, radially inside the coil spring 49.

The first channel 93R extends in either the vertical or lateral direction alone. The second channel 92R extends in either the vertical or lateral direction alone. The first channel 93R may be inclined frontward or rearward as being radially outward. This allows oil to be more slowly discharged from the first channel 93R. Similarly, the second channel 92R may be inclined frontward or rearward as being radially outward.

Figure 46:
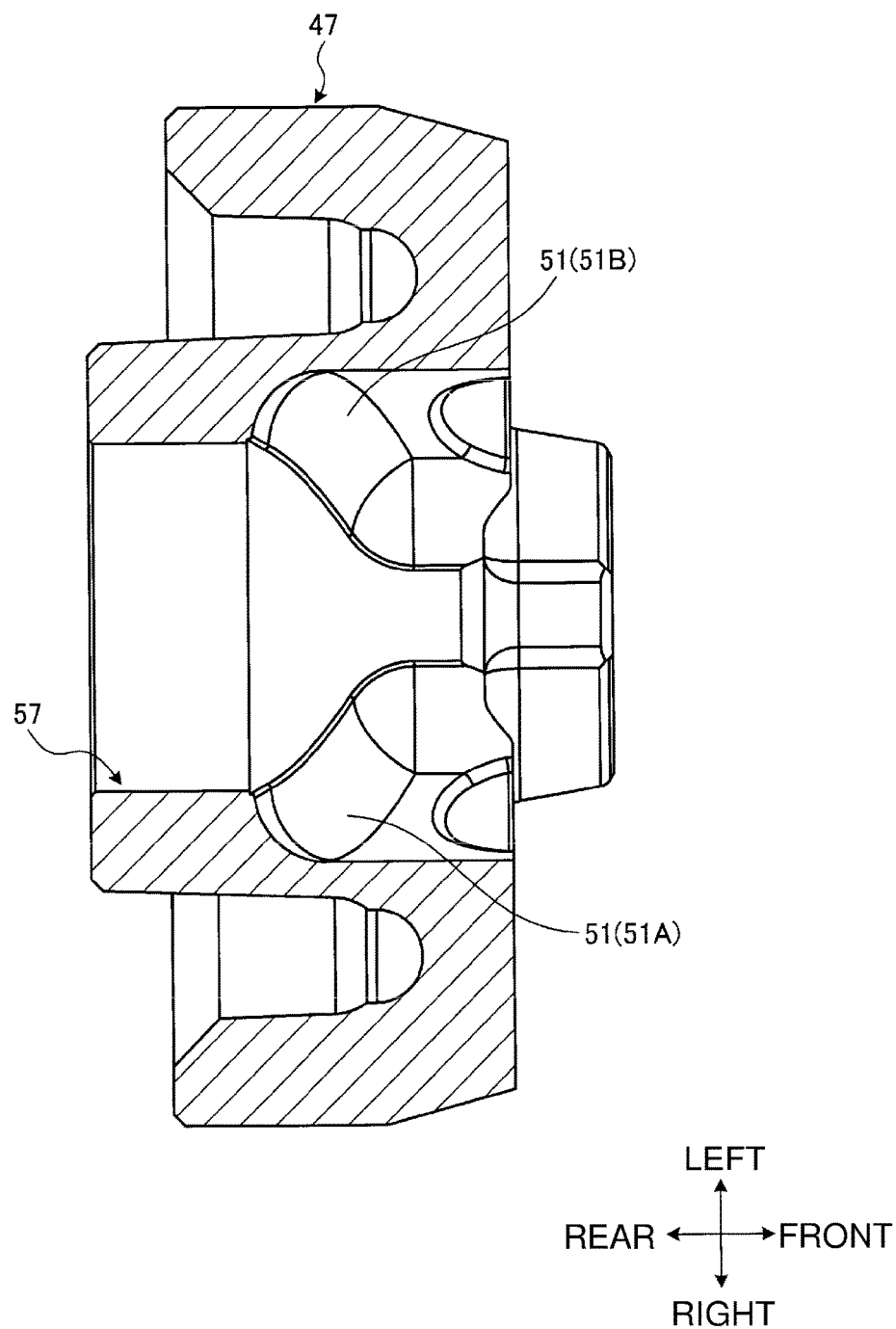
FIG. 46 is a sectional view of the hammer in the embodiment.
Figure 47:
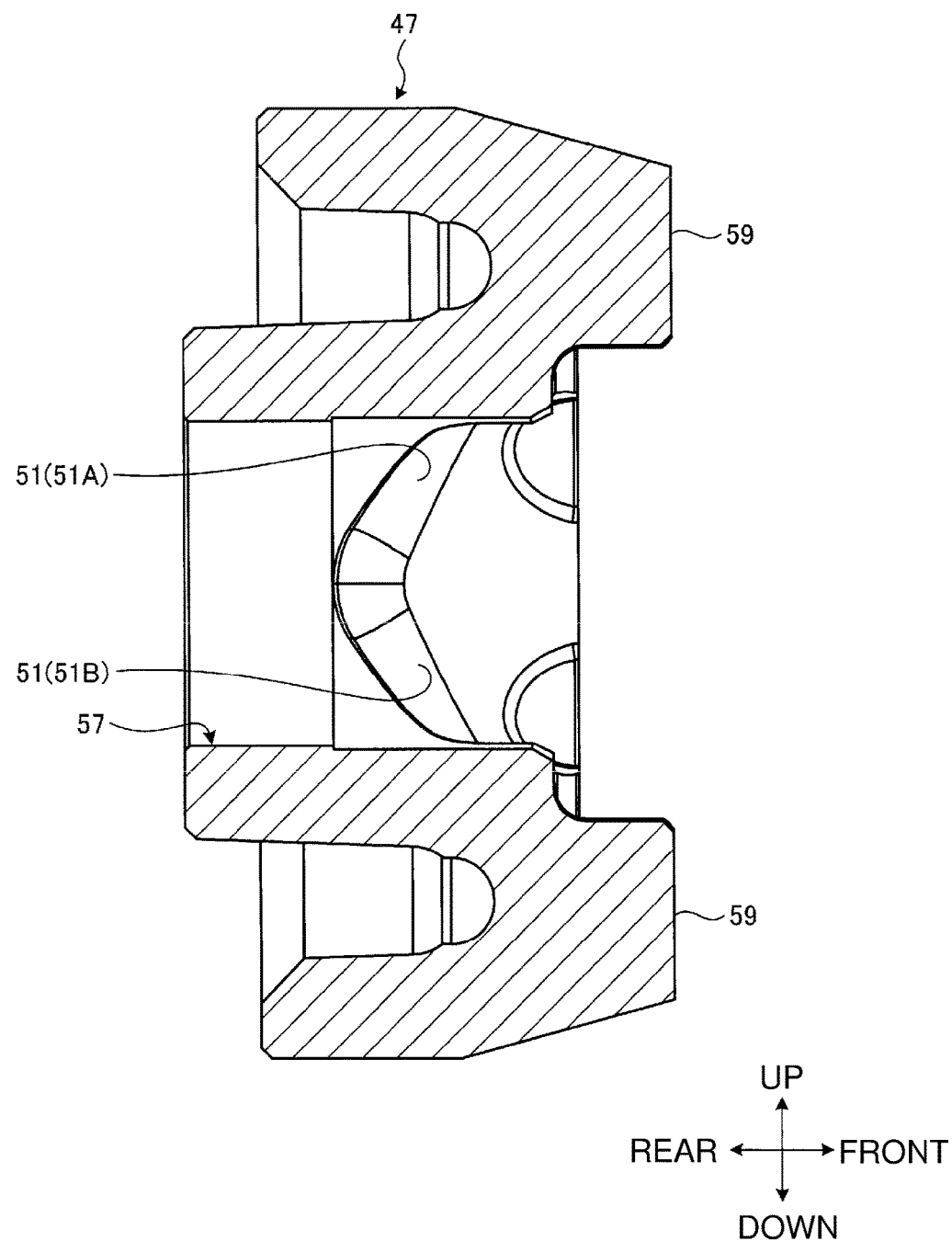
FIG. 47 is a sectional view of the hammer in the embodiment.

FIGS. 46 and 47 are sectional views of the hammer 47 in the embodiment. FIG. 46 corresponds to a sectional view of the hammer 47 taken along line B-B in FIG. 45 as viewed in the arrow direction. FIG. 47 corresponds to a sectional view of the hammer 47 taken along line C-C in FIG. 45 as viewed in the arrow direction.

As shown in FIGS. 45 to 47, the hammer 47 has the hammer groove 51 and the hammer protrusions 59. The hammer groove 51 receives at least parts of the balls 48. The hammer protrusions 59 protrude frontward from the front surface of the hammer 47. The hammer 47 is cylindrical. The hammer 47 has the hole 57 that receives at least a part of the rod 45.

The hammer groove 51 is formed on the inner surface of the hammer 47. The hammer groove 51 includes third portions 51A and fourth portions 51B. The third portions 51A are inclined in the first circumferential direction as being frontward. The fourth portions 51B are inclined in the second circumferential direction as being frontward. The hammer groove 51 includes two third portions 51A and two fourth portions 51B. The third portions 51A and the fourth portions 51B alternate in the circumferential direction.

Figure 48:
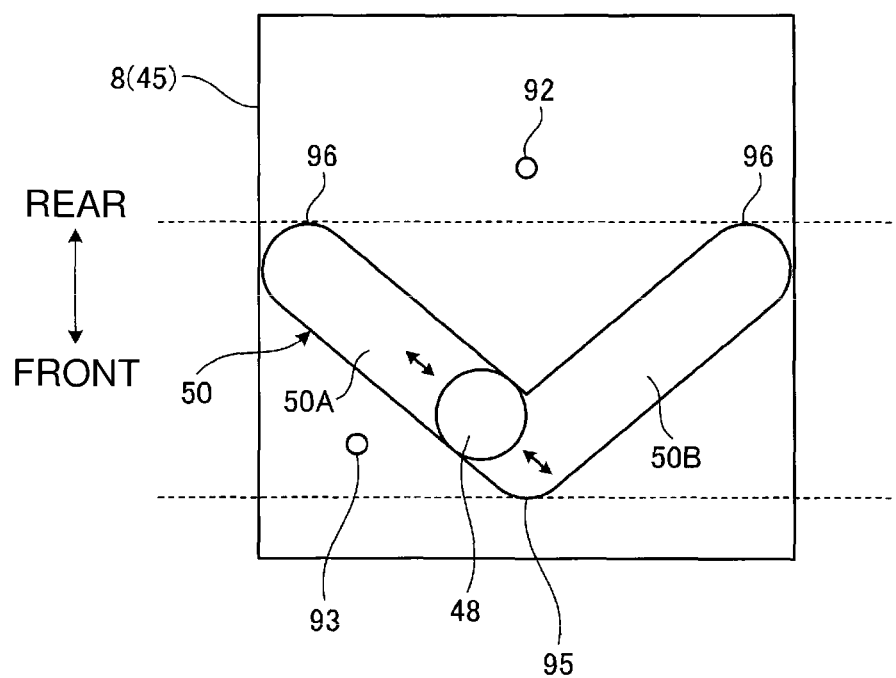
FIG. 48 is a schematic development view of an outer surface of a rod in the embodiment.

FIG. 48 is a schematic development view of the outer surface of the rod 45 in the embodiment.

The spindle groove 50 includes a front end 95 in the first axial direction and a rear end 96 in the second axial direction. In the axial direction, the front ends of the first and second portions 50A and 50B are at the same position. In the axial direction, the rear ends of the first and second portions 50A and 50B are at the same position. The front ends 95 include the front ends of the first and second portions 50A and 50B. The rear ends 96 include the rear ends of the first and second portions 50A and 50B.

In the axial direction, the first feed port 93 is located between the front end 95 and the rear end 96. In other words, the first feed port 93 is located rearward from the front end 95 and frontward from the rear end 96. The first feed port 93 is formed in the outer surface of the rod 45 between the front end 95 and the rear end 96 in the axial direction.

The second feed port 92 is formed in the outer surface of the rod 45 rearward from the rear end 96 in the axial direction.

The lubricating oil fed through the first feed port 93 is fed to the surface of the ball 48. The first feed port 93 functions as a feeder for feeding the lubricating oil to the ball 48.

The first feed port 93 feeds the lubricating oil between the outer surface of the rod 45 and the inner surface of the hammer 47. The lubricating oil is fed to the surface of the ball 48 when the hammer 47 moves.

Figure 49:
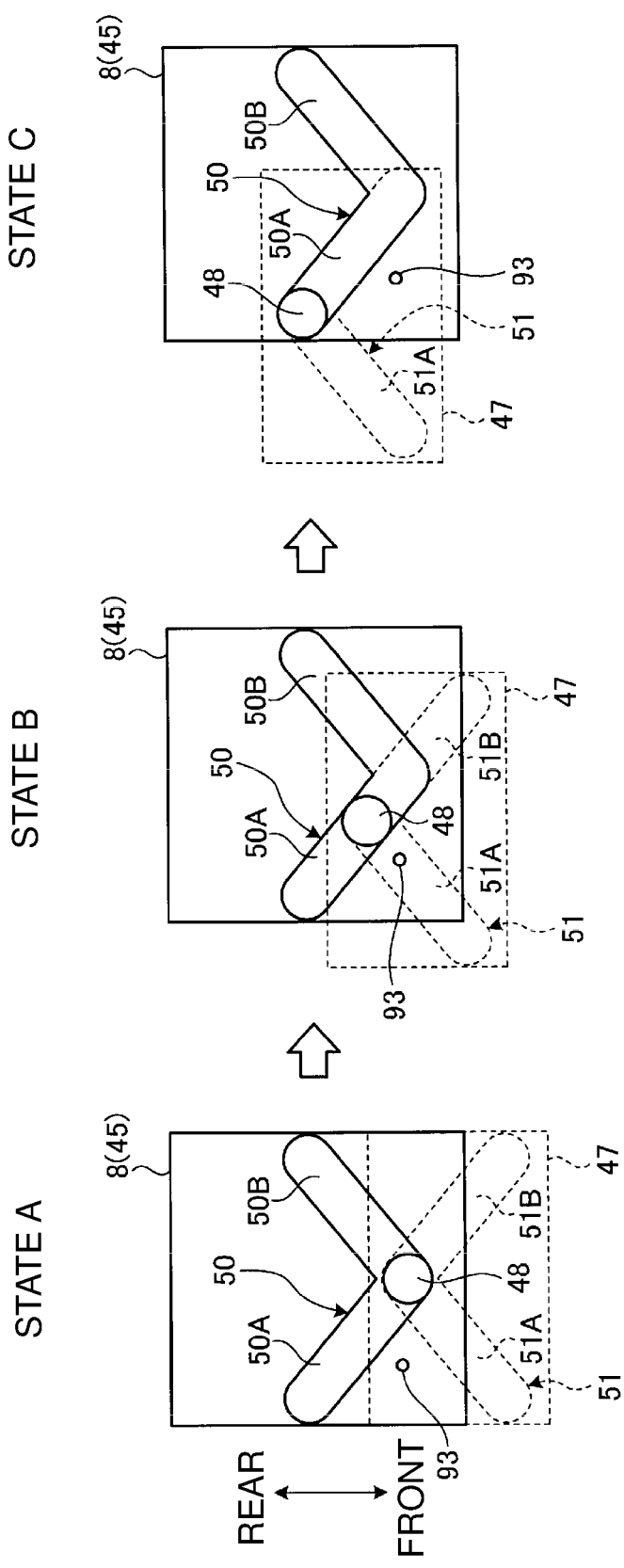
FIG. 49 is a schematic diagram showing the operation of the hammer in the embodiment.

FIG. 49 is a diagram showing the operation of the hammer 47 in the embodiment. FIG. 49 includes schematic development views of the outer surface of the rod 45 and the inner surface of the hammer 47.

As described above, the spindle 8 and the hammer 47 are movable relative to each other in the axial direction and in the rotation direction within the movable range defined by the spindle groove 50 and the hammer groove 51. The hammer 47 is movable in the axial direction while being guided by the ball 48.

For example, in the screw fastening operation, when the motor 6 starts driving, the spindle 8 starts rotating. When the anvil 10 receives a low load, the spindle 8 rotates while the hammer protrusions 59 and the anvil protrusions 60 are in contact with each other. More specifically, when the anvil 10 receives a low load, the hammer 47 is located at the front end of the movable range of the hammer 47 as in a state A in FIG. 49. In the state A, the spindle 8 and the hammer 47 rotate together while the hammer protrusions 59 and the anvil protrusions 60 are in contact with each other.

When the spindle 8 rotates, the centrifugal force causes the lubricating oil in the internal space 94 to flow radially outward through the first channel 93R. The lubricating oil is fed through the first feed port 93 to between the outer surface of the rod 45 and the inner surface of the hammer 47.

In the screw fastening operation, when the anvil 10 receives a higher load, the anvil 10 and the hammer 47 stop rotating. Although the hammer 47 stops rotating, the spindle 8 continues to rotate with power generated by the motor 6. The ball 48 moves rearward while being guided by the spindle groove 50. The hammer 47 then moves rearward from the front end of the movable range of the hammer 47 together with the ball 48 as in a state B in FIG. 49.

When the spindle 8 continues to rotate further, the hammer 47 moves rearward to the rear end of the movable range of the hammer 47 together with the ball 48 as shown in a state C in FIG. 49. The hammer 47 at the rear moves forward while rotating under an elastic force from the coil spring 49. The hammer 47 strikes the anvil 10 in the rotation direction. Thus, the hammer 47 moves in the front-rear direction while rotating.

The lubricating oil fed through the first feed port 93 adheres to the inner surface of the hammer 47. As the hammer 47 moves in the front-rear direction while rotating, the lubricating oil adhering to the inner surface of the hammer 47 at least partially comes in contact with the surface of the ball 48. Thus, the lubricating oil fed through the first feed port 93 is fed to the surface of the ball 48 via the inner surface of the hammer 47.

The relative movement between the spindle 8 and the hammer 47 causes the first feed port 93 and the hammer groove 51 to face each other as shown in, for example, the state B in FIG. 49. The lubricating oil through the first feed port 93 is fed to the inner side of the hammer groove 51. Thus, the lubricating oil is fed to the surface of the ball 48 rolling along the hammer groove 51. The relative movement between the spindle 8 and the hammer 47 causes the first feed port 93 and the ball 48 to face each other. The first feed port 93 directly feed the lubricating oil to the surface of the ball 48.

When the spindle 8 rotates, the centrifugal force causes the lubricating oil in the internal space 94 to flow radially outward through the second channel 92R. The lubricating oil is fed through the second feed port 92 to between the outer surface of the rod 45 and the inner surface of the hammer 47. The second feed port 92 feeds the lubricating oil to between the outer surface of the rod 45 and the inner surface of the hammer 47 rearward from the rear end 96 of the spindle groove 50.

As described above, in the embodiment, the deformation reducing member 85 is located at or around the interface 2C between the grip 22 and the controller compartment 23. The deformation reducing member 85 reduces deformation of the housing 2. As described with reference to FIG. 37, when the power tool 1 falls and receives an external force, the housing 2 may be deformed at least partially. The interface 2C between the grip 22 and the controller compartment 23 is bent. Thus, under the external force, the power tool 1 is highly likely to be deformed at or around the interface 2C. When the housing 2 is bent at or around the interface 2C, the inner surface of the housing 2 may come in contact with at least either the controller 13 or the components around the controller 13. Thus, at least either the controller 13 or the components around the controller 13 may be broken. In the embodiment, the deformation reducing member 85 reduces deformation of the housing 2 at or around the interface 2C. Thus, the controller 13 and the components around the controller 13 are protected sufficiently. This reduces breakage of the controller 13 and the components around the controller 13.

The deformation reducing member 85 is located in the internal space of the controller compartment 23 and connected to the inner surface of the housing 2 with the connection portion 87 in between. The deformation reducing member 85 internally supports the housing 2, thus reducing deformation of the housing 2.

The deformation reducing member 85 is located above the controller 13. As described with reference to FIGS. 38 and 39, when the inner surface of the housing 2 is deformed toward the controller 13, the inner surface of the housing 2 comes in contact with the deformation reducing member 85 before coming in contact with the controller 13. This structure reduces the likelihood that the inner surface of housing 2 comes in contact with the controller 13. The controller 13 and the components around the controller 13 are protected sufficiently.

The controller 13 is accommodated in the internal space of the controller case 62 in the controller compartment 23. The deformation reducing member 85 is located above the controller case 62. Thus, the controller 13 is protected sufficiently by the deformation reducing member 85 and the controller case 62.

The controller case 62 includes the bottom plate 62A and the wall plates 62B protruding upward from the rim of the bottom plate 62A. The deformation reducing member 85 is located at least partially above the wall plates 62B. Thus, under the external force, the deformation reducing member 85 is supported by the wall plates 62B.

The left end of the deformation reducing member 85 is located above the left wall plate 62B1. The right end of the deformation reducing member 85 is located above the right wall plate 62Br. The deformation reducing member 85 extends between the left and right wall plates 62B1 and 62Br. Thus, the deformation reducing member 85 is sufficiently supported by the controller case 62. The deformation reducing member 85 covers a part of the upper opening of the controller case 62. The controller 13 is thus protected by the deformation reducing member 85.

The buffer layers 86 are located between the deformation reducing member 85 and the upper ends of the wall plates 62B. The buffer layers 86 reduce shock applied when the deformation reducing member 85 receives an external force.

Each buffer layer 86 includes at least a part of the controller compartment 23. The buffer layers 86 are thus provided without increasing the number of components. The power tool 1 can also be assembled without reducing workability.

The controller compartment 23 has larger dimensions than the grip 22 in the front-rear and lateral directions. The deformation reducing member 85 has a larger dimension than the grip 22 in the lateral direction. Thus, the deformation reducing member 85 effectively reduces deformation at the interface 2C between the grip 22 and the controller compartment 23 when the interface 2C is bent.

The controller compartment 23 has the opening 63 for receiving the operation panel 16. The operation panel 16 received in the opening 63 is less likely to reduce operability. However, the opening 63 may reduce the strength of the controller compartment 23. When receiving an external force, the housing 2 is highly likely to be deformed at the interface 2C. The deformation reducing member 85 located on at least the periphery of the opening 63 is less likely to reduce the strength of the controller compartment 23.

In the front-rear direction, the deformation reducing member 85 is located at least partially between the interface 2C and the opening 63. This structure is less likely to reduce the strength of the controller compartment 23, and reduces deformation at the interface 2C.

The deformation reducing member 85 is fixed to the operation panel 16. The power tool 1 can be assembled without reducing workability. The deformation reducing member 85 fixed to the operation panel 16 reduces deformation of the operation panel 16.

The connection portion 87 formed from a synthetic resin connects the deformation reducing member 85 to the operation panel 16. The connection portion 87 is integral with the operation panel 16. The deformation reducing member 85 is fixed to the connection portion 87. The power tool 1 can be assembled without reducing workability. The deformation reducing member 85 securely fixed to the operation panel 16 reduces deformation of the operation panel 16.

The deformation reducing member 85 is formed from metal or carbon. The deformation reducing member 85 thus has sufficiently higher rigidity than the housing 2.

Other Embodiments

Figure 50:
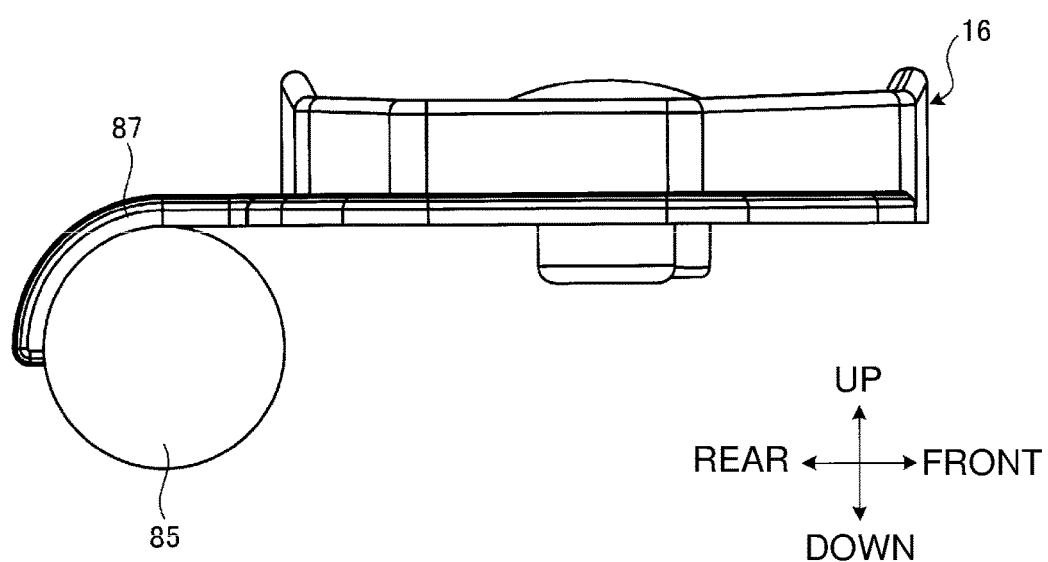
FIG. 50 is a schematic diagram of a deformation reducing member in another embodiment.

FIG. 50 is a side view of a deformation reducing member 85 in another embodiment. In the above embodiment, the deformation reducing member 85 is a rectangular plate. The deformation reducing member 85 may be a cylindrical rod as shown in FIG. 50. In other embodiments, the deformation reducing member 85 may be straight or bent.

Figure 51:
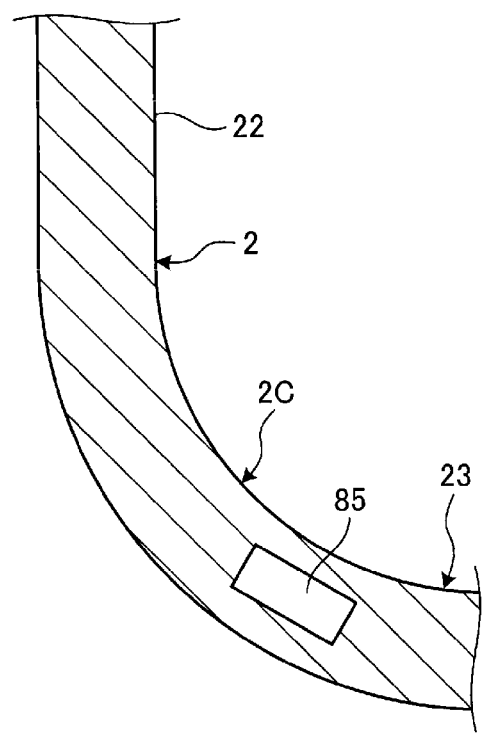
FIG. 51 is a sectional view of a deformation reducing member in still another embodiment.

FIG. 51 is a sectional view of a deformation reducing member 85 in still another embodiment. In the above embodiment, the deformation reducing member 85 is located in the internal space of the controller compartment 23. The deformation reducing member 85 may be embedded in the housing 2 at the interface 2C as shown in FIG. 51. The deformation reducing member 85 may be located in the internal space of the grip 22.

Figure 52:
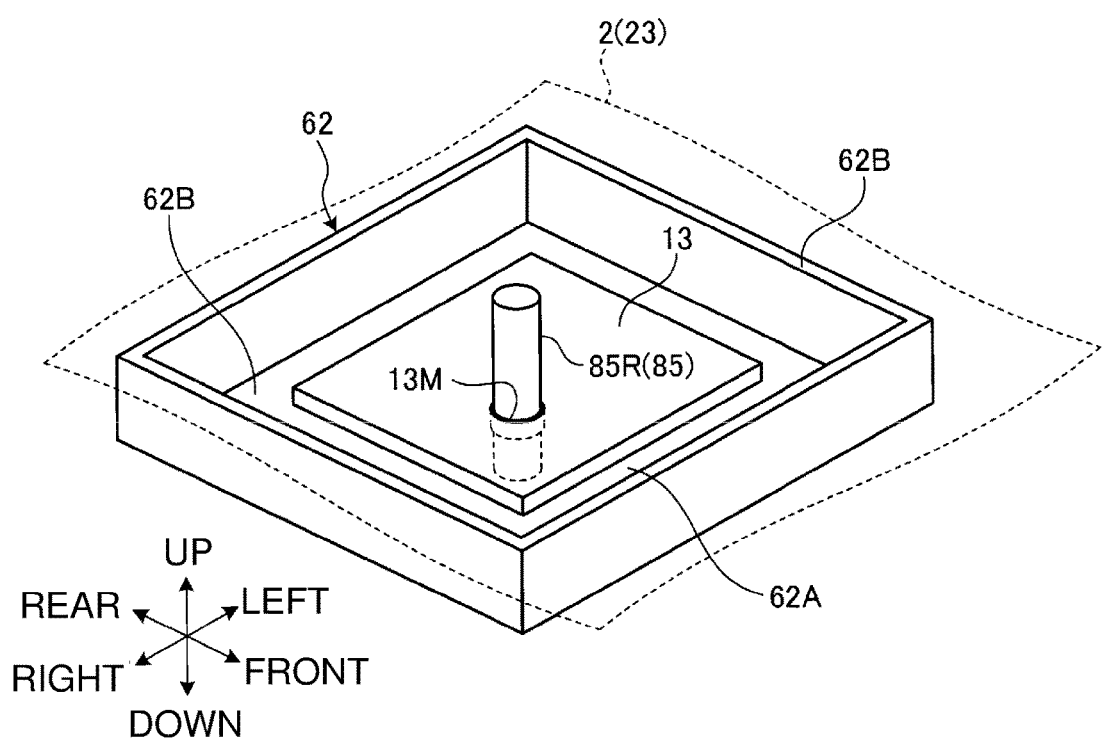
FIG. 52 is a schematic diagram of a deformation reducing member in still another embodiment.

FIG. 52 is a schematic diagram of a deformation reducing member 85 in still another embodiment. In the above embodiment, the deformation reducing member 85 is fixed to the operation panel 16. The deformation reducing member 85 may be fixed to the controller case 62 as shown in FIG. 52. In the example shown in FIG. 52, the deformation reducing member 85 includes a rod 85R protruding upward from the bottom plate 62A of the controller case 62. The upper end of the rod 85R internally supports the controller compartment 23 of the housing 2. The controller 13 may have an opening 13M to receive the rod 85R. The deformation reducing member 85 shown in FIG. 52 can also reduce deformation of the housing 2 and protect the controller 13.

In the above embodiment, the buffer layers 86 may be eliminated.

In the above embodiment, the first state of the light emitters 71 is the first blinking state (fast blinking state), and the second state of the light emitters 71 is the second blinking state (slow blinking state). For example, the first state may be a slow blinking state, and the second state may be a fast blinking state.

In the above embodiment, the registered mode storage 75 stores a single registered mode. The registered mode storage 75 may store two or three registered modes. The registered mode storage 75 may store multiple registered modes that are fewer than the operation modes stored in the operation mode storage 74.

In the above embodiment, the first feed ports 93 may be in the spindle groove 50.

In the above embodiment, feeders that feed lubricating oil to the balls 48 are the first feed ports 93 formed in the spindle 8. The feeders that feed the lubricating oil to the balls 48 may be located at the inner surface of the hammer 47.

In the above embodiment, the power tool 1 is an impact driver. The power tool 1 is not limited to an impact driver, and may be, for example, a driver drill, an angle drill, a hammer, a hammer drill, a grinder, a circular saw, or a reciprocating saw.

In the above embodiment, the electric work machine is a power tool. The electric work machine is not limited to a power tool, and may be, for example, a gardening tool. Examples of gardening tools include a chain saw, a hedge trimmer, a lawn mower, a mowing machine, and a blower.

What is claimed is:
1. An electric work machine, comprising:
   a motor;
   a trigger switch operated to activate the motor;
   a controller configured to control the motor;
   a housing including
      a grip on which the trigger switch is located, and
      a controller compartment accommodating the controller;
   a deformation reducing member located at an interface between the grip and the controller compartment to reduce deformation of the housing; and
   a controller case located in an internal space of the controller compartment and accommodating at least a part of the controller, wherein
   the deformation reducing member is located above the controller case, and
   the controller case includes
      a bottom plate, and
      a wall plate protruding upward from a rim of the bottom plate, and
   the deformation reducing member is located at least partially above the wall plate.

2. The electric work machine according to claim 1, wherein
the deformation reducing member is located in an internal space of the controller compartment and connected to an inner surface of the housing.

3. The electric work machine according to claim 2, wherein
the controller compartment is connected to a lower end of the grip, and
the deformation reducing member is located above the controller.

4. The electric work machine according to claim 2, further comprising:
a controller case located in an internal space of the controller compartment and accommodating at least a part of the controller,
wherein the deformation reducing member is located above the controller case.

5. The electric work machine according to claim 1, wherein
the controller compartment is connected to a lower end of the grip, and
the deformation reducing member is located above the controller.

6. The electric work machine according to claim 1, wherein
the wall plate includes
a left wall plate protruding upward from a left end of the bottom plate, and
a right wall plate protruding upward from a right end of the bottom plate, and
the deformation reducing member has a left end located above the left wall plate and a right end located above the right wall plate.

7. The electric work machine according to claim 1, further comprising:
a buffer layer located between the deformation reducing member and an upper end of the wall plate.

8. The electric work machine according to claim 7, wherein
the buffer layer includes at least a part of the controller compartment.

9. The electric work machine according to claim 1, wherein
the controller compartment has larger dimensions than the grip in a front-rear direction and a lateral direction, and
the deformation reducing member has a larger dimension than the grip in the lateral direction.

10. The electric work machine according to claim 1, wherein
the deformation reducing member has higher rigidity than the housing.

11. The electric work machine according to claim 1, wherein
the deformation reducing member comprises metal or carbon.

12. An electric work machine, comprising:
a motor;
a trigger switch operated to activate the motor;
a controller configured to control the motor;
a housing including
a grip on which the trigger switch is located, and
a controller compartment accommodating the controller;
a deformation reducing member located at an interface between the grip and the controller compartment to reduce deformation of the housing; and
an operation panel operated to change a control mode of the motor, wherein
the controller compartment has an opening receiving the operation panel, and
the deformation reducing member is located on at least a periphery of the opening.

13. The electric work machine according to claim 12, wherein
the opening is located frontward from the interface, and
the deformation reducing member is located at least partially between the interface and the opening in a front-rear direction.

14. The electric work machine according to claim 12, wherein
the deformation reducing member is fixed to the operation panel.

15. The electric work machine according to claim 14, further comprising:
a connection portion comprising a synthetic resin and connecting the deformation reducing member to the operation panel,
wherein the connection portion is integral with the operation panel, and
the deformation reducing member is fixed to the connection portion.

16. An electric work machine, comprising:
a motor;
a controller configured to control the motor;
a housing including a controller compartment accommodating the controller;
an operation panel located in an opening in the controller compartment; and
a deformation reducing member fixed to the operation panel to reduce deformation of the housing.

17. The electric work machine according to claim 16, further comprising:
a connection portion comprising a synthetic resin and connecting the deformation reducing member to the operation panel,
wherein the connection portion is integral with the operation panel, and
the deformation reducing member is fixed to the connection portion.

18. The electric work machine according to claim 16, wherein
the deformation reducing member comprises metal or carbon.

* * * * *